United States Patent
Zion et al.

(10) Patent No.: US 11,615,271 B2
(45) Date of Patent: Mar. 28, 2023

(54) MACHINE LEARNING PIPELINE OPTIMIZATION

(71) Applicant: Cerebri AI Inc., Austin, TX (US)

(72) Inventors: Eyal Ben Zion, Toronto (CA); Alain Charles Briancon, Germantown, MD (US); Pranav Mahesh Makhijani, Bethesda, MD (US); Thejas Narayana Prasad, Spring, TX (US); Sara Amini, Fairfax, VA (US); Jian Deng, Kitchener (CA); Ngoc Thu Nguyen, Potomac, MD (US); Jean Joseph Belanger, Austin, TX (US)

(73) Assignee: Cerebri AI Inc., Austin, TX (US)

( * ) Notice: Subject to any disclaimer, the term of this patent is extended or adjusted under 35 U.S.C. 154(b) by 253 days.

(21) Appl. No.: 16/891,834

(22) Filed: Jun. 3, 2020

(65) Prior Publication Data
US 2020/0380416 A1    Dec. 3, 2020

Related U.S. Application Data

(60) Provisional application No. 62/856,713, filed on Jun. 3, 2019.

(51) Int. Cl.
*G06K 9/62*    (2022.01)
*G06F 8/20*    (2018.01)
(Continued)

(52) U.S. Cl.
CPC ............ *G06K 9/6257* (2013.01); *G06F 8/10* (2013.01); *G06F 8/24* (2013.01); *G06F 8/315* (2013.01);
(Continued)

(58) Field of Classification Search
CPC .............. G06K 9/6257; G06K 9/6256; G06K 9/6264; G06K 9/6282; G06F 9/44521;
(Continued)

(56) References Cited

U.S. PATENT DOCUMENTS 5,307,499 A    4/1994    Yin
5,493,680 A    2/1996    Danforth
(Continued)

FOREIGN PATENT DOCUMENTS

CN    1073540 A    6/1993
CN    1846204 A    10/2006
(Continued)

OTHER PUBLICATIONS

Title: Compiling quantum circuits to realistic hardware architectures using temporal planners, author: D Venturelli, published on 2018.*

(Continued)

*Primary Examiner* — Chameli Das
(74) *Attorney, Agent, or Firm* — Pillsbury Winthrop Shaw Pittman, LLP

(57) ABSTRACT

Provided is a process of modeling methods organized in racks of a machine learning pipeline to facilitate optimization of performance using modelling methods for implementation of machine learning design in an object-oriented modeling (OOM) framework, the process including: writing classes using object-oriented modelling of optimization methods, modelling methods, and modelling racks; writing parameters and hyper-parameters of the modeling methods as attributes as the modeling methods; scanning modelling racks classes to determine first class definition information; selecting a collection of rack and selecting modeling method objects; scanning modelling method classes to determine second class definition information; assigning racks and (Continued)

locations within the racks to modeling method objects; and invoking the class definition information to produce object manipulation functions that allow access the methods and attributes of at least some of the modeling method objects, the manipulation functions being configured to effectuate writing locations within racks and attributes of racks.

26 Claims, 18 Drawing Sheets

(51) Int. Cl.
| | |
|---|---|
| G06N 20/00 | (2019.01) |
| G06N 20/20 | (2019.01) |
| G06F 30/20 | (2020.01) |
| G06F 8/10 | (2018.01) |
| G06F 8/30 | (2018.01) |
| G06Q 40/08 | (2012.01) |
| G06F 8/36 | (2018.01) |
| G06F 16/25 | (2019.01) |
| G06F 9/445 | (2018.01) |
| G06N 5/04 | (2023.01) |
| G06Q 10/0631 | (2023.01) |
| G06Q 10/0637 | (2023.01) |
| G06Q 10/0639 | (2023.01) |
| G06Q 10/067 | (2023.01) |
| G06Q 30/012 | (2023.01) |
| G06Q 30/016 | (2023.01) |
| G06Q 30/0204 | (2023.01) |
| G06Q 40/02 | (2023.01) |
| G06Q 30/0202 | (2023.01) |

(52) U.S. Cl.
CPC ............ *G06F 8/36* (2013.01); *G06F 9/44521* (2013.01); *G06F 16/254* (2019.01); *G06F 30/20* (2020.01); *G06K 9/6256* (2013.01); *G06K 9/6264* (2013.01); *G06K 9/6282* (2013.01); *G06N 5/04* (2013.01); *G06N 20/00* (2019.01); *G06N 20/20* (2019.01); *G06Q 10/067* (2013.01); *G06Q 10/06316* (2013.01); *G06Q 10/06375* (2013.01); *G06Q 10/06393* (2013.01); *G06Q 30/012* (2013.01); *G06Q 30/016* (2013.01); *G06Q 30/0202* (2013.01); *G06Q 30/0204* (2013.01); *G06Q 40/025* (2013.01); *G06Q 40/08* (2013.01)

(58) Field of Classification Search
CPC ..... G06F 8/24; G06F 8/36; G06F 8/10; G06F 8/315; G06N 20/20; G06N 20/00; G06Q 30/012; G06Q 30/016; G06Q 30/0202; G06Q 30/024
USPC ........................................................ 717/108
See application file for complete search history.

(56) References Cited

U.S. PATENT DOCUMENTS

| | | | |
|---|---|---|---|
| 5,751,958 A | 5/1998 | Zweben | |
| 5,987,242 A | 11/1999 | Bentley et al. | |
| 6,029,144 A * | 2/2000 | Barrett ................... | G06Q 99/00 235/375 |
| 6,088,693 A | 7/2000 | Van Huben | |
| 6,519,767 B1 | 2/2003 | Carter | |
| 8,984,050 B2 | 3/2015 | Hanumolu | |
| 9,246,869 B2 | 1/2016 | Pfitzner | |
| 9,516,053 B1 * | 12/2016 | Muddu ............... | H04L 63/1416 |
| 9,542,466 B2 | 1/2017 | MacInnis | |
| 10,248,913 B1 | 4/2019 | Gururajan | |
| 10,366,053 B1 | 7/2019 | Zheng | |
| 10,594,718 B1 * | 3/2020 | Deaguero ............. | G06F 21/552 |
| 10,699,488 B1 | 6/2020 | Terrano | |
| 10,719,301 B1 | 7/2020 | Dasgupta | |
| 11,238,366 B2 * | 2/2022 | Bolding .............. | H04L 63/1416 |
| 11,334,665 B2 * | 5/2022 | Teo ......................... | G06F 21/56 |
| 2001/0047385 A1 | 11/2001 | Tuatini | |
| 2002/0138285 A1 | 9/2002 | DeCotiss | |
| 2003/0069871 A1 | 4/2003 | Yucel | |
| 2003/0090018 A1 | 5/2003 | Bulgrin | |
| 2004/0049773 A1 | 3/2004 | Yotsukura | |
| 2004/0064456 A1 | 4/2004 | Fong | |
| 2004/0133290 A1 | 7/2004 | Noble et al. | |
| 2004/0199517 A1 | 10/2004 | Casati | |
| 2005/0005261 A1 | 1/2005 | Severin | |
| 2007/0239595 A1 | 10/2007 | Setz | |
| 2010/0280927 A1 | 11/2010 | Faith | |
| 2013/0104109 A1 | 4/2013 | Edde | |
| 2013/0151491 A1 | 6/2013 | Gislason | |
| 2014/0046895 A1 | 2/2014 | Sowani | |
| 2014/0310056 A1 | 10/2014 | Alapati | |
| 2015/0170288 A1 | 6/2015 | Harton | |
| 2015/0199743 A1 | 7/2015 | Pinel | |
| 2017/0006135 A1 | 1/2017 | Siebel | |
| 2017/0017469 A1 | 1/2017 | Duggal et al. | |
| 2017/0052766 A1 | 2/2017 | Garipov | |
| 2017/0102931 A1 | 4/2017 | Risbood et al. | |
| 2017/0330058 A1 | 11/2017 | Silberman et al. | |
| 2018/0040064 A1 | 2/2018 | Grigg | |
| 2018/0136912 A1 | 5/2018 | Venkataramani | |
| 2018/0137191 A1 | 5/2018 | Yan | |
| 2019/0130404 A1 | 5/2019 | Merz | |
| 2019/0378207 A1 | 12/2019 | Dibner-Dunlap | |
| 2020/0082270 A1 | 3/2020 | Gu | |
| 2020/0134485 A1 | 4/2020 | Sood | |
| 2020/0160423 A1 | 5/2020 | Rakshit | |
| 2020/0349271 A1 | 11/2020 | Binkley | |

FOREIGN PATENT DOCUMENTS

| | | |
|---|---|---|
| CN | 105190564 | 4/2014 |
| CN | 105190564 B | 3/2018 |
| CN | 106022483 B | 6/2019 |
| GB | 2517932 | 7/2018 |
| KR | 10-2019-0019323 A | 2/2019 |
| WO | 0029943 A1 | 5/2000 |
| WO | 2005114921 A2 | 12/2005 |
| WO | 2017-081527 A1 | 5/2017 |

OTHER PUBLICATIONS

Title: Automatic extraction of object-oriented component interfaces, author: John Whaley et al, published on 2002.*
International Preliminary Report on Patentability in related international application No. PCT/US2020/035923 dated Dec. 7, 2021.
Non-Final Office Action in related U.S. Appl. No. 16/891,827 dated Jan. 27, 2022.
Wang et al., "Aggregate discounted warranty cost forecasting considering the failed-but-not-reported events," Reliability Engineering & System Safety, Dec. 2017, vol. 168, pp. 355-364, Elsevier, https://doi.org/10.1016/j.ress.2017.04.009.
Khan et al., "Object Oriented and Ontology Alignment Patterns based Expressive Mediation Bridge Ontology (MBO)," Journal of Information Science, Mar. 24, 2016, http://disi.unitn.it/~p2p/RelatedWork/Matching/J_191.pdf.
International Search Report and Written Opinion in related international application No. PCT/US2020/035923 dated Sep. 17, 2020 (10 pages).
Luca Bergesio et al., "An Object-Oriented Model for Object Orchestration in Smart Environments," The 8th International Conference on Ambient Systems, Networks and Technologies. Procedia Computer Science, 2017, 109C, pp. 440-447.
Sebastian Schelter et al., "On Challenges in Machine Learning Model Management," Bulletin of the IEEE Computer Technical Committee on Data Engineering. 2018.
Non-Final Office Action in related U.S. Appl. No. 16/891,858 dated May 26, 2022.

(56) References Cited

OTHER PUBLICATIONS

Final Office Action in related U.S. Appl. No. 16/891,827 dated Oct. 12, 2022, pp. 1-96.
Notice of Allowance in related U.S. Appl. No. 16/891,845 dated Nov. 23, 2022, pp. 1-14.
Venturelli et al.," Compiling quantum circuits to realistic hardware architectures using temporal planners," 2018 Quantum Sci. Technol. 3 025004, pp. 1-17.
Whaley et al., "Automatic Extraction of Object-Oriented Component Interfaces," ACM SIGSOFT Software Engineering Notes, vol. 27, Issue 4, Jul. 2002, pp. 218-228.
Sagarmalla, "Understanding the Object Version Number (OVN)," Oracle HCM Cloud—Techies Oct. 11, 2013, p. 1.
Wieringa, "Object Indentifiers, Keys, and Surrogates—Object Identifiers Revisited," Theory and Practice of Object Systems, 1(2), 1995, pp. 1-19.
Ratner et al., "Data Programming: Creating Large Training Sets, Quickly," Advances in Neural Information Processing Systems 29 (NIPS 2016), pp. 1-9.
Non-Final Office Action in related U.S. Appl. No. 16/891,863 dated Jan. 13, 2023, pp. 1-13.

\* cited by examiner

FIG. 7

ML-Label classes 7000

KPI class: 7001
- Subscription
- Purchase

Customer class: 7002
- All
- New
- At risk

Item class: 7003
- Model
- Options
- Customization

Horizon class: 7004
- Lifetime
- Time window
- Calendar

Pillar classes 7005

Scaled propensity
Cerebri Value 7006

Timing
Tē 7007

Affinity
CAFÉ 7008

Compound Best Action
SHARP 7009

Adjudication classes 7010

- Sequence
- Feature
- Economic optimization
- Horses for courses
- Layering
- Ensembling
- Publish/Subscribe modeling methodology classes 7011

Contextualization: 7012
- Binning
- Winnowing
- Select data sources
- KPIs

Binding: 7013
- Training datasets
- Test datasets
- Validation datasets
- Application datasets Governance: 7014
- OR criteria
- Operational criteria
- Actions allowed
- Action density

Deployment classes 7016

Realizations: 7017
- Cerebri Value
- Primary KPI
- Secondary KPIs

OQM: 7018
- DQM
- MDM
- SQM BQM
- LQM PQM governance: 7019
- CRUD
- Audit

50

MACHINE LEARNING PIPELINE OPTIMIZATION

CROSS-REFERENCE TO RELATED APPLICATIONS

This patent claims the benefit of U.S. Provisional Patent Application 62/856,713, filed 3 Jun. 2019, titled OBJECT-ORIENTED AI MODELING. The entire content of each aforementioned application is hereby incorporated by reference.

BACKGROUND

1. Field

The present disclosure relates generally to predictive computer models and, more specifically, to the creation and operation of numerous machine learning (and other types of artificial intelligence) models in a form that is modular, reusable, easier to maintain, faster to development, easily adapted and modified by data scientists and analysts alike.

2. Description of the Related Art

Data scientists today often struggle to manage predictive models that number in the dozens or hundreds. This is the case because of the ever-increasing appetite for predictive analytics, fueled by the existence of open source tools and libraries. Such computer models are often created or trained on different datasets, by those seeking to provide support and insights for different objectives. Some companies run tens of thousands of propensity models every month just to keep up.

Not only is the development of machine learning models time consuming, it creates a legacy of technology debt, and the constant drive to improve performance yields to the processing of the datasets is inconsistent from application to applications. The choice of feature management, labeling, selection of positive and negative machine learning classes, decision on which data is duplicated or redundant, which should be abstracted or aggregated varies from implementation to implementation.

Existing computer systems for managing machine-learning models are typically ill-suited for the diversity of contemporary models. In a wide range of use cases, machine learning models are used to predict how non-deterministic entities or complex entities with emergent properties will behave under specific circumstances. Machine learning has taken a bespoke and monolithic approach at times, confounding the selection of an algorithm tweaked to situation at end (a dataset and a business objective) as "modelling" rather than creating a functional and adaptable pipeline leveraging subject matter expertise for features, workflows, and ontologies. While the world of software design has moved to microservices, refactoring large applications into independently deployable services allowing scaling of releases and more complex integration, the machine learning world has been left behind, relying primarily on notebooks and single purpose/single flow models.

Indeed, prior manual approaches leave much to be desired. Merely automating such approaches fails to arm developers with tools needed for emerging levels of complexity in this field. Manual approaches often fail to reveal and account for higher-level classifications of functionality that will be useful for managing complexity in machine-learning deployments and reasoning about related code and models implemented by that code. As a result, such manual approaches, even if automated, often fail to surface modularity in a corpus of models and sufficiently facilitate re-use of and adaptation of models in related use cases.

SUMMARY

The following is a non-exhaustive listing of some aspects of the present techniques. These and other aspects are described in the following disclosure.

Some aspects include a process, including: forming, with one or more processors, a first plurality of classes using object-oriented modelling of modelling objects, the modelling objects being used to implement a machine learning design based on optimization criteria using an object-oriented modeling (OOM) framework, the first plurality of classes being members of a first class library; forming, with one or more processors, a second plurality of classes using object-oriented modelling of an orchestration of the machine learning design, the second plurality of classes being members of a second class library; forming, with one or more processors, a third plurality of classes using object-oriented modelling of the optimization criteria, the optimization criteria being used to optimize an orchestration of the modelling objects, the third plurality of classes being members of a third class library; forming, with one or more processors, a fourth plurality of classes using object-oriented modelling of the optimization of the orchestration of the modelling objects, the fourth plurality of classes being members of a fourth class library; forming, with one or more processors, a fifth plurality using object-oriented modelling of an optimization value, the fifth plurality of classes being members of a fifth class library; accessing, with one or more processors, an optimization criterion object from the third class library; accessing, with one or more processors, the third class library to determine first class definition information, the first class definition information being class definition information of the optimization criterion object; accessing, with one or more processors, the first class library to determine second class definition information; accessing, with one or more processors, the fourth class to determine third class definition information; using, with one or more processors, at least some of the first, second, or third class definition information to form a sequence of object manipulation function to effectuate access by an orchestration system to methods and attributes of at least some of the first, second, third, fourth, or fifth plurality of classes to manipulate objects of the first plurality of classes; using, with one or more processors, at least some of the first, second, or third class definition information to effectuate access to the object manipulation functions by the orchestration system; processing, with one or more processors, orchestration of modelling, the orchestration including statements seeking access to one or more modelling object classes among the first plurality of classes within the first class library; processing, with one or more processors, an optimization method of orchestration, the optimization method including statements seeking access to one or more orchestration object classes among the second plurality of classes within the second class library; processing, with one or more processors, optimization criteria of the optimization method, the optimization criteria including statements seeking access to one or more orchestration object classes among the second plurality of classes within the second class library; and invoking, with one or more processors, previously formed object manipulation functions using at least some of the sought access to activate the object manipulation functions during implementation by the optimization system of the optimization method, thereby causing use of the optimization to access modelling object classes among the first plurality of classes.

Some aspects include a process, including encoding a quality management process within model objects, where the encoded quality management process expands between data quality to model quality, score (performance), label (ontology governance), or bias.

Some aspects include a process of performing governance management processes embedded with components (modules) of modeling pipelines. This process may be used in model design, protection of Personally Identifiable Information (PII) audit, modification, certification, development, validation, testing, deployment, upgrade, and retirement.

Some aspects include a process of decoupling the development of modeling techniques from the characteristics of the datasets by creating the equivalent of patterns at multiple functional locations.

Some aspects include a process of decoupling labeling techniques from the labels themselves, expanding the nature and use of labels using classes of patterns and design patterns.

Some aspects include the decomposition of the modeling into racks of options of modeling steps and optimizing the selection of said options through a constrained or unconstrainted set of objectives.

Some aspects include the use of machine learning techniques and operational research techniques to reduce a search space.

Some aspects include processes to create sequences of actions that optimize in the aggregate and in the individual over pipeline performance.

Some aspects include a process of decoupling using message passing, decomposition of processing of data, and model transformation into organized collections of directed source-to-target mappings and publish/subscribe paradigm.

Some aspects may apply to a variety of use cases. A use case may predict whether a consumer is likely to make a purchase and determine whether to cause an advertisement to be conveyed to the consumer, e.g., whether to cause some form of message be to be conveyed to the consumer via email, text message, phone call, mailer, or the like, or a discount should be offered to the consumer. Another use case may predict whether a consumer is likely to submit a claim under a warranty and determine whether that consumer is qualified to be offered a warranty or price of the warranty. Another use case may predict whether the consumer is likely to pay off debt and determine whether the consumer should be offered a loan or credit card and terms, like interest rate or amount that can be borrowed. Another use case may predict whether a person is likely to become ill and determine whether that person should be offered insurance or terms of the insurance, like deductible or maximum coverage. Another use case may predict whether an industrial process, like an oil refinery, plastic manufacturing plant, or pharmaceutical manufacturing plant, is likely to operate out of tolerance and determine whether preventative maintenance is warranted.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

Some aspects include an implementation of the above with a distributed general-purpose cluster-computing framework, such as APACHE SPARK, APACHE STORM, APACHE HADOOP, APACHE FLINK, APACHE HIVE, SPLUNK, AMAZON KINESIS, SQLSTREAM, or ELASTICSEARCH.

BRIEF DESCRIPTION OF THE DRAWINGS

The above-mentioned aspects and other aspects of the present techniques will be better understood when the present application is read in view of the following figures in which like numbers indicate similar or identical elements:

FIG. 7 is a block diagram showing an embodiment of an OOM classes in accordance with some of the present techniques;

Figure 1:
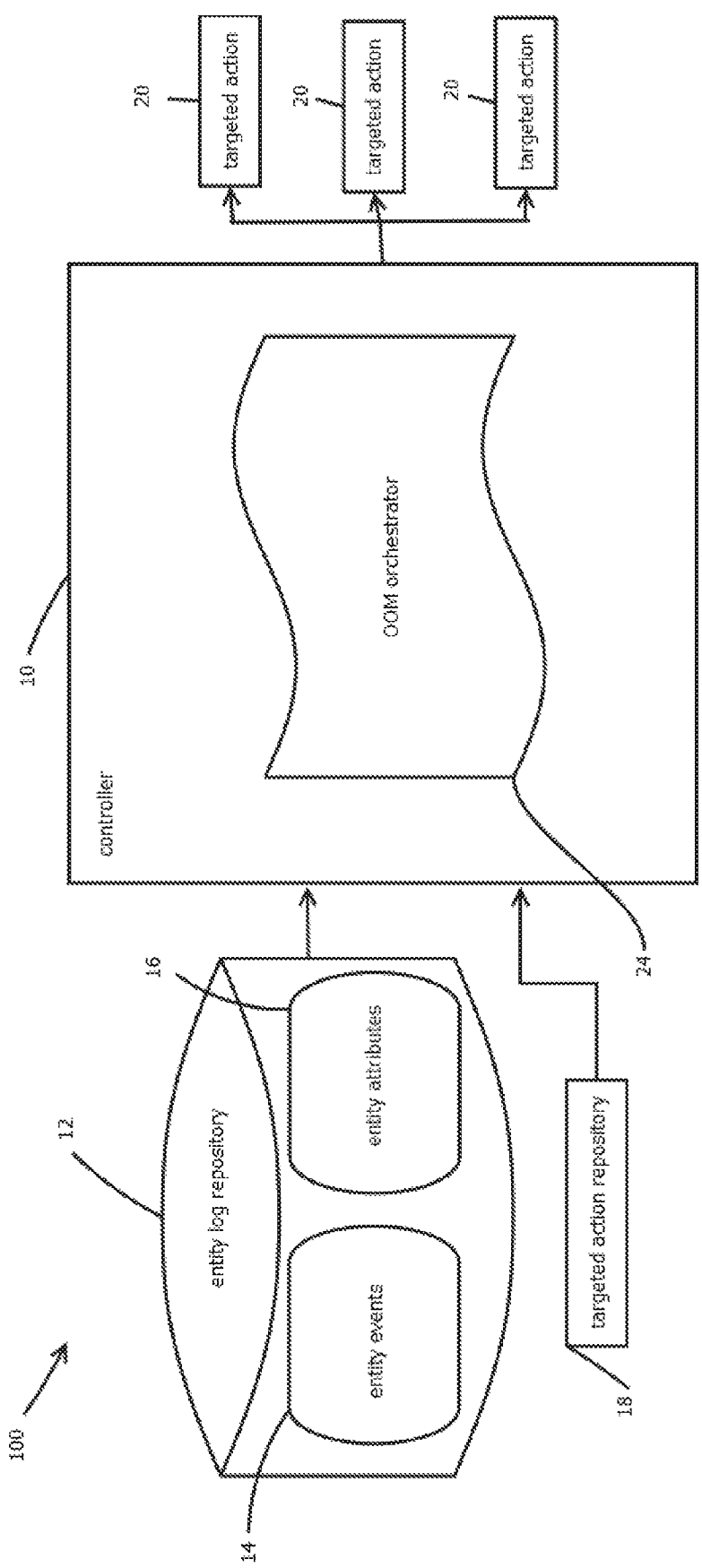
FIG. 1 is a block logical and physical architecture diagram showing an embodiment of a controller in accordance with some of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and data science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 is a schematic block diagram of an example of a controller 10, operating within a computing system 100, in which the present techniques may be implemented. In some embodiments, the computing system 100 may include an entity log repository 12, which in some cases may include entity events 14 and entity attributes 16. Entity events may include targeted actions, non-targeted actions, or both. The computing system 100 may further include a targeted action repository 18 and a plurality of potential targeted actions 20.

In some embodiments, the entity logs may be in the form of datasets. In some of the embodiments, there may be four types of datasets: training datasets, validation datasets, test (e.g., quality assurance) datasets, and application (or other types of target) datasets. A training dataset may be a dataset used to fit parameters of a model or to find patterns in the dataset. Training datasets may include pairs of an input vector and desired output targets. Based on the result of the comparison and the specific modelor object being used, the parameters of the modelling steps resulting from the binding of the modelor with the dataset may be adjusted for the sake of tuning or optimization (e.g., adjusting parameters of a model to move the output of an objective function closer to, or all of the way to, a local or global maximum or minimum). A validation dataset may be a dataset of examples used to tune the parameters of a model (modelor object binding with the dataset). A test dataset may be a dataset independent of the training dataset that exhibits the same, or similar, statistical and semantic properties as the training dataset. An application dataset may be a dataset independent of the training dataset used to put a model into production. In some embodiments, a dataset may be repeatedly split between training dataset and validation dataset for the purpose of cross-validation. Using association, datasets may be linked to create a dataset association. Another use of dataset association may be the association of target datasets segmented based on attributes. In some embodiments, segmentation may be based on time and datasets may be representations of periods of a business, such as week 1 data, week 2 data, etc. Through dataset association, comparison of performance of models and Key Performance Indicator (KPI) over time may be facilitated and may be used to trigger a retraining regime (itself implemented as a polymorphism in some cases). In some embodiments, different training datasets may be used for different modeling steps on a pipeline. In some embodiments, different validation datasets may be used for different modeling steps on a pipeline.

In some embodiments, obtained raw data may encode, or serve as a basis for generating, entity logs related to multiple different entities. Examples include records each describing a history of events associated with an individual respective entity, e.g., with a one-to-one mapping of logs to entities or with shared logs. In some cases, these events are events describing exogenous actions that impinge upon the entity, like messages sent to the entity, news events, holidays, weather events, political events, changes in vendors to an industrial process, changes in set points to an industrial process, and the like. In some cases, these events describe endogenous actions performed by the entity, like a purchase, a warranty claim, an insurance claim, a default, a payment of a debt, presenting with a health problem, and out-of-tolerance industrial process metric, process yield, weather phenomenon, and the like. In some embodiments, the events are labeled with some indicia of sequence, like an indicium of time, for instance, with date stamps or other types of timestamps. In some embodiments, the event logs are records exported from a customer relationship management system, each record pertaining to a different customer, and which may include the result of various transformations on such records. In some embodiments, entity events may include targeted actions (e.g., a targeted outcome), non-targeted actions, or both. In some embodiments, the actions include those described as being selected among in U.S. patent application Ser. No. 15/456,059, titled BUSINESS ARTIFICIAL INTELLIGENCE MANAGEMENT ENGINE, the contents of which are hereby incorporated by reference.

In some embodiments, entity logs may further include non-event attributes. The non-event attributes may include attributes of people, like psychometric or demographic attributes, like age, gender, geolocation of residence, geolocation of a workplace, income, number and age of children, whether they are married, and the like. In some embodiments, the non-event attributes may include attributes of a datacenter, for instance, a cooling capacity, an inventory of HVAC equipment therein, a volumetric flow rate maximum for fans, and the like. In some cases, such attributes may include values indicating transient responses to stimulus as well.

In some embodiments, a plurality of potential targeted actions 20 may include business objectives or target states of other non-linear, highly complex systems, like some forms of industrial process controls.

In some embodiments, the state to which the controller is responsive (e.g., in online use cases for publishers and subscribers) may be ingested in a subject-entity event stream 22. In some embodiments, the stream may be a real time stream, for instance, with data being supplied as it is obtained (e.g., within less than 10 minutes, 10 seconds, 1 second, or 500 milliseconds of being obtained) by, or in relation to, subject entities (e.g. subscribers), for instance, in queries sent as the data is obtained to request a recommended responsive action in view of the new information.

In some embodiments, a controller 10 may include a class-based Object-Oriented Modeling (OOM) orchestrator 24 (which in some embodiments may be referred to with the trade name CEREBRI) built around the concept of objects.

In some embodiments, OOM orchestrator 24 be based, in part, on the broad principles of Object-Oriented Programming (OOP). From the perspective of OOP, there may be differences arising from the inclusion and use of datasets, adaptation for machine learning development usage lifecycles, pipelines, self-improvement of models, design through composition, and multiple-purpose labeling (MUPL). In OOM, the application of the "code" to "data" may, at least in part, modify the code. That may not be the case in OOP. Unlike OOP, the code structure for OOM may be in multiple programming languages.

In some embodiments, OOM orchestrator 24 may implement functionality that includes one or more of: abstraction, aggregation, arbitrator, association, accessor, optimization, auditor, binding, orchestration, composition, composition sheets, composition association, Concurrent Ontology Labelling Datastore (COLD), contextualization, cross-contextualization, dataset, dataset association, data streams, encapsulation, governance, inheritance, labelling, messaging, modelor, orchestration, policing, policors, object-oriented modeling (OMM), object-oriented quality management (OQM), object-publish-subscribe modeling (OPSM), pipelining, realization, targeting, and winnowing.

In some embodiments, OOM orchestrator 24 may have various types of classes, including: pillars, ontologies, modelor, models, datasets, labels, windows, and customer journeys. In some embodiments, these techniques may be implemented in conjunction with the predictive systems described in U.S. patent application Ser. Nos. 15/456,059; 16/151,136; 62/740,858 and 16/127,933, the contents of which are hereby incorporated by reference, e.g., by leveraging the data models therein, providing outputs that serve as features thereof, or taking inputs from these systems to form input features of the techniques described herein.

In some embodiments related to OOM, a class may be a program-code or program-data template used to create objects.

One of the challenges in bringing machine learning and object-oriented concept together may be managing vocabulary. In machine learning, features may be individual measurable properties or characteristic of a phenomenon being observed. Features may be at times referred to as attributes. In some embodiments, a feature may be referred as an independent variable, a predictor variable, a covariate, a regressor, or a control variable.

In object-oriented design, attributes may be elements of an object or class definition. In some embodiments, when a concept may have dual meaning (ML for machine learning, OO for object Oriented), a prefix of ML or OO may be applied, accordingly. This convention applies, among others, to labels, classes, attributes, and methods whenever there is ambiguity.

In some embodiments, an element of CEREBRI may be a rack class. A rack is a framework or a pattern for a canonic modeling step without the instantiated of a data set and application to the dataset.

In some embodiments, an element of CEREBRI may be a modelor class. A modelor is a framework or a pattern for a modeling step without the instantiated of a data set and application to the dataset. It may be decoupled from the modeling step itself. A modeling step may be created by binding a dataset or a dataset association with a modelor. A modeling step may be used to perform computation, transformation, or mapping on a whole or a part of a dataset. Modelors that aim to achieve the same functionality in a modeling pipeline may belong to the same rack. Modelors may be parametrized. In some embodiments, these parameters may be attributes. In some embodiments, an attribute set of modelors may be governance attributes that may be leveraged prospectively or retrospectively. An attribute may be a type of intellectual property rights of the modelor code, for example, the type of license of the code (e.g., open source or proprietary).

In some embodiments, an element of CEREBRI may be an orchestration. A CEREBRI orchestration may have two sub-domains: A data domain that transforms data into objects, and an AI (artificial intelligence) domain that transforms these objects into results. These results can be score, indexes, lists, ranked order lists among others. Each sub-domain in an OOM based machine learning solution requires a nominal set of steps to be executed in sequence and/or in parallel.

In some embodiments, orchestration may be an organization of a collection of steps that perform a specific objective when executed by a computing system. Orchestrations may operate on objects to create new objects and thus may be recursive. In some embodiments, there are two types of orchestration in CEREBRI: modelor orchestrations and model orchestrations.

In some embodiments, modelor orchestrations may perform manipulations and computations based on modelor objects to create pipelines. An orchestration bound to at least one dataset is an example of what is referred to as a pipeline.

In some embodiments, an element of CEREBRI may be optimization. The CEREBRI optimization may be akin to a compiler function that selects which modelors to be used and what parameters of these modelors should employed. In some embodiments, one or more modelors may be chosen from each rack. In some embodiments, no modelor is chosen from at least some of the racks. The parameters of the modelors and the order of the racks may be optimized for one or more objective functions based on the constraints of a modelor governance. The time horizon, location horizon, and datasets horizon may be set. The organization of the modelors to be optimized may be carried out through heuristics, operation research, or machine learning itself.

In some embodiments, optimization may use one or more of a random forest-based approach (e.g., an ensemble of models trained with classification and regression trees (CART)), simulated annealing, reinforcement learning, genetic algorithm, gradient descent, and R-Learning. The optimization methods may include: Bayesian search, Boruta, and Lasso. In some embodiments, optimization methods may be constrained through hard limitations, governance limitations, and regularization.

In some embodiments, a pipeline may be implemented in at least one programming language. The underlying method used for the computations or manipulations is an example of what is referred as a sheet. In some embodiments, sheets may be designed through a procedural programming framework, a hyper-parameter optimization, database queries, scripting, stored procedure, Directed Asynchronous Graph (DAG) Application Programming Interface (API) calls, or Source to Target Mapping (STM). In some embodiments, a sheet may be compiled into a single archive allowing runtime to efficiently deploy an entire pipeline (or a selected portion,), including its classes and their associated resources, in a single request. In some embodiments, a modeling orchestration may be executed using an engine such as STREAMSETS, APACHE NIFI, APACHE PULSAR, APACHE KAFKA, RABBITMQ, NATS, FIREBASE, PUSHER, SIGNALR, DATABRICKS, SOCKET.IO, OSISOFT PI, or APACHE HERON.

In some embodiments, objects or data being orchestrated through sheets may be written in SCALA. In some embodiments, objects or data being orchestrated through sheets may be written in JAVA. The objects or the data being orchestrated may be compiled into jar files and stored on a JAVA Virtual Machine (JVM). In some embodiments, a sheet (configurable and configured by data scientists) of a composition of the objects or data may be stored in JSON (JAVASCRIPT object notation). In some embodiments, a pipeline may be written in PYTHON, SCALA, and SQL (structured query language). A sheet may describe the flow of data or messages from origin objects to destination objects and may also define how to access, mutate, map, validate, and bind the data, dataset, or messages along the way. Embodiments may use a single source object to represent the origin object, multiple processors to mutate data and objects, and multiple destination stages to represent destination object. In some embodiments, embodiments may use an object that triggers a task when it receives a message. To process large volumes of data, embodiments may use multithreaded sheets or cluster-mode sheets.

In some embodiments, when a sheet is generated though a design process using OOM, embodiments may create a new corresponding sheet for a target platform through inheritance.

In some embodiments, a sheet may be compiled into a single archive allowing runtime to efficiently deploy an entire application, including its classes and their associated resources, in a single request. In some embodiments, an orchestration may be executed with the aid of an interpreter.

In some embodiments, a class of modelors may be an example of what is referred to as pillars. Pillar classes may purport to support elements of machine learning systems. Pillar classes may answer questions such as:
 a. Who will engage in an action,
 b. Commitment or loyalty to a brand,
 c. Commitment to spend,
 d. Commitment to tenure (and counter churn away),
 e. Timing propensity of engagement,
 f. Affinity for choices of engagement (including location and channel) from selections,
 g. Affinity for choices of engagement for synthesized selections,
 h. Action to be set engagement,
 i. Clustering of attributes or behaviors,
 j. Classification, and
 k. Product or service recommendations.

In some embodiments, pillars may use advanced modeling, operation research, optimization, statistical analysis, and data science techniques (e.g., machine learning modeling techniques MLMTs) that may be applied to datasets that have been processed through pipelines. Datasets may change throughout pipelines that may include growing and shrinking in sizes, and growing and shrinking in dimensionality.

In some embodiments, different MLMTs may be used, including: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAD)), Decision Stump, M5, Conditional Decision Trees, Naive Bayes, Gaussian Naive Bayes, Multinomial Naive Bayes, Averaged One-Dependence Estimators (AODE), Bayesian Belief Network (BBN), Bayesian Network (BN), k-Means, k-Medians, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Reinforcement Learning (RL), Deep Boltzmann Machine (DBM), Deep Belief Networks (DBN), Convolutional Neural Network (CNN), Stacked Auto-Encoders, Dimensionality Reduction Algorithms, Principal Component Analysis (PCA), Principal Component Regression (PCR), Partial Least Squares Regression (PLSR), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence such as but not limited to evolutionary algorithms, PageRank based methods, Computer Vision (CV), Natural Language Processing (NLP), and Recommender Systems.

In some embodiments, an engagement in an action may be measured through monetary propensity techniques, such as the ones described in U.S. patent application Ser. No. 16/127,933, the contents of which are hereby incorporated by reference. The timing or distribution of timing in an action may be measured through timing propensity techniques such as the ones described U.S. Patent Application 62/847,274, the contents of which are hereby incorporated by reference. The location affinity in an action may be measured through journey propensity techniques, such as the ones described in U.S. Patent Application 62/844,338, the contents of which are hereby incorporated by reference.

In some embodiments, OOM may improve model development, readability, data engineering transformations, applicability to multiple datasets, applicability to multiple contexts, reusability by reducing the dimensionality, and complexity of machine learning program or set of programs efficiently. OOM concepts may allow creation of specific interactions between modelor objects that may create new modelor objects for scoring, actioning, listing, or recommending based on data collected over a collection of items, period of time, geographic intent, or categorical definitions. Datasets may be bound to modelors to create modeling steps. Modeling steps may be applied to target datasets to realize predictions, support decisions, find structure in data, find patterns, detect outliers, and classify items, cluster items, and optimized objective functions, while maintaining explicit or implicit restrictions, without always being explicitly programmed to perform the purposed realizations.

In some embodiments. CEREBRI may use abstract classes. In some embodiments, an abstract class is a superclass (e.g., a parent class) that cannot be instantiated. Embodiments may need to instantiate one of its child classes to create a new object. Abstract classes may have both abstract and concrete objects. Abstract objects may contain only object signature, while concrete objects may declare a modelor object body as well, in some embodiments.

In some embodiments, labelling includes adding tags to data. Augmenting data with labels may make it more informative and more manageable. One use of labelling in object-oriented modeling may be management of labels, not as elements in a list or table, but as objects allowing a collection of tags to be used. As objects, OO-labels may be managed and organized through enforced set of grammar and semantic rules. One attribute of an OO-label may be a user facing text for sake of user experience (UX). In some embodiments, OO-labels may be used in a single ontology used for multiple customers, each with a ML-label for their business realizing a MUPL. OO-labels may encode metadata about a dataset, control information, and governance information among other things.

Using a single ontology for multiple customers in CEREBRI may have advantages, including the ability to have different representations of information for different purposes. In some embodiments, this technique may be used to provide label text in different languages. That said, embodiments are not limited to systems that afford these advantages, which is not to suggest that any other described attributes are limiting.

In some embodiments, an element of CEREBRI is the Concurrent Ontology Labelling Datastore (COLD) methodology implemented in code of CEREBRI. In CEREBRI OOM, OO-labels may be governed by an ontology (an organization of information). Ontology in COLD may be domain specific (e.g., in telco or insurance) or domain independent (e.g., in marketing or interactive voice response (IVR)) COLD framework for superclass/subclass inheritance. In some embodiments, this approach may be enforced through a labelling format to a specific grammar or syntax inside OO-labels via attributes. In some embodiments, OO-labelling may map a customer/consumer/user facing labels (the ML-label) to a generic ontology through a feature of the OO-labels. COLD, in some cases, is expected to facilitate efforts by data scientists and software developers to have a "dual-ledger" view of labels, one internal to the pipeline sheet (that is implementation and coding) and one external for governance, quality, or user interface requirements.

In some of the embodiments related to machine learning, new features (which may increase dimension of datasets) may also be obtained from old features using a method known as feature engineering using knowledge about a problem to create new variables. In some embodiments, while feature engineering may be part of the application of machine learning, it may be difficult and expensive in terms of time, resource, and talent perspective. In some embodiments, CEREBRI may use object-publish-subscribe modeling to convey improvements in feature engineering from one object to another.

In some embodiments related to machine learning, features that may not be helpful in the performance of the models may be removed (which may decrease in dimensionality of datasets); this is an example of what is referred to as feature selection. Feature selection may be helpful in terms of the required time, resource, and talent perspective. In some embodiments, CEREBRI may use object-publish-subscribe modeling to convey improvements in feature selection from one object to another.

In some embodiments, OOM may create a generic feature engineering methodology, through polymorphism or inheritance, to optimize on a basis of a business domain or a vertical market.

In some embodiments, polymorphism (i.e., one name in many forms) may facilitate reuse of objects (e.g., objects with the same name, or symbol by which they are represented) in use cases implicating different functionality. In some embodiments, polymorphism may be used to declare several modelor objects with the same name until the objects are different in certain characteristics, such as context or segment within a dataset. In some embodiments, polymorphism may be used to declare several model objects with the same name until the objects are different in certain characteristics, such as context. By using a modelor overriding feature, some embodiments may override modelor objects of a parent class from its child class.

In some embodiments, inheritance may facilitate extension of a class with child classes that inherit attributes and methods of the parent class. Inheritance may facilitate achieving modeling reusability. A child class may override values and modelor objects of the parent class. A child class may also add new data and functionality to its parent or shield details of the parent class. Parent classes are also known as super classes or base classes, while child classes are also known as subclasses or derived classes. Inheritance may extend components without any knowledge of the way in which a class was initially implemented, in some embodiments. Declaration options, such as Public and Private, may dictate which members of a superclass may be inherited, in some embodiments. Objects may relate to each other with either a "has a", "uses a" or an "is a" relationship, wherein the later may be an inheritance relationship, in some embodiments.

In some embodiments, consistency of implementation for datasets may be achieved by using the same polymorphic structures on multiple model objects.

In some embodiments, targeting may refer to design or use of a modelor or an orchestration towards a specific goal, purpose, or intent. Targeting of a model may include the definition and availability of a target dataset.

In some embodiments, datasets may be objects that represent collection of related set of information composed of individual variables that may be manipulated individually or collectively. The data inside a dataset may include sets or collection of examples that may be factors, events, items, or journeys. A journey is a collection of events organized along one or more timelines.

In some embodiments, an element of CEREBRI may be object-publish-subscribe modeling (OPSM) framework. In some of the embodiments using OPSM, senders of messages (e.g., publisher objects) do not choose the messages to be sent directly to specific receivers (e.g., subscriber objects). Publishers may categorize published messages into topics (which may be objects themselves) without the knowledge of which subscriber objects, if any, there are. Messages may be generated based on logic inside publisher objects. Similarly, subscriber object may express interest in one or more classes and only receive messages that are of interest, without the knowledge of which publishers, if any, there are. OPSM may be used for feature engineering. OPSM may also be used for introducing new data sources. In some embodiments, OPSM may be used to create an audit trail of performance by having OQM be the publisher. OPSM may be used to leverage Source-to-Target Mapping (STM). STMs may include sets of data transformation instructions that determine how to convert the structure and content of elements of datasets in the source system to the structure and content needed in the target system. STMs may assist modelors in efforts to identify columns or keys in the source system and point them to columns or keys in the target systems. Additionally, modelors may map data values in the source system to the range of values in the target system. OPSM may allow the processing of data in a batch mode, in a streaming mode, or in a combination thereof, in some embodiments.

Topics may be organized through ontologies allowing constructions of subtopics, in some embodiments.

In some embodiments, an element of CEREBRI is datastream. Data streams may be a time-sequenced (e.g., timestamped) set of messages that share the same source and the same destination. Data stream may be instantiated by binding an element of a dataset with another element of a dataset for the purpose of staging transformations, in some embodiments.

The topic in an OPSM may be a data stream.

In some embodiments, attributes may be in the form of properties, features, contexts, state-machine state, or components among others.

In some embodiments, an auditor may be a specific class that captures historical information about multiple aspects of an operation. In some embodiments, auditor may subscribe to the attribute history of key objects. Auditors may be used for governance management.

In some embodiments, quality Management (QM) in an object-oriented modeling paradigm that may be implemented as a process that integrates raw data ingestion, manipulation, transformation, composition, and storage for building artificial intelligence models. In legacy designs, quality management may include (and in some cases may be limited to) Extract, Transform, and Load (ETL) phases of effort and to the reporting of model performance (e.g., recall, precision, F1, etc.) from an end to end perspective as a quality.

Deposition of design process and operation of models, developed using OOM into objects, may facilitate efforts to cause quality to be embedded in objects. Quality may be attributes of objects. Modelor, bound modelors, and pipelines may be managed through multiple lifecycles rather than a single one. In some embodiments, Object-Oriented QM (OQM) may have six components:

a. Data quality monitoring (DQM): DQM measures, not necessarily exclusively (which is not to suggest that other lists are exclusive), new or missing data source (table) or data element, counts, mull count and unique counts, and datatype changes. DQM may be used to figure out which data sources are reliable.

b. Model quality monitoring (MQM): MQM may measure, not necessarily exclusively (which is not to suggest that other lists are exclusive), model-based metrics, such as F1, precision, recall, etc., or data, and triggers retraining for drift.

c. Score quality monitoring (SQM): SQM may perform model hypothesis tests, including Welch's t-test (e.g., parametric test for equal means) and the Mann-Whitney U-test (e.g., non-parametric test for equal distributions). SQM may also compute lift tables, a decile table based on the predicted probability of positive class membership, with the cumulative distribution function of positive cases added in. The gain chart is a plot of the cumulative distribution function of positive cases may be included as a function of quantile.

d. Label quality monitoring (LQM): Labels may be categorical and bound by semantic rules or ontologies. LQM may be used to understand which data sources are leverageable and impactful. LQM may be used for data debt management and enhancing compositions for performance.

e. Bias quality monitoring (BQM): Bias is a systematic distortion of the relationship between a variable, a data set, and results. Three types of bias may be distinguished: information bias, selection bias, and confounding, in some embodiments.

f. Private quality monitoring (PQM): Privacy may cover personally identifiable information and access of privileged information.

In some embodiments, OQM attributes may include count, unique count, null count, mean, max, min, standard-deviation, median, missing data source, new data source, missing data element, new data element, sparsity of reward, data type change, Accuracy, Precision, Recall, F1, ROC AUC, TPR, TNR, 1-FPR, 1-FNR, brier gain, 1-KS, lift statistic, CV Area under Curve, 1-CV turn on, CV plateau, 1-brier turn on, brier plateau, MAPk, TkCA, Coverage, entropy coverage, MAPk cohort, TkCA population, action percentage change, no action percentage change, action frequency rate, action recency rate, normalized action frequency rate, normalized action recency rate, expected reward, direct method, inverse propensity method, doubly robust method, weighted doubly robust, sequential doubly robust, magic doubly robust, incremental response rate, net incremental revenue, Mann Whitney Wilcoxon's U test, decile analysis test, effect size test, and economic efficiency.

In some embodiments, abstraction and encapsulation may be tied together. Abstraction is the development of classes, objects, types in terms of their interfaces and functionality, instead of their implementation details. Abstraction applies to a modelor, a modeling orchestration, a pipeline, datasets, or some other focused representation of items. Encapsulation hides the details of implementation.

In some embodiments, modeling abstraction in CEREBRI may conceal complexity from users and show them only the relevant information. Modeling abstraction may be used to manage complexity. Data scientist and operation research developers may use abstraction to decompose complex systems into smaller components. In some embodiments, if one wants to leverage a propensity pillar modelor object, one may not need to know about its internal working and may just need to know the value and context for usage. In some embodiments, if a modelor object wants to factor in a sentiment modeling, embodiments may not need to know about its internal natural language processing working, and may just need to know the value and context for usage in other modelor objects. The same might be true of CEREBRI classes. Embodiments may hide internal implementation details by using abstract classes or interfaces. On the abstract level, embodiments may only need to define the modelor object signatures (name, performance list, combination restriction, privacy-rules, and parameter list) and let each class implement them independently.

In some embodiments, encapsulation in CEREBRI may protect the data and configuration stored in a class from system-wide access. Encapsulation may safeguard the internal contents of a class like a real-life capsule. CEREBRI pillars may be implemented as examples of fully encapsulated classes. Encapsulation is the hiding of data and of methods implementation by restricting access to specific objects. Embodiments may implement encapsulation in CEREBRI by keeping the object attributes private and providing public access to accessors, mutators, validators, bindors, contextors, and policors to each attribute.

In some embodiments, accessors may be CEREBRI public objects used to ask an object about itself. Accessor objects may be not restricted to properties and may be any public modelor object that gives information about the state of the object. When an object is a model or modelor, it may embed a machine learning state that is ML-State. The state of the object may be to a large degree a superset the machine learning state of a model that captures latent, Markov, reward, quality, or governance information.

In some embodiments, mutators may be CEREBRI public objects used to modify the state of an object, while hiding the implementation of exactly how the modifications take place. Mutators may be suited for feature engineering and for source to target mapping.

In some embodiments, contextors may be CEREBRI public objects used to modify metadata, control, configuration, and data of a dataset object, while hiding the implementation of how the data gets modified. A contextor may be used to reduce the range of event timing to consider defining a positive ML-class. Contextors may be used to cross-contextualize datasets used in composition of model objects.

In some embodiments, bindors may be CEREBRI public objects used to associate a specific dataset to a modelor. Bindors may be a specific type of mutator. Binding may include the association of modelor object (developed as a single modelor object or the result of a composition) to a dataset or data-stream.

In some embodiments, arbitrators may be CEREBRI public objects used to replace one object with another one from the same class. Arbitrators may be used for automatic update of modelor, orchestrations, and pipelines.

In some embodiments, validators may be CEREBRI public objects ensuring, integrity, governance, and quality objects (e.g., quality management objects) used to ensure no data linkage or inconsistency of datasets, ML-labels, performance (OQM) and windows of processing. Validators may check database consistency applied to aspects of an OOM. A function of validators may be triggering retraining of part or complete pipelines based on quality or operational triggers.

In some embodiments, governance in CEREBRI may be a set of structures, processes and policies by which pipeline development, deployment, and use function within an organization or set of organizations is directed, managed, and controlled to yield business value and to mitigate risk.

In some embodiments, a policy in CEREBRI may refer to set of rules, controls, and resolutions put in place to dictate model behavior individually and as a whole. Policies are a way governance is encoded and managed in some embodiments. The policy items are referred to as policors and implemented as CEREBRI objects. As the number of rules increase, a policy-driven OOM may suffer from inconsistencies incurred by contradicting rules governing its behavior. In some embodiments, meta-policies (e.g., detection rules) may be used for the detection of conflicts. In some embodiments, policy relationships may be used. In some embodiments, attribute-based applicability spaces may be used.

In some embodiments, contextualization in CEREBRI may refer to restriction of datasets to certain ranges in time, space, domain, object types count, users, to accommodate the business and quality requirement of specific use cases. The contextualization may be affecting the dataset used to train (generate) the modelling steps (the one bound with a modelor). Contextualization may be affecting the dataset to which a model is being applied.

In some embodiments, cross-contextualization in CEREBRI may be implemented as a process to verify that the datasets used in models are quantitatively and qualitatively compatible and valid. A validity check may ensure (or reduce) no data linkage. A dataset used for training may not be validated on itself or part of itself, in some embodiments.

A dataset training may include information available at the moment of the training, not future data. Cross-contextualization may be performed through contextors, objects that compare datasets across different pipelines and across different modeling steps.

Winnowing is the concept of limiting the scope or dimensionality of a dataset. In some embodiments, winnowing may be achieved through a judicious use of accessors and mutators. Some embodiments of winnowing may be in the time domain (e.g., shortening a time range). Some embodiments of winnowing may be geography (e.g., reducing the geographic range). Some embodiments of winnowing may be ontological (e.g., reduce branches and leaves of a taxonomy, reduce predicates in subject-predicate-object). Some embodiments of winnowing may be binning numerical attributes into categorical attributes.

In some of embodiments, a publisher objects' subscription may be to a class of objects or public attributes to the class. This capability of OOM may be used for feature engineering. In some embodiments, the pillar dealing with time optimization (e.g., Té) may be emphasized. Many KPIs have a timing element assigned to them (e.g., propensity to buy have a time dimension assigned to it). Churn may have an inherent timing dimension. Rather that optimizing separately, models for those KPIs may subscribe to the Te engineered features. If the performance change, relearning will be trigged through validators. Another use of the OPSM is ensembling.

In some embodiments of inheritance, embodiments may implement a multi-channel or omnichannel marketing campaign. The campaign may leverage to email, mails, in-store displays, or text message. At some level, all of these items may be treated the same: All four types may involve creative, cost money to produce, have the same geographical market area and lifetime. However, even though the types may be viewed as the same, they are not identical. An email has email address, a store display does not. Each of these marketing campaign's assets should be represented by its own class definition. Without inheritance though, each class must independently implement the characteristics that are common to channel assets. All assets may be either operational, ready to deploy, or deprecated. Rather than duplicate functionality, inheritance is expected to facilitate re-use of functionality from another class.

Inheritance may be used to take a modeling step or pipeline and applying it to a subset of the original dataset. In some embodiments, this is accomplished by binding to a more restrictive dataset.

Inheritance may be used for feature engineering. In some embodiments, this is accomplished by defining broad features on the superclass and narrower features in the child class.

In some embodiments, polymorphism may be used to repurpose a model in OOM. In some embodiments, an upsell model (e.g., pushing an existing customer to buy a more expensive version of an item she/he owns) may be developed based on a modelor and dataset (one that is bound). The model's purpose may be for a business broad customer base. There may be, however, segments of customers within this base. They may include (1) customers who buy on a regular basis, (2) customers who are at risk, and (3) customers who own a specific item. At first glance, these customers may be treated the same after all. They may have a name, account number, contact information, customer journey. All four types represent rightful targets for the upsell activities. However, even though the three types of customers may be viewed as the same, they are not identical because of the journeys. For maximum performance, each of these customer segments may be represented by its own class definition.

In some embodiments, CEREBRI may provide two ways to implement polymorphism: object overloading (e.g., build-time polymorphism) and object overriding (e.g., run-time polymorphism or dynamic polymorphism). Modelor object overloading happens when various modelor objects with the same name are present in a class. When they are called, they may be differentiated by the number, order, context, and types of parameters. In some embodiments, the type of parameter in the object signature is indication of engineering feature. Modelor object overriding may occur when the child class overrides a modelor object of its parent.

Association may be implemented with the act of establishing a relationship between two unrelated classes. A specific type of association is binding. Embodiments may perform association when declaring two fields of different types (e.g. car purchase and car service) within the same class and making them interact with each other. The association may be a one-to-one, one-to-many, many-to-one, or many-to-many relationship.

One of the associations is dataset association where embodiments may establish that multiple datasets are related and binding them to the same sets of modelors.

Another example association is the association of a development pipeline with a production pipeline. This may be used to accelerate the translation of a pipeline using one coding language for its sheet (e.g. PYTHON) to another (e.g. SCALA). This may be used to move from an interpreted sheet to a compiled sheet.

In some embodiments, aggregation may be a kind of association. It may occur when there is a one-way "has a" relationship between the two classes associated through their objects. For example, every marketing message has a channel (email, mail, or text) but a channel does not necessarily have a marketing message.

In some embodiments, OOM may cause resulting model objects to manage their life-cycle autonomously by leveraging dataset association or modelor association. This ability coupled with micro-services may help with operational resiliency.

In some of the embodiments, related to OOM, training may not be the same for all elements of a pipeline.

In some embodiments, OOM may include the following:
a. A modeling object KOT performs feature engineering for models dealing with reducing Churn,
b. A modeling object YOR performs KPI estimations for churn based on model YR and the bound training dataset YMT and the bound validation dataset YVT,
c. The modeling object YOR subscribes to the time-feature-engineer topic for Churn,
d. A Governance object GOT subscribes to all topics,
e. The modeling objects KOT find that changing the training set from YMT to YMT' (that uses features that at least some of them are different from YMT features) improves the performance of models,
f. KOT uses OPSM to publish YMT' as better training model for churn models,
g. Governance object GOT uses polymorphism to create modelor YR' from YR,
h. Modelor YR binds with YMT' to create YOR', and
i. GOT sends appropriate arbitrator to replace YOR with YOR'.

Another aspect of OOM is the ability of OOM modeling steps or entire pipelines objects to improve their performance semi-autonomously by leveraging association and OOPS. This may be accomplished through OQM assessing the impact of including a new set of data sources, and or feature engineered attributes.

In some embodiments, OOM may include the following:
a. A modeling object SOT is performing feature engineering on the time dimension. Feature engineering may include recency feature engineering, frequency feature engineering, lag feature engineering, difference feature engineering, and harmonic analysis feature engineering, as described in U.S. Patent Application 62/748,287, the contents of which are incorporated by reference. Recency features may leverage the last time an event took place. Lag feature engineering may be used extensively by organizing timelines into periods. In difference features engineering, the features are generated by creating the difference of a given feature of any kind between two consequent periods or subsequent periods,
b. Object SOT uses OPSM to publishes engineered features definitions as a time-feature-engineer topic,
c. Modeling object TOR performs KPI estimations based on modelor TR bound with training dataset ZMT and validation dataset ZMV,
d. Modeling object SOT creates new set of engineered features FF',
e. Modelor TR spawns modelor TR,
f. Modeling object TOR uses inheritance on ZMT to spawn dataset ZMT' that includes features FF'.
g. Modeling object TOR uses inheritance on ZMV to spawn dataset ZMV' that includes features FF',
h. Modeling object TOR uses inheritance to modeling object TOR',
i. Model object TOR binds modelor TOR' with ZMT', ZMV', ZMA' to create modeling TR',
j. Quality object QOR uses an accessor to gather the performance of SQM for TR' on validation data,
k. Quality object QOR compares performance (which can be a variety of measurements) of SQM for TR' and TR,
l. If the performance of TR' is worse than performance of TR, QOR messages to appropriate arbitrator to delete TR', TOR', ZMT', ZMV', and
m. If the performance of TR' is better than performance of TR, QOR messages to appropriate arbitrator to replace ZOR with ZOR', ZR with ZR', ZMT with ZMT', ZMV with ZMV'.

Figure 2:
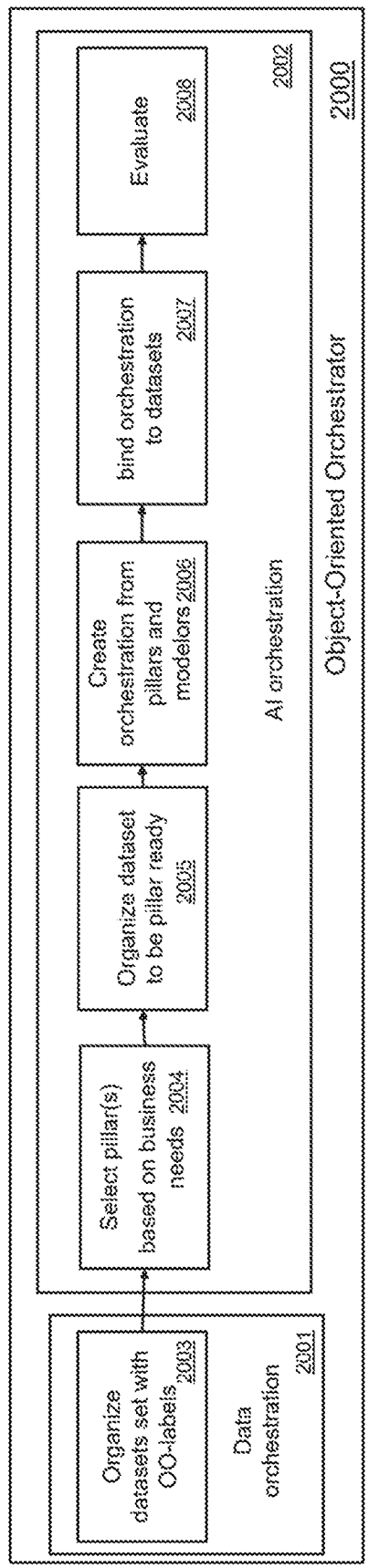
FIG. 2 is a block diagram showing an embodiment of an object-orientation orchestrator in accordance with some of the present techniques.

FIG. 2 is a diagram that illustrates an exemplary architecture 2000 of object-oriented orchestration in accordance with some of the embodiments of the present disclosure. Various portions of systems and methods described herein may include or be executed on one or more computer systems similar to orchestration system called object-orientated orchestrator 2000. An object-orientated orchestrator may include two functional areas: a data orchestration module 2001 and an artificial intelligence (AI) orchestration module 2002.

In some embodiments, inside data orchestration module 2001, data may be transformed through process module 2003 into datasets with OO-labels.

In some embodiments, inside AI orchestration module 2002, the processing of objects may take place. Firstly, one or more pillars may be selected based on business needs (2004). Based on those choices, datasets may be prepared (as shown in block 2005) for use by the pillars. An orchestration may be composed in module 2006 to create a modeling framework. This modelor may be then bound to one or more datasets in module 2007 through the process of binding to create one or more pipelines. In the next step, formed pipelines may be then evaluated in module 2008.

Figure 3:
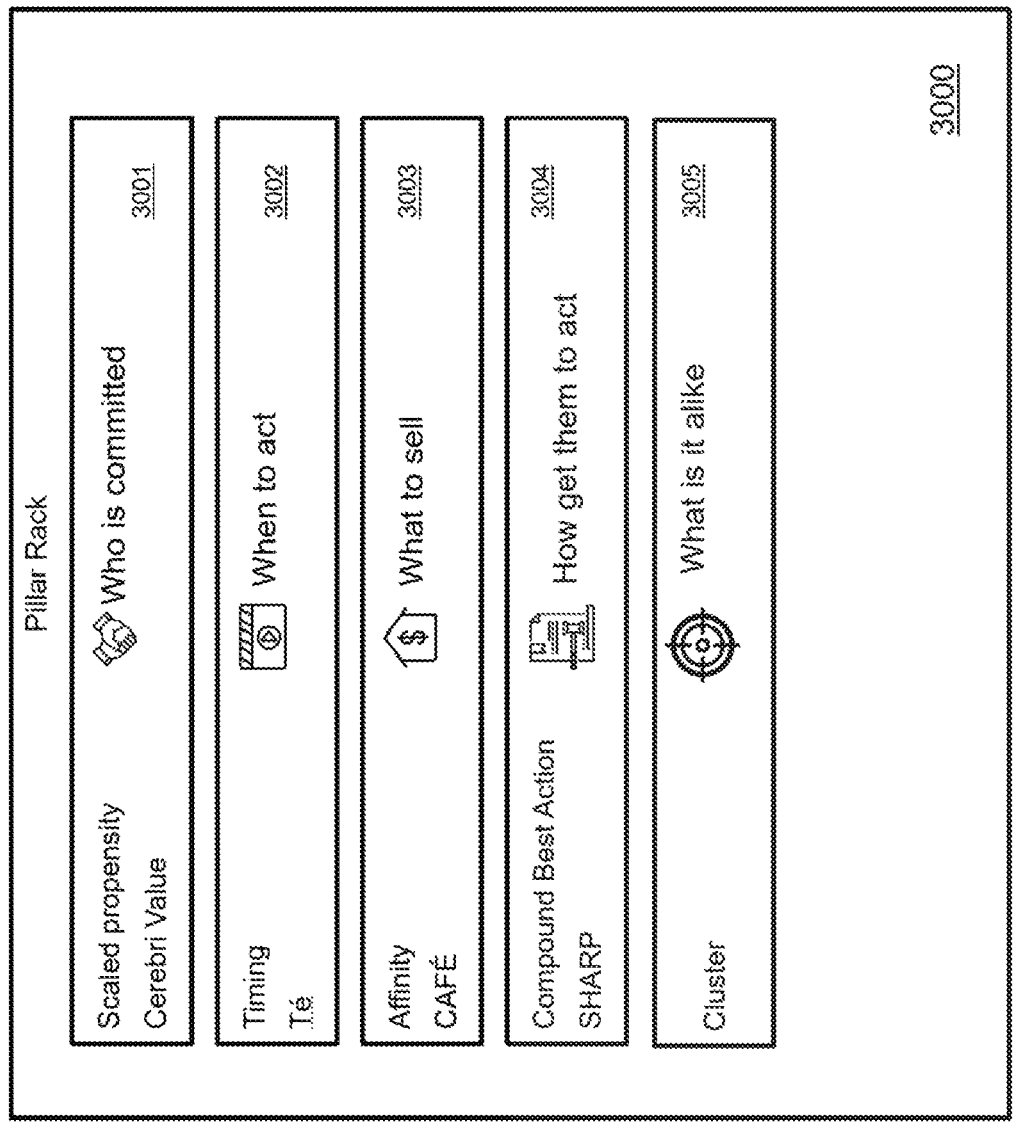
FIG. 3 is a block diagram showing an embodiment of a modeling pillar in accordance with some of the present techniques.

FIG. 3 is a diagram that illustrates an exemplary architecture 3000 of object-oriented pillar rack in accordance with some of the embodiments of the present techniques. A scaled propensity modelor 3001 may be a modelor object of the probability of a consumer making an economic commitment. This scaled propensity is an indicator of inherent commitment of a customer to a service or product brand. When bound with a dataset, the result modeling object may be computed according to various techniques, such as the ones provided in U.S. patent application Ser. No. 16/127,933, the contents of which are hereby incorporated by reference. A Te modelor 3002 may be used to calibrate the moments in time when specific consumer is likely to engage with specific activities. The resulting models may be used for churn management or marketing campaigns. Non-exhaustive examples of encoding are provided in U.S. Patent Application 62/748,287, the contents of which are hereby incorporated by reference. An affinity modelor 3003 may be employed to capture ranked likes and dislikes of customers for specific items. These items may be, among others, items, services, channels, agents, terms of contracts, banking and loans configurations. A best action modelor 3004 may be used to create a framework for concurrent KPI compound best actions at different points in customer journeys. A cluster modeling module 3005 may also be used to group customers based on behavior into finite list for further processing.

Figure 4:
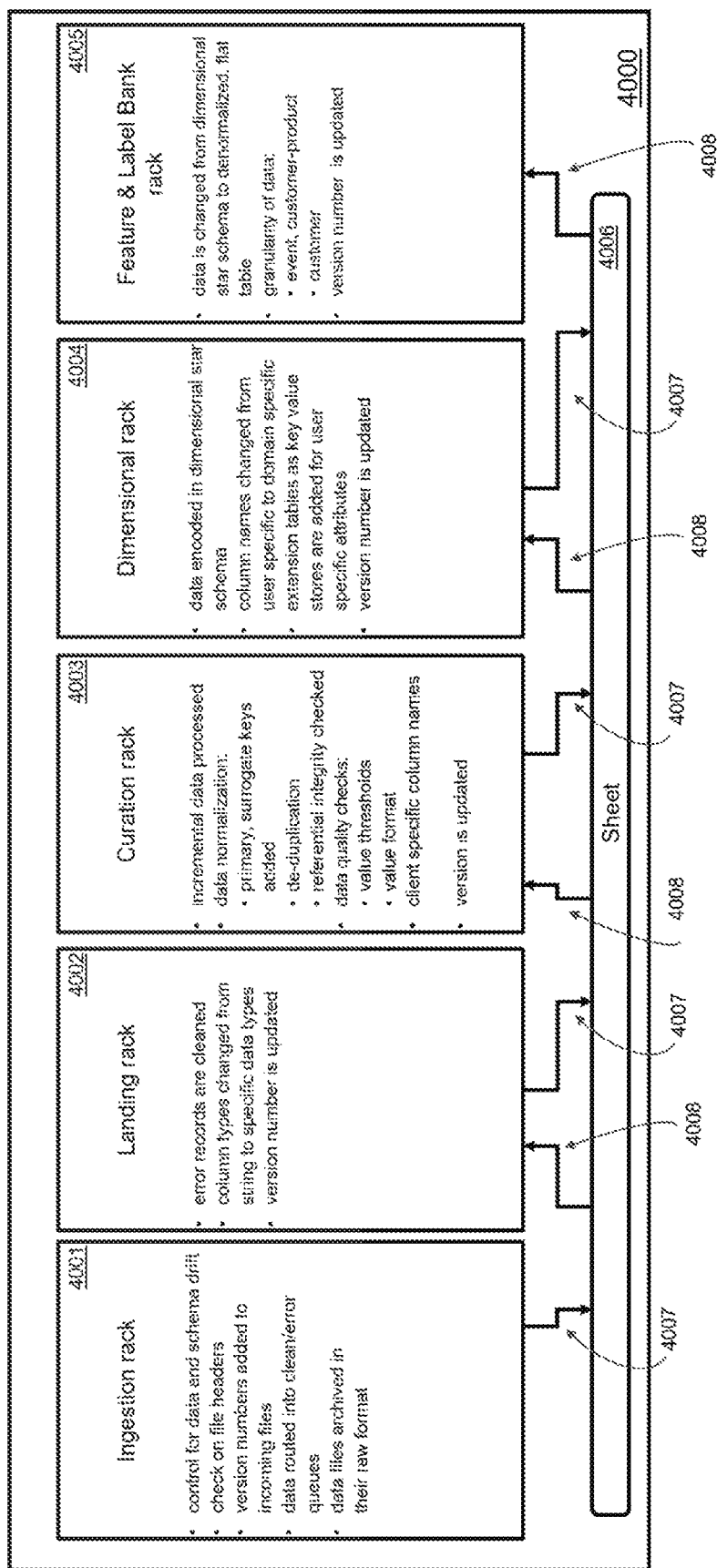
FIG. 4 is a block diagram showing an embodiment of a data orchestrator rack in accordance with some of the present techniques.

FIG. 4 is a flow diagram that illustrates an exemplary OOM transformation from data to data labeled (ML-label) in accordance with some of the embodiments of the present techniques. A data transformation may be done in a data orchestrator rack 4000. In some embodiments, this rack may be a part of a data orchestration module 2001 shown in FIG. 2. An ingestion rack 4001 may be the entry point for raw data. In this rack, some of the following functions may take place: data and schema drift may be controlled, file headers may be checked, version numbers may be added to incoming files, data may be routed into clean/error queues, and data files may be archived in their raw format.

In some embodiments, a landing rack 4002 may cleanse a 1:1 copy of raw data. In this rack, some of the following functions may take place: error records may be cleaned, column types may be changed from string to specific data types, and a version number may be updated.

In some embodiments, a curation rack 4003 may standardize base raw tables. In this rack, some of the following functions may take place: incremental data may be processed, data normalization may be done through primary surrogate keys added, de-duplication, referential integrity may be checked, data quality may be checked (DQM) through value thresholds and value format, client specific column names may be formed, and the version may be updated.

In some embodiments, a dimensional rack 4004 may manage an analytical data warehouse or data lake. In this rack, some of the following functions may take place: data may be encoded in dimensional star schema, column names may be changed from user specific to domain specific, extension tables as key value stores may be added for user specific attributes, and the version number may be updated.

In some embodiments, a feature and label bank rack 4005 may extract and engineer features (ML-features) and labels (ML-labels). In this rack, some of the following functions may take place: data may be changed from dimensional star schema to denormalized flat table, granularity of data may be adjusted for events, customer-product pairs, and customers, and the version number may be updated.

Data movements between racks may be controlled through a sheet. Such a sheet may signal messages, data, or scripts element moving from racks to backplane 4007 and messages, data, or scripts element going back to racks 4008.

Figure 5:
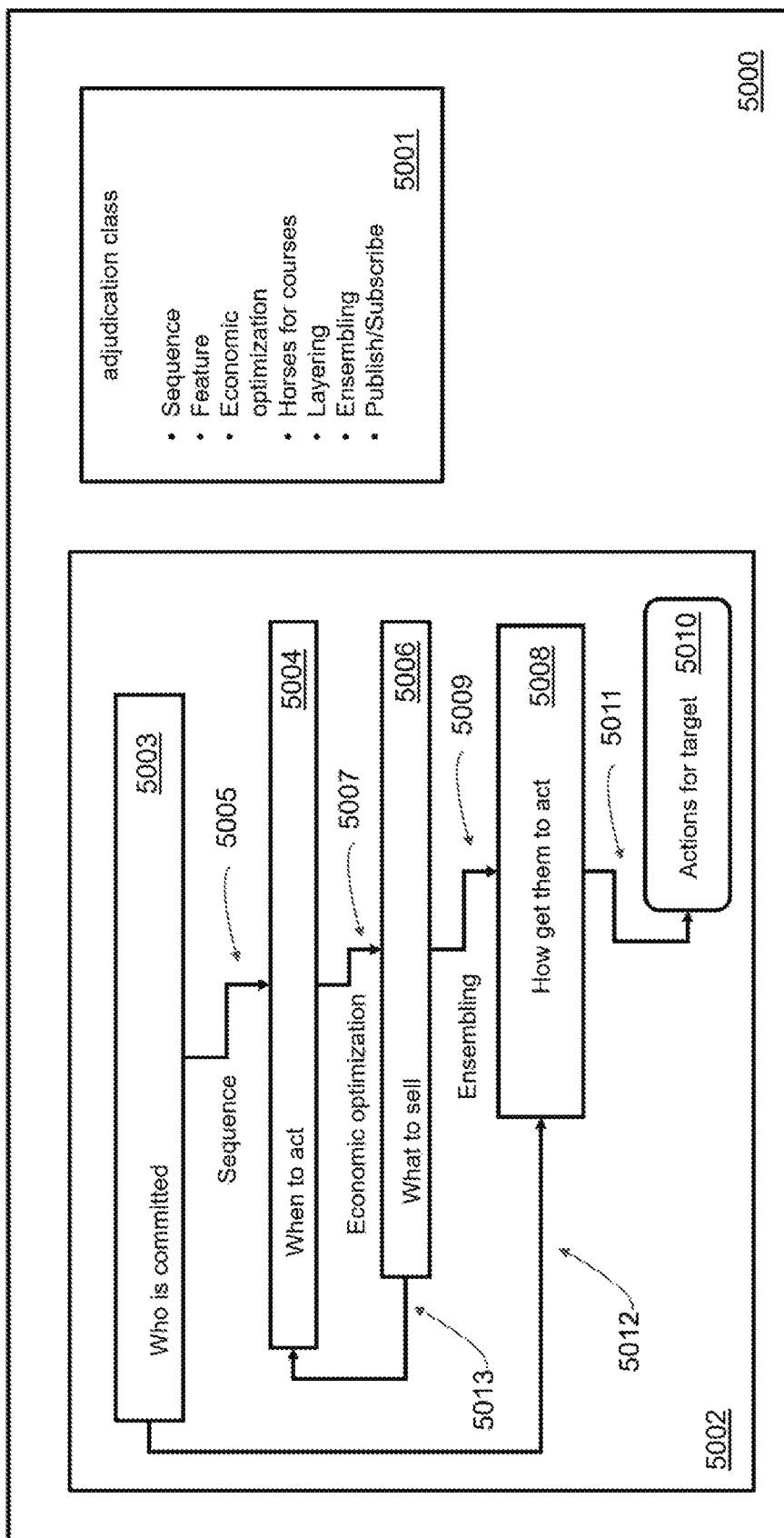
FIG. 5 is a block diagram showing an embodiment of an orchestration system in accordance with some of the present techniques.

FIG. 5 is a flow diagram that illustrates an exemplary OOM composition of object-oriented pillars in accordance with some of the embodiments of the present techniques. An orchestration system 5000 may host a library with adjudication classes 5001, including:

a. Sequence: This class of mutators may change a collection of items into a time sequences for processing.

b. Feature: This class may use accessors to gather one or more ML-feature of a model or modelor, one or more of properties, features, contexts, ML-state components, OO-state and then use the features in another model or modelor object.

c. Economic optimization: This class may hold one or more economic objectives and zero or more economic constraints related to a unitary set of objects (e.g. a person, an product, a service) or a finite set of unitary set of objects (e.g. persons and products) or a finite set of unitary sets complemented by geo-temporal domain (e.g. persons and products and labor day in Maryland) and uses an allocation algorithm to maximize the objectives. Examples of objective functions may include margin optimization, revenue, number of items sold, and carried interest. Examples of constraints may include Cerebri Value range, cost of sales, and number of loan officers. Examples of optimization techniques may include Evolutionary algorithms, Genetic Algorithm (GA), simulated annealing, TABU search, harmony search, stochastic hill climbing, particle swarm optimization, linear programming, dynamic programming, integer programming, stochastic programming, and shortest path analysis.

d. Horses for courses: This class may use accessors to gather and then analyze different performance measures from the OQM attributes of modelors and context thereof to select which modelors out of the set of modelors to use for a specific set of contexts based on maximize quality value computed from elements of OQM. This class may also analyze different performance measures from the OQM attributes of models and context thereof to select which models out of the set of models to use for a specific set of contexts based on maximize quality value computed from elements of OQM.

e. Layering: This class may use accessors to gather and then analyze different measures from the OQM attributes of modelors and OO-features thereof organized along a semantically preset taxonomy or ontology to select which performance measures may be used per OOM-feature for use in a specific set of contexts. This class may also analyze different measures from the OQM attributes of models and OO-features thereof organized along a semantically preset taxonomy or ontology to select which performance measures should be used per OOM-feature for use in a specific set of contexts.

f. Ensembling: This class may use accessors to gather and then analyze the outputs and combine the decisions from multiple models to improve the overall performance.

g. Publishing/subscribing: This class may use accessors to gather relevant attributes and organize them according to ontologies and mutators using those attributes.

In some embodiments, a pillar composition module 5002 may be used to leverage one or more pillars similar to the pillars shown in FIG. 3 and the adjudication from module 5001 to develop a modelor (or if bound with dataset, model). Design analysis may determine that the most important pillar is commitment and who is committed modelor 5003 may be invoked first. The second modelor to leverage may be timing module 5004. The sequence composition 5005 may be used to connect the two. The affinity modelor 5006 may be invoked next, triggered by message on economic optimization 5007. The last pillar being invoked may be the how-to modelor 5008. The final actions may be set in module 5010, messaged through module 5011. Modules may perform forward messaging or backward messaging to connect with non-adjacent modules. For example, module 5003 may message module 5008 through 5012 (e.g., forward messaging) or module 5006 may message module 5004 through 5013 (e.g., backward messaging).

Figure 6:
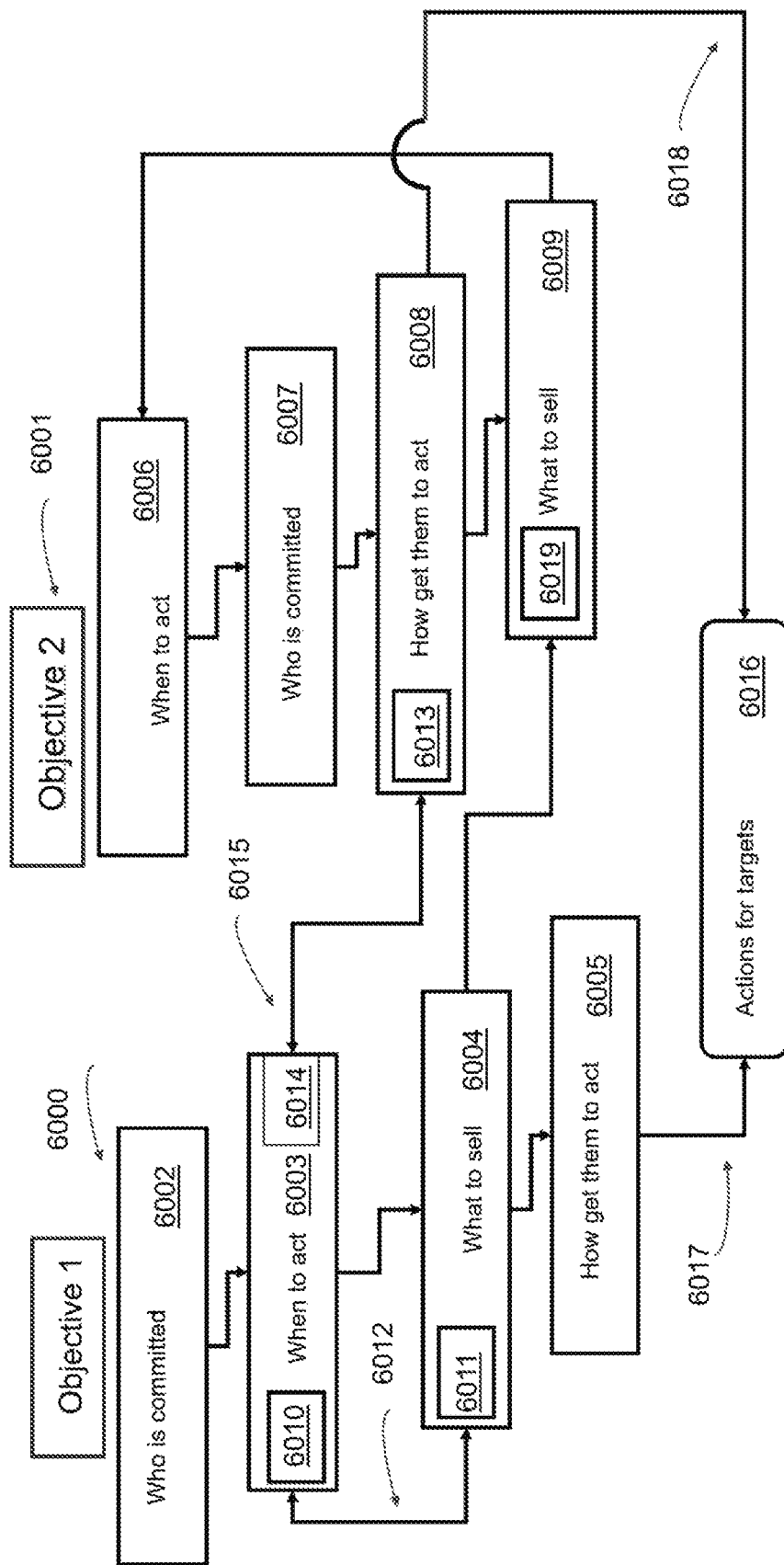
FIG. 6 is a flowchart showing an example of a pillar orchestration in accordance with some of the present techniques.

FIG. 6 is a flow diagram that illustrates another exemplary pillar composition module 5002 for a dual target OOM orchestration of object-oriented pillars in accordance with some of the embodiments of the present techniques. This flow diagram illustrates the integrated modeling flow that may facilitate additional improvements with reduced complexity that improve performance post original design. The pillars may have OQM analysis features, such as feature importance, incremental contribution, Shapley information (like Shapley values, or other measures of network centrality), Gini impurity, entropy, and cross entropy.

Objective 1 6000 may capture a first business or organizational objective. FIG. 6 provides examples related to a marketing campaign of a new product for the sake illustration. Communication between all objects may be through messaging. Objective 2 (in box 6001) may capture a second business or organizational objective. This might be related to an event campaign like a sell-athon for the sake of illustration. Design analysis may determine the first pillar to drive the design of Objective 1 is commitment and who is committed modelor 6002 may be invoked first. The second modelor to leverage may be timing module 6003. Module 6003 may pass messages to the affinity modelor 6004. The last pillar being used may be the how-to modelor 6005. There may be a similar flow to support Objective 2. For example, the first modelor to leverage may be timing 6006, messaging the commitment modelor 6007, itself messaging action modelor 6008, and the affinity modelor 6009.

The OQM module 6010 inside modelor 6003 may be used to assess the potential for improvement by leveraging affinity data from ODM module 6011 in module 6004 by messaging back and forth 6012.

In some embodiments, this technique may be applied across objectives as well. The OQM module 6013 inside modelor 6008 may be used to assess the potential for improvement by timing affinity data from ODM module 6016 in module 6003 by messaging back and forth 6015.

Operation research selection of the best actions may take place in module 6016. Messages to this module may come from the deepest module in the Objective 1 flow 6017 or the middle module in the Objective 2 flow 6018.

In some embodiments, a governance object 6019 may determine who has access to module 6009. This control may be used to limit access based on the role of users or persona of a user and what product to sell, for instance.

FIG. 7 illustrates examples of some of the CEREBRI OOM classes 50 in accordance with some of the embodiments of the present disclosure. ML-labels are shown in the ML-label class library 7000. (Functionality described as implemented as libraries may also be implemented in frameworks.) A KPI class 7001 may be used to manage the business problems. Two business models may be subscription and purchase. A customer class 7002 may capture the business/life-cycle of customers whether consumers (for B2C) or businesses (for B2B). They may include at risk customers, or all customers. An item class 7003 may define commercial items. These items may be physical goods (e.g., cars) or services (e.g., wireless phone contracts). These items may be ranked hierarchically. That hierarchy or unstructured metadata may be set through classes, such as models, options, and customization. In some embodiments, the hierarchy may be a taxonomy hierarchy.

A pillar class library 7005 may include scaled propensity/Cerebri Value 7006 (a term which is described in the applications incorporated by reference), timing class 7007, affinity class 7008, and compound best action class 7009.

In some embodiments, adjudication classes of modelors or model objects may be organized similar to the library shown in block 7010. Not all compositions may apply to all pillars or KPIs. Modelor compositions and model object compositions may include:

a. Sequence: This class of mutators may change a collection of items into a time sequences for processing.

b. Feature: This class may use accessors to gather one or more ML-feature of a model or modelor, one or more of properties, features, contexts, ML-state components, and OO-state and then use the features in another model or modelor object.

c. Economic optimization: This class may hold one or more economic objectives and zero or more economic constraints related to a unitary set of objects (typically, but not limited to, a person, an product, a service) or a finite set of unitary set of objects (e.g., persons and products) or a finite set of unitary sets complemented by geo-temporal domain (e.g., persons and products and labor day in Maryland) and uses an allocation algorithm to maximize said objectives. Examples of objective functions include margin optimization, revenue, number of items sold, and carried interest. Examples of constraints include Cerebri Value range, cost of sales, and number of loan officers. Examples of optimization techniques include Evolutionary algorithms, Genetic Algorithm (GA), simulated annealing, TABU search, harmony search, stochastic hill climbing, particle swarm optimization, linear programming, dynamic programming, integer programming, stochastic programming, and shortest path analysis.

d. Horse for courses: This class may use accessors to gather and then analyze different performance measures from the OQM attributes of modelors and context thereof to select which modelors out of the set of modelors to use for a specific set of contexts based on maximize quality value computed from elements of OQM. This class may also analyze different performance measures from the OQM attributes of models and context thereof to select which models out of the set of models to use for a specific set of contexts based on maximize quality value computed from elements of OQM.

e. Layering: This class may use accessors to gather and then analyze different measures from the OQM attributes of modelors and OO-features thereof organized along a semantically preset taxonomy or ontology to select which performance measures should be used per OOM-feature for use in a specific set of contexts. This class may also analyze different measures from the OQM attributes of models and OO-features thereof organized along a semantically preset taxonomy or ontology to select which performance measures should be used per OOM-feature for use in a specific set of contexts.

f. Ensembling: This class may use accessors to gather and then analyze the outputs and combine the decisions from multiple models to improve the overall performance.

g. Publishing/subscribing: This class may use accessors to gather relevant attributes and organize them according to ontologies and mutators using those attributes.

In some embodiments, modeling methodology classes 7011 may capture some of the key accessors and mutators. Contextualization classes 7012 may include binning (e.g., mapping of continuous attributes into discrete ones), winnowing (e.g., reduction of time span, location foci, and branches in semantic tree), selection of data sources, and selection of KPIS.

In some embodiments, biding classes 7013 may include binding (or other type of association) of, for instance, the four types of datasets (e.g., training, test, validation, and application). The governance classes (7014) may capture the restrictions and business protocols for specific KPIs. They may include OR criteria, operational criteria, actions that are allowed, and action density (e.g., number of actions per unit time).

In some embodiments, deployment classes 7016 may include realizations 7017 including Cerebri Values and numerous KPIs, organized as primary and secondary. Deployment classes 7016 may also include quality measurements 7018 including data quality monitoring (DQM), model quality monitoring (MQM), score quality monitoring (SQM), bias quality management (BQM), privacy quality management (PQM), and label quality monitoring (LQM). Deployment classes 7016 may also include governance classes 7019 including support of client model validation using model documentation, CRUD management of items and their metadata, security control of governance decision maker, QM metric thresholds as constraints for optimizer, data DQM metric threshold evaluation and analysis, data DQM metric creep evaluation through data set detection, data lifecycle with gate points and workflow actions, model MQM metric threshold evaluation and analysis, model MQM metric creep evaluation through model drift detection, model output SQM metric threshold evaluation and analysis, and model lifecycle with gate points and workflow actions.

Figure 8:
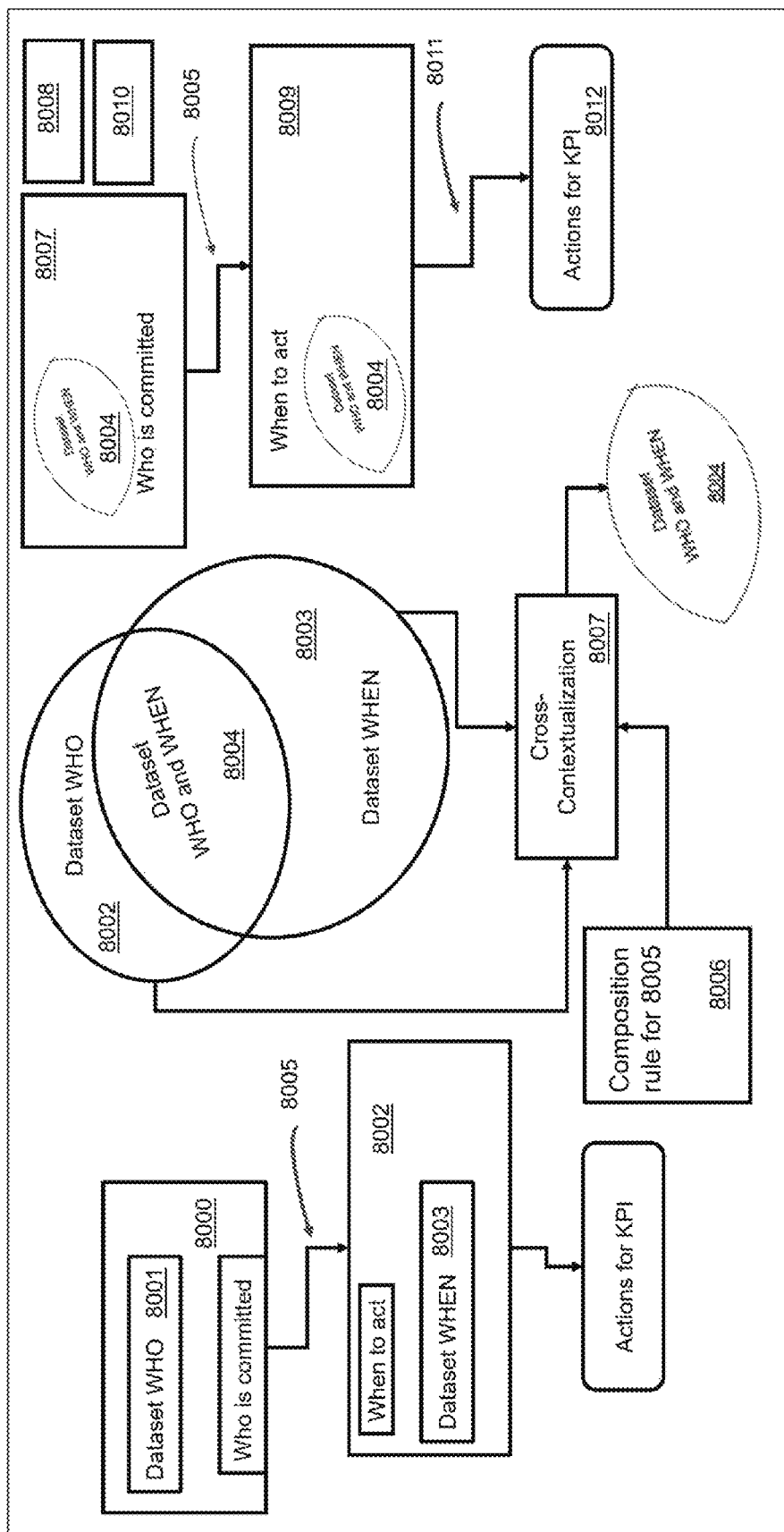
FIG. 8 is a flowchart showing an example of the concept of contextualization and validation in accordance with some of the present techniques.

FIG. 8 illustrates an example of contextualization and validation implemented in accordance with some of the embodiments of the present techniques. An orchestrator may be processing a composition between model object modules 8000 which are bound with dataset association 8001 and model object 8002 which are bound to dataset association 8003. The intersection of these two datasets is dataset 8004. The composition between 8000 and 8002 is 8005 and its composition rule are set validator object 8006. To ensure the composition is correct, a cross-contextor 8007 may be applied to datasets 8002, 8003, and composition rule 8006. A cross-contextualization may determine that this composition 8006 requires the same dataset association to be used. A new model object 8007 may be created by binding the modelor 8008 that is used to create model object 8000 with the dataset 8004. A new model object 8009 may be created by binding the modelor 8010 that is used to create model object 8002 with the dataset 8004. Model 8007 may be composed with model 8009 using composition 8005 and then composition 8001 to create best action model 8012.

Figure 9:
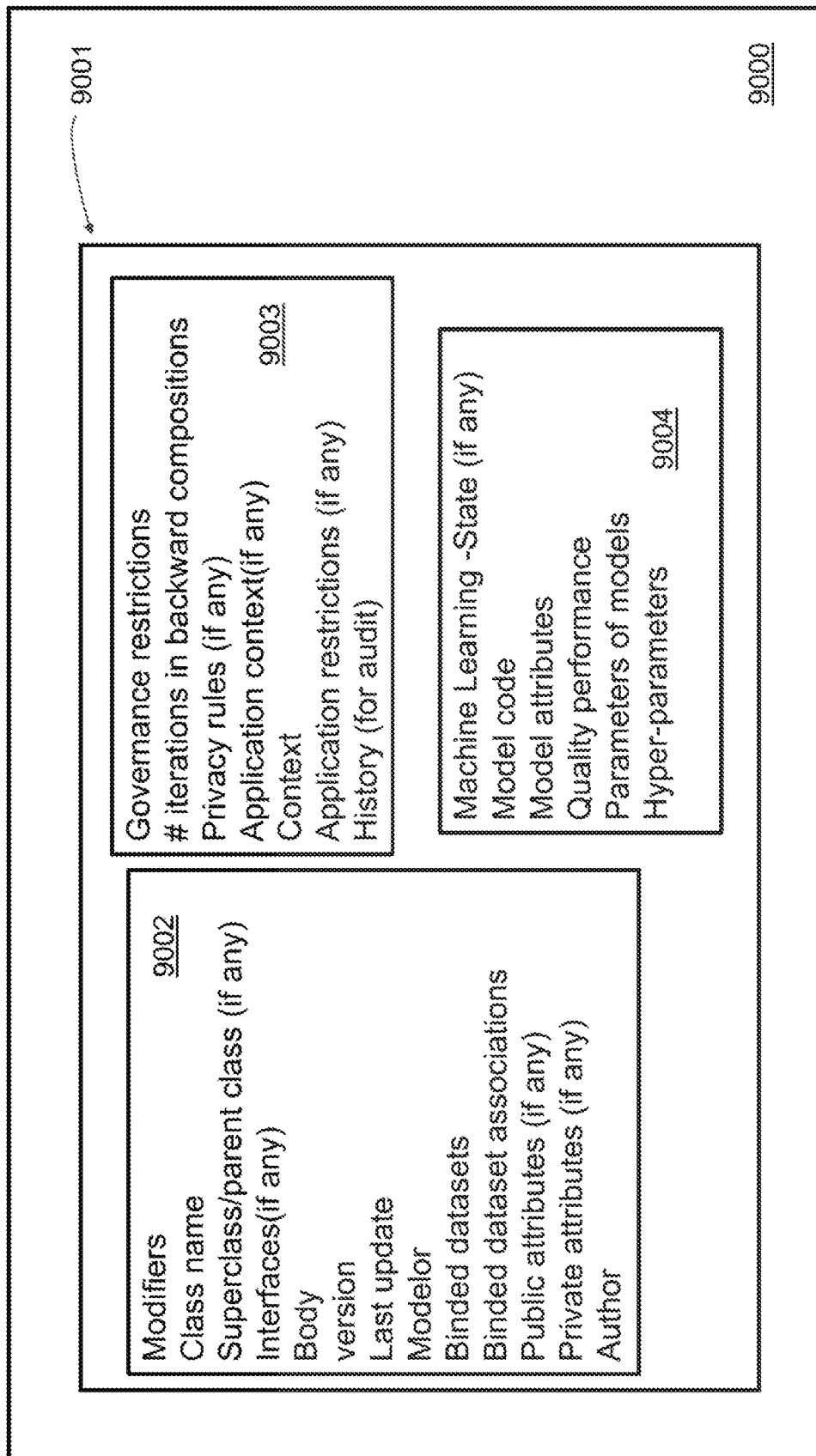
FIG. 9 is a block diagram showing an embodiment of a model object in accordance with some of the present techniques.

FIG. 9 illustrates an example of a model object field in accordance with some of the embodiments of the present techniques. An orchestrator 9000 may hold the classes 9001 that may have multiple attributes. Attributes may be divided into multiple buckets, such as object management and lifecycles 9002, governance 9003, and machine learning techniques 9004.

Figure 10:
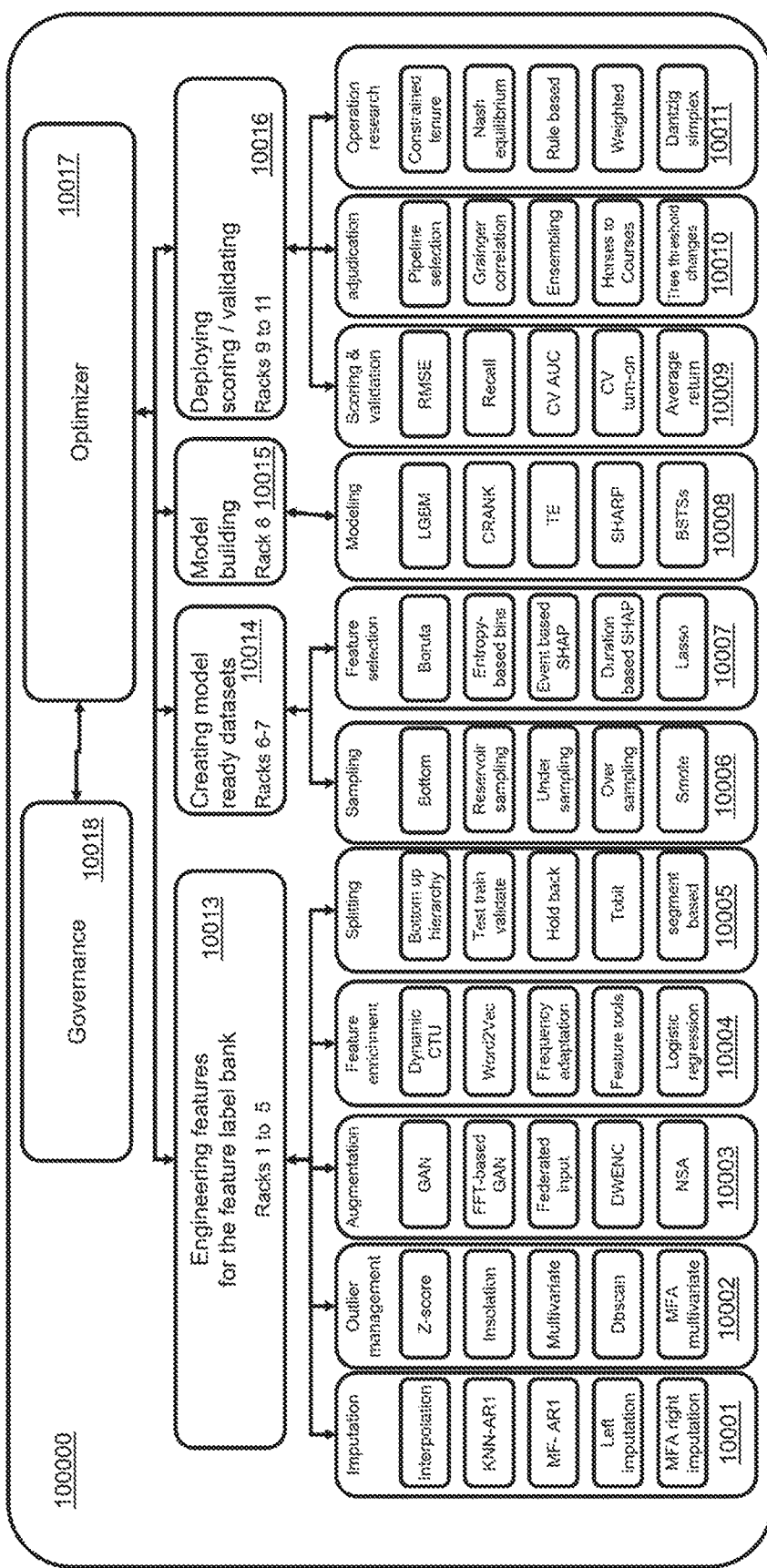
FIG. 10 is a block diagram showing an embodiment of a modelor collection used to create an optimized pipeline in accordance with some of the present techniques.

In some embodiments, a modelor collection 10000 may be used to create an optimized pipeline, may include a series of racks corresponding to nominal steps of a machine learning pipeline as shown in FIG. 10. Rack 10001 may support modelor dealing with data imputation. Rack 10002 may support modelors dealing with outliers. Rack 10003 may support modelors dealing with data augmentation. Rack 10004 may support modelors dealing with feature enrichments. Rack 10005 may support modelors dealing with the splitting of datasets. Rack 10006 may support modelors dealing with sampling and balancing datasets. Rack 10007 may support modelors dealing with feature selections. Rack 10008 may support modelors that perform modeling activities. Rack 10009 may support modelors computing validation and scoring. Rack 10010 may support modelors dealing with adjudication heuristics and methodologies. Rack 10011 may support modelors implementing operation research. The first five racks may be monitored by an "Engineering features for the feature label bank" module 10013. The sampling 10006 and feature selection 10007 racks may be monitored by a "creating model ready datasets" module 10014. A model building rack 10008 may be monitored by a "model building" module 10015. The rest of the racks (e.g. 10009, 10010, and 10011) may be monitored by a "deploying scoring/validation" module 10016. While some may shortcut through an optimizer 10017, some of the monitoring modules may pass through an optimizer 10017 to reduce the search space for optimization. Some of the optimization techniques in 10017 may be nondeterministic polynomial time (NP) hard. For those, the functional organization of racks and embedded modelors may reduce the computational load. A governance module 10018 may manage the optimization module.

Figure 11:
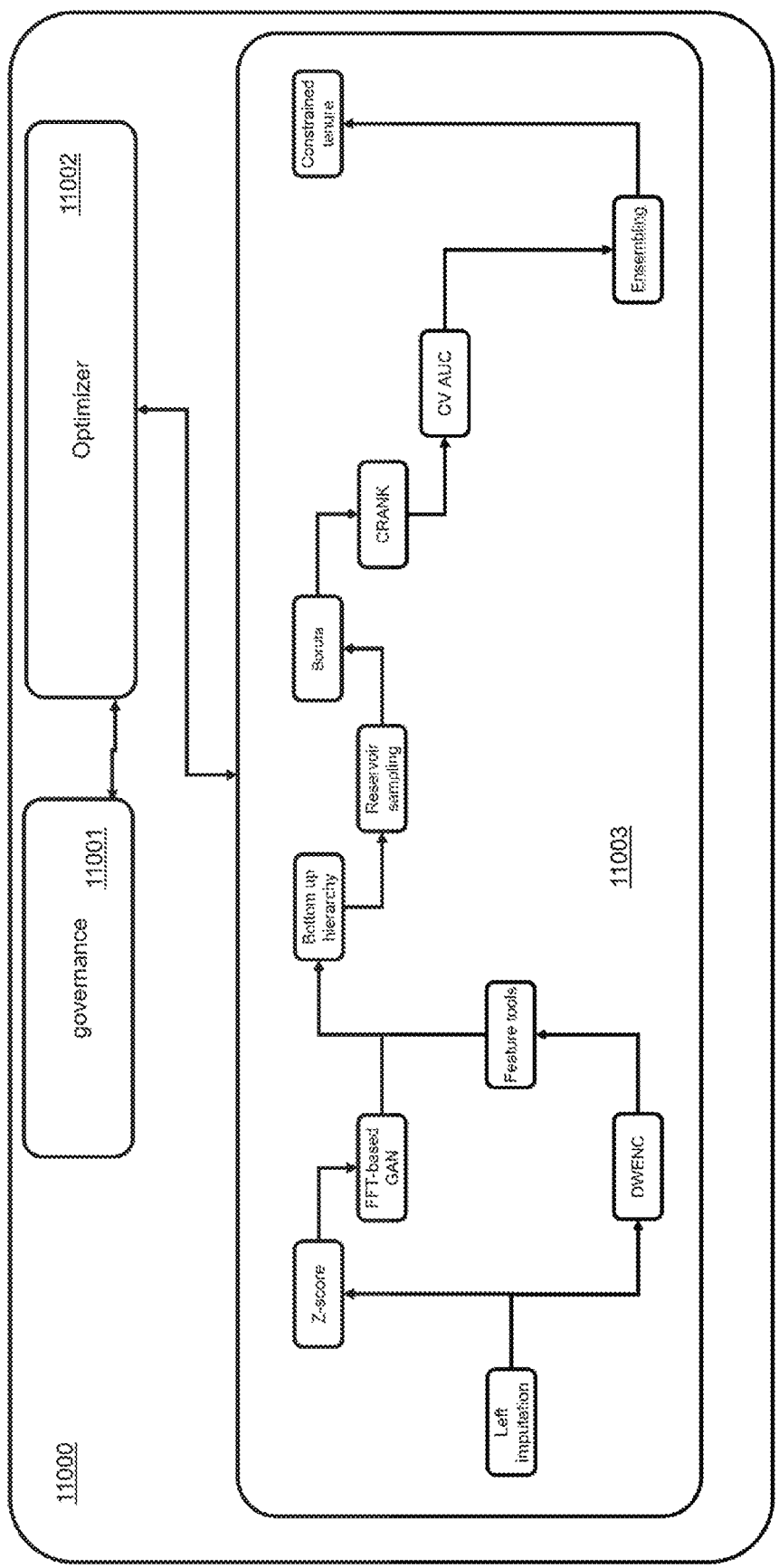
FIG. 11 is a block diagram showing an embodiment of an optimized modelor collection in accordance with some of the present techniques.

FIG. 11 illustrates an exemplary outcome of an optimization set up in FIG. 10. A machine learning system 11000 governed by governance module 11001 may be resulted into an optimizer 11002 selecting a directed graph 11003.

Figure 12:
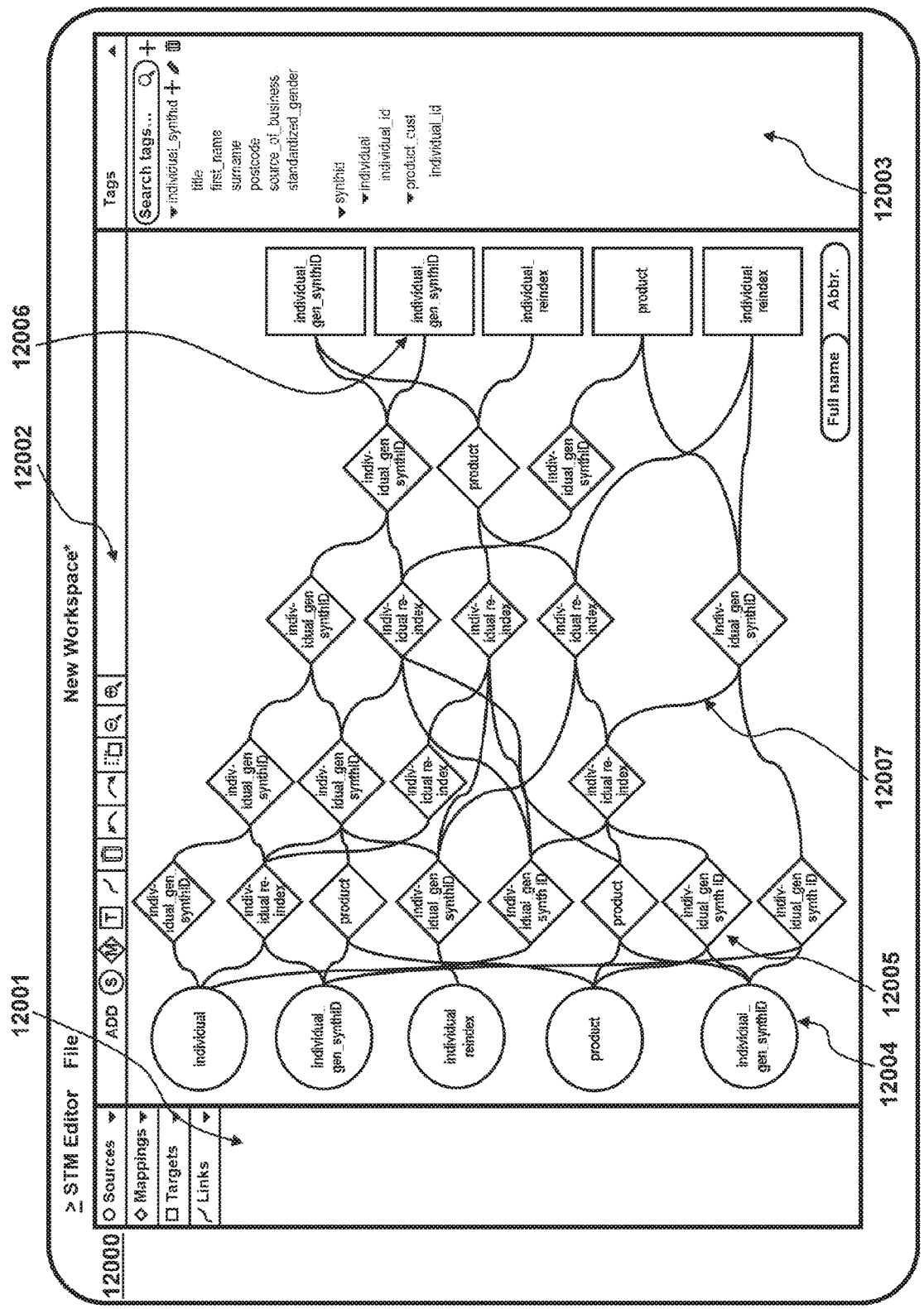
FIG. 12 is a block diagram showing an embodiment of creation of an integrated source to target mappings used in an orchestration in accordance with some of the present techniques.

FIG. 12 illustrates an exemplary graphic editor 12001 of a source to target mapping capabilities facilitated by some of the present techniques. Using a graphic user interface, embodiments may facilitate selection of elements 12001 of a STM. The network of STM may be managed through workspace pane 12002. Tags needed for building elements may be in panel 12003. In a workspace panel, a user may design sources (12004), mappings (12005), targets (12007), and links 12007 of a directed graph that may capture their orchestration. UI interactions may be received by event handlers, which may launch corresponding routines that update configurations (e.g., configuration files) by which the techniques described herein are directed.

In some embodiments, the OOM framework may be implemented as a library instead or as a hybrid of a library and a framework. In some embodiments, OOM framework may be implemented in a purely-object oriented programming language, or in a hybrid language with support for multiple paradigms, e.g., also supporting functional programming or imperative programing support. The OOM framework may be implemented as a compiled or as an interpreted language, e.g., for the latter, with an interpreter that interprets source code to bytecode, which can be compiled to machine code and executed via a suitable virtual machine for a host computing system.

The OOM framework may organize database structure, program code, and program state in objects. Objects may include both methods (which may also be referred to as routines, procedures, or functions), and attributes, which may be data of the object. Objects may be instances of classes supported by the OOM framework, e.g., instance A of class 1 and instance B of class 1 may both be objects with the same set of a plurality of methods and attributes, and after, or as part of instantiations, the values taken by the attributes may evolve and differ between the object that is instance A and the object that is instance B, e.g., instance A and instance B may be independent from one another. In some cases, classes may support class variables that are accessible to objects that are instances of the respective class. In some cases, methods of objects may have access (e.g., to read, write, or both read and write) to attributes of the respective object, but not to attributes of other objects. In some cases, some attributes of some objects may be designated as public or private to modulate access by methods other objects. In some cases, objects may receive messages, like invocations of their methods from other objects, and the called object may determine which code to execute in response to the invocation, e.g., with dynamic dispatch, and in some cases, different instances of a class may be configured to dispatch to different code for the same invocation message. In some cases, objects may be composed of other objects of other classes, and in some cases, classes may indicate inheritance to organize objects according to a hierarchical ontology of types, e.g., where sub-types inherit the attributes and methods of the types from which they inherit. In some cases, the OOM framework may support polymorphism, and objects may be configured to operate on a type of objects, its sub-types, or its sub-sub-types.

In some cases, designs in the OOM framework may be implemented with various design pattern. For example, the following creation patterns may be used: Factory method pattern, Abstract factory pattern, Singleton pattern, Builder pattern, or Prototype pattern. In some cases, the following structural patterns may be used: Adapter pattern, Bridge pattern, Composite pattern, Decorator pattern, Facade pattern, Flyweight pattern, or Proxy pattern. In some cases, the following behavior patterns may be used: Chain-of-responsibility pattern, Command pattern, Interpreter pattern, Iterator pattern, Mediator pattern, Memento pattern, Observer pattern, State pattern, Strategy pattern, Template method pattern, or Visitor pattern.

In some cases, the OOM framework specifies a set of symbols to model various aspects of creating and using machine-learning models. In some cases, the OOM framework specifies an ontology of classes (which may be hierarchical), with different branches or hierarchies pertaining to different areas of concern in the life cycle of machine learning models, like those discussed above.

Figure 13:
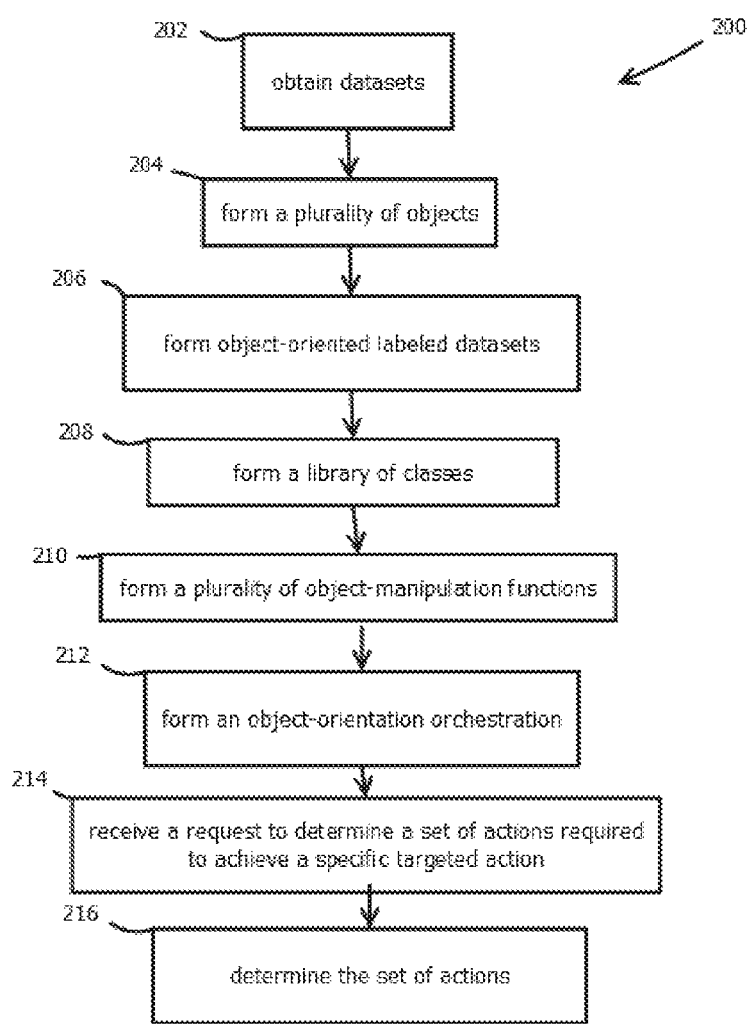
FIG. 13 is a flowchart showing an example of a process by which a targeted action is determined using an object-orientation orchestrator.

In some embodiments, the controller 10 (e.g., an object-oriented modeling module thereof) may execute a process 200 shown in FIG. 13. In some embodiments, different subsets of this process 200 may be executed by the illustrated components of the controller 10, so those features are described herein concurrently. It should be emphasized, though, that embodiments of the process 200 are not limited to implementations with the architecture of FIG. 1, and that the architecture of FIG. 1 may execute processes different from that described with reference to FIG. 13, none of which is to suggest that any other description herein is limiting.

In some embodiments, the process 200 (and other functionality herein) may be implemented with program code or other instructions stored on a tangible, non-transitory, machine-readable medium, such that when the instructions are executed by one or more processors (a term which as used herein refers to physical processors, e.g., implemented on a semiconductor device), the described functionality is effectuated. In some embodiments, notwithstanding use of the singular term "medium," the medium may be distributed, with different subsets of the instructions stored on different computing devices that effectuate those different subsets, an arrangement consistent with use of the singular term "medium" along with monolithic applications on a single device. In some embodiments, the described operations may be executed in a different order, some or all of the operations may be executed multiple times, operations may be executed concurrently with one another or multiple instances of the described process, additional operations may be inserted, operations may be omitted, operations may be executed serially, or the processes described may otherwise be varied, again none of which is to suggest that any other description herein is limiting.

In some embodiments, the process 200 includes obtaining, as indicated by block 202, for a plurality of entities, datasets. The datasets may be events or attributes involving the entities. In some embodiments, at least a subset of the events are actions by the entities and some of these actions may be targeted actions.

In some embodiments, a plurality of objects may be formed, as indicated by block 204. A data domain may be used to transform datasets into objects. Objects may include events and attributes of entities (attributes of entities and events may be a type of attribute of an object) extracted from datasets.

In some embodiments, these datasets may be labeled with object-oriented tags, as indicated by block 206, used to classify entity logs. In some embodiments, labelling is a process of adding tags to data. Augmenting data with labels may make it more informative and more manageable. One use of labelling in object-oriented modeling may be management of labels, not as elements in a list or table, but as objects allowing a collection of tags to be used. As objects, OO-labels may be managed and organized through enforced set of grammar and semantic rules. One attribute of an OO-label may be a user facing text for sake of user experience (UX). In some embodiments, OO-labels may be used in a single ontology used for multiple customers, each with a ML-label for their business realizing a MUPL. OO-labels may encode meta-data about a dataset, control information, and governance information among other things.

In some embodiments, a library of classes may be formed, as indicated by block 208. The library of classes may include the classes shown in FIG. 7. Also, a plurality of object-manipulation functions may be formed as indicated by block 210. Each of the object-manipulation objects may be configured to leverage a specific class.

In some embodiments, an object-orientated orchestration may be formed as indicated by block 212. An orchestration may be an organization of a collection of steps that perform a specific objective when executed by a computing system. Orchestrations may operate on objects to create new objects and thus may be recursive.

In some embodiments, the object-orientated orchestration may then be used to select a set of actions to achieve a given targeted action similar to the process shown in FIG. 2. To this end, some embodiments may receive a request from an entity or a subscriber as indicated by block 214. Some embodiments may then determine the set of actions to achieve (or increase the likelihood of achieving) the given targeted action, as indicated by block 216 in FIG. 13, for instance, with a potential targeted action 20 in FIG. 1.

Figure 14:
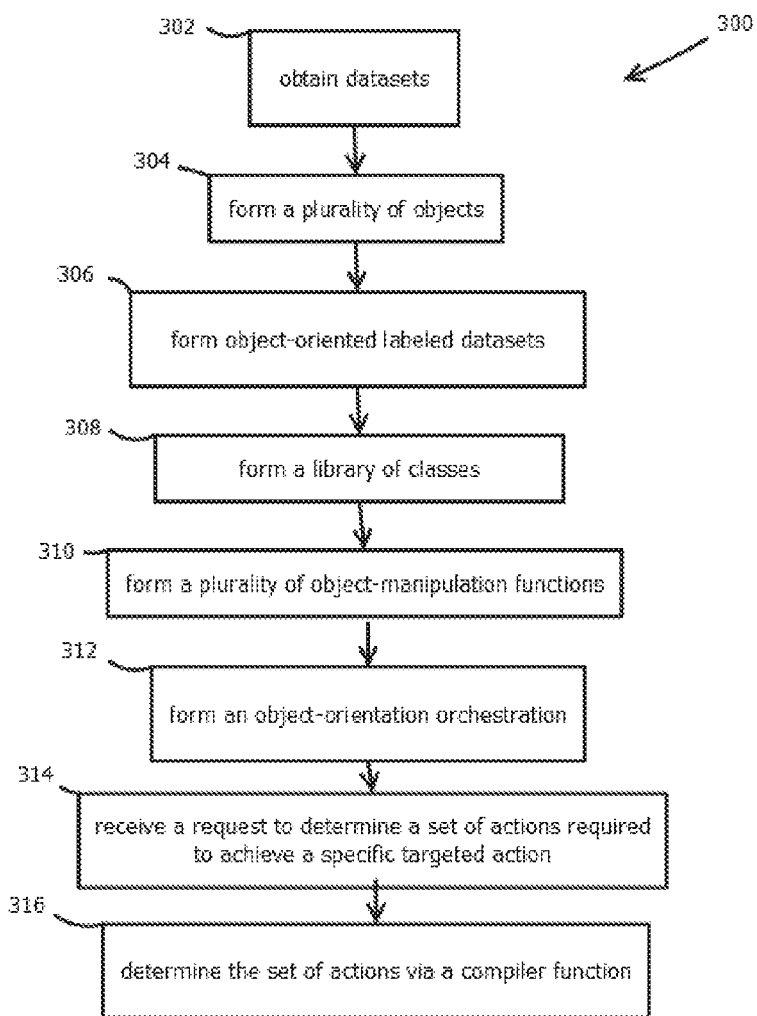
FIG. 14 is a flowchart showing an example of a process by which a targeted action is determined using an optimization system operating an object-orientation orchestrator.

In some embodiments, the controller 10 may execute a process 300 shown in FIG. 14. In some embodiments, different subsets of this process 300 may be executed by the illustrated components of the controller 10, so those features are described herein concurrently. It should be emphasized, though, that embodiments of the process 300 are not limited to implementations with the architecture of FIG. 1, and that the architecture of FIG. 1 may execute processes different from that described with reference to FIG. 14, none of which is to suggest that any other description herein is limiting.

In some embodiments, the process 300 includes obtaining, as indicated by block 302, for a plurality of entities, datasets. The datasets may be events or attributes involving the entities. In some embodiments, at least a subset of the events are actions by the entities and some of these actions may be targeted actions. The actions may include exogenous actions and endogenous actions.

In some embodiments, a plurality of objects may be formed, as indicated by block 304. In some embodiments, all of the datasets are transferred into objects. In some embodiments, only a portion of the datasets are transferred into objects. Objects may include events and attributes extracted from datasets, both of which may be attributes of the respective object.

In some embodiments, these datasets may be labeled with object-oriented tags, as indicated by block 306, used to classify entity logs. In some embodiments, labelling is a process of adding tags to data.

In some embodiments, a library of classes may be formed, as indicated by block 308. The library of classes may include the classes shown in FIG. 7. Also, a plurality of object-manipulation functions may be formed as indicated by block 310. Each of the object-manipulation objects may be configured to leverage a specific class.

In some embodiments, an object-orientated orchestration may be formed as indicated by block 312. An orchestration may be an organization of a collection of steps that perform a specific objective when executed by a computing system. Orchestrations may operate on objects to create new objects and thus may be recursive.

In some embodiments, a request may be received from an entity (e.g., another object or other body of executing code) or a subscriber as indicated by block 314 to determine a set of actions required to achieve a specific targeted action specified by the request. Some embodiments may then determine the set of actions to achieve (a term used broadly to also refer to increasing the likelihood of achieving) the given targeted action, using a compiler function as indicated by block 316 in FIG. 14, for instance, with a potential targeted action 20 in FIG. 1. A compiler function may first pick a set of classes based on the specific targeted action and then use a series of object-manipulation functions to determine the set of actions, needed to be done by the entity or other entities, to achieve the specific targeted action.

Figure 15:
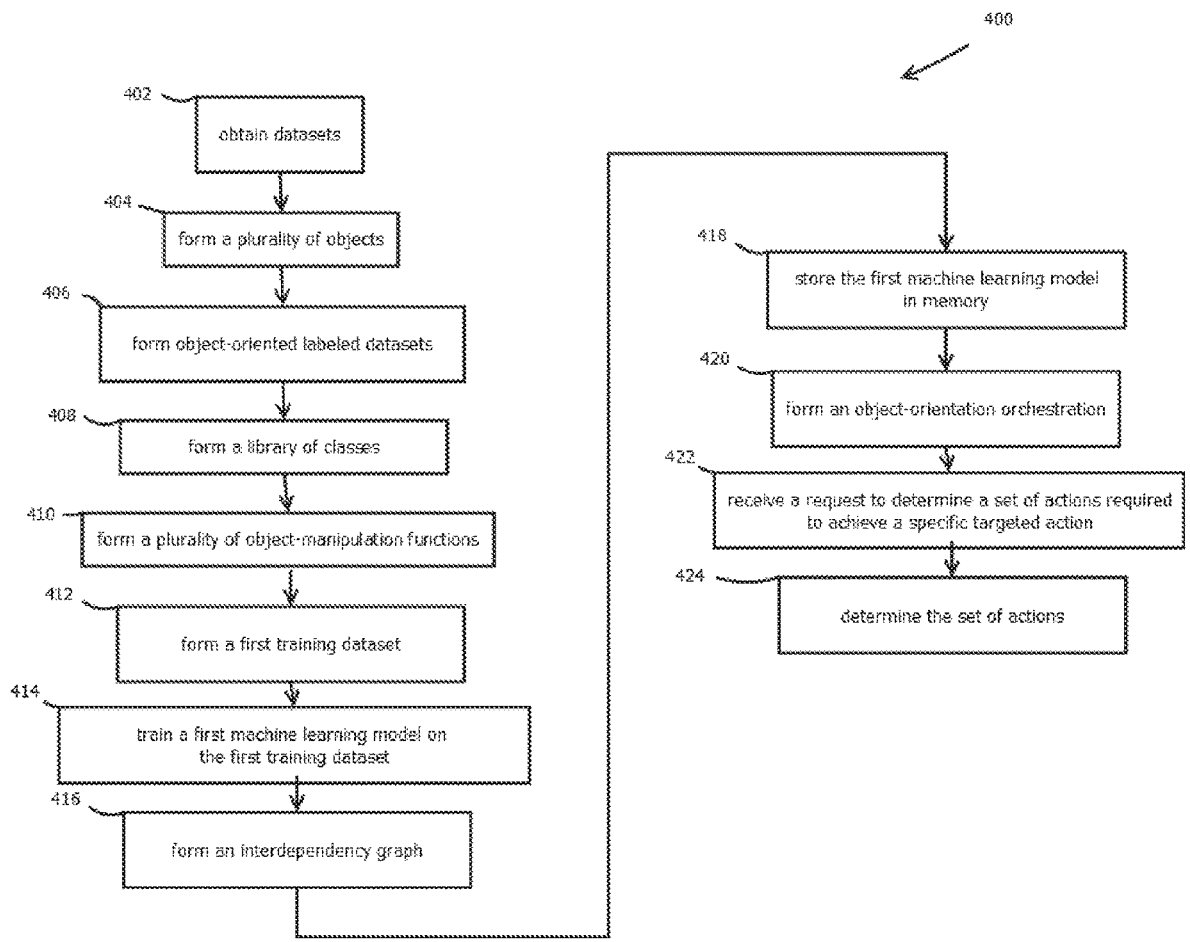
FIG. 15 is a flowchart showing an example of a process by which a targeted action is determined using a compiler function operating an object-orientation orchestrator.

In some embodiments, the controller 10 may execute a process 400 shown in FIG. 15. In some embodiments, different subsets of this process 400 may be executed by the illustrated components of the controller 10, so those features are described herein concurrently. It should be emphasized, though, that embodiments of the process 400 are not limited to implementations with the architecture of FIG. 1, and that the architecture of FIG. 1 may execute processes different from that described with reference to FIG. 15, none of which is to suggest that any other description herein is limiting.

In some embodiments, the process 400 includes first obtaining, as indicated by block 402, for a plurality of entities, datasets. Thereafter, multiple objects may be formed, as indicated by block 404, and the datasets may be labeled with object-oriented tags, as indicated by block 406, used to classify entity logs.

In some embodiments, a library of classes may be formed, as indicated by block 408. The library of classes may include the classes shown in FIG. 7. Also, a plurality of object-manipulation functions may be formed as indicated by block 410. Each of the object-manipulation objects may be configured to leverage a specific class.

In some embodiments, a training dataset may be formed using the datasets of the plurality of entities, as shown by block 412. In some embodiments, the training dataset may describe scenarios that have occurred in the past. In some embodiments, the training dataset may describe scenarios that have not occurred, and thus are virtual. Use of the terms "form" and "generate" are used broadly and use of different terms should not be read to necessarily refer to different operations in virtue of using different terminology, as both of these terms generally include causing the described thing to come into being, whether by modifying an existing thing or forming a new copy or instance.

Next, some embodiments may input the training datasets into a machine learning model model that indicates interdependency of the plurality of object-manipulation functions in leveraging a specific class, as indicated by block 414 in FIG. 15. In some embodiments, the trained model may, in response, output a score indicative of interdependency of the plurality of object-manipulation functions. In some cases, the output may be one of the scores or values described in patent application Ser. No. 15/456,059, titled BUSINESS ARTIFICIAL INTELLIGENCE MANAGEMENT ENGINE, the contents of which are hereby incorporated by reference.

In some of the embodiments related to machine learning, new features (which may increase dimension of datasets) may also be obtained from old features using a method known as feature engineering using knowledge about a problem to create new variables. In some embodiments, while feature engineering may be part of the application of machine learning, it may be difficult and expensive in terms of time, resource, and talent perspective. In some embodiments, CEREBRI may use object-publish-subscribe modeling to convey improvements in feature engineering from one object to another.

In some embodiments related to machine learning, features that may not be helpful in the performance of the models may be removed (which may decrease in dimensionality of datasets); this is an example of what is referred to as feature selection. Feature selection may be helpful in terms of the required time, resource, and talent perspective. In some embodiments, CEREBRI may use object-publish-subscribe modeling to convey improvements in feature selection from one object to another.

In some embodiments, when an object is a model or modelor, it may embed a machine learning state that is ML-State. The state of the object may be to a large degree a superset the machine learning state of a model that captures latent, Markov, reward, quality, or governance information.

Different types of training may be applied depending upon the type of model in use. Any of the types of models described above may be applied. In some embodiments, the model is policy in a reinforcement learning model. In some embodiments, the model is a classifier configured to classify object classes. Various types of processing may be performed by machine learning model on the datasets, including the processes shown in FIG. 10.

In some embodiments, multiple interdependency graphs are formed, as shown by block 416, which can track the relationship between different classes.

Some embodiments may store the resulting model in memory, as indicated by block 418. As noted, trained models may be expressed as a lookup table mapping inputs to outputs, sets of values for constants or variables in software routines, as values of parameters in closed-form equations, or combinations thereof.

In some embodiments, an object-orientated orchestration may be formed as indicated by block 420. An orchestration may be an organization of a collection of steps that perform a specific objective when executed by a computing system.

In some embodiments, the object-orientated orchestration may then be used to select a set of actions to achieve a given targeted action similar to the process shown in FIG. 2. To this end, some embodiments may receive a request from an entity or a subscriber as indicated by block 422. Some embodiments may then determine the set of actions to achieve (or increase the likelihood of achieving) the given targeted action, as indicated by block 424 in FIG. 135 for instance, with a potential targeted action 20 in FIG. 1.

Figure 16:
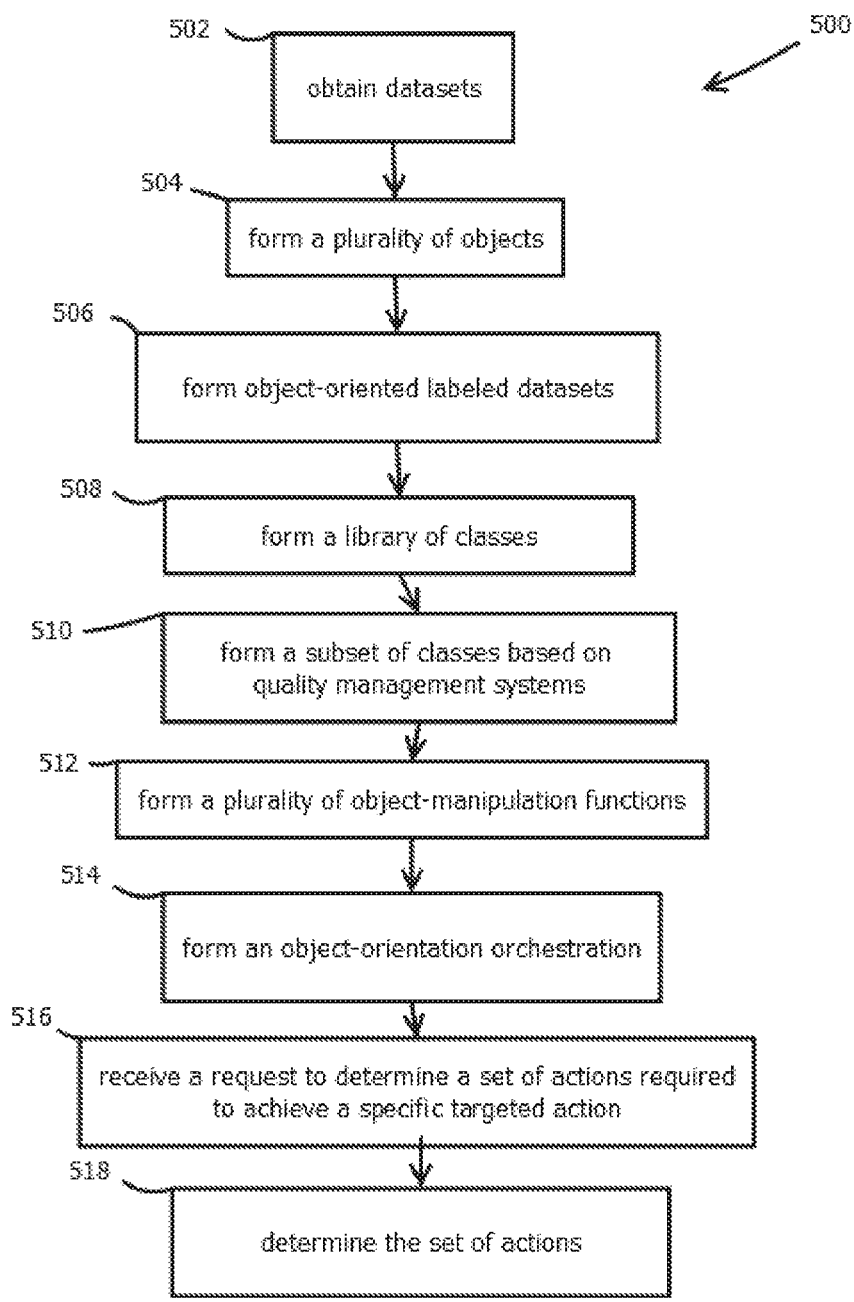
FIG. 16 is a flowchart showing an example of a process by which a targeted action is determined using a quality management system operating in an object-orientation orchestrator.

In some embodiments, the controller 10 may execute a process 500 shown in FIG. 16. In some embodiments, different subsets of this process 500 may be executed by the illustrated components of the controller 10, so those features are described herein concurrently. It should be emphasized, though, that embodiments of the process 500 are not limited to implementations with the architecture of FIG. 1, and that the architecture of FIG. 1 may execute processes different from that described with reference to FIG. 16, none of which is to suggest that any other description herein is limiting.

In some embodiments, the process 500 (and other functionality herein) may be implemented with program code or other instructions stored on a tangible, non-transitory, machine-readable medium, such that when the instructions are executed by one or more processors (a term which as used herein refers to physical processors, e.g., implemented on a semiconductor device), the described functionality is effectuated. In some embodiments, notwithstanding use of the singular term "medium," the medium may be distributed, with different subsets of the instructions stored on different computing devices that effectuate those different subsets, an arrangement consistent with use of the singular term "medium" along with monolithic applications on a single device. In some embodiments, the described operations may be executed in a different order, some or all of the operations may be executed multiple times, operations may be executed concurrently with one another or multiple instances of the described process, additional operations may be inserted, operations may be omitted, operations may be executed serially, or the processes described may otherwise be varied, again none of which is to suggest that any other description herein is limiting.

In some embodiments, the process 500 includes obtaining, as indicated by block 502, for a plurality of entities, datasets. The datasets may be events or attributes involving the entities. In some embodiments, at least a subset of the events are actions by the entities and some of these actions may be targeted actions.

In some embodiments, a plurality of objects may be formed, as indicated by block 504. Objects may include events and attributes extracted from datasets.

In some embodiments, these datasets may be labeled with object-oriented tags, as indicated by block 506, used to classify entity logs. In some embodiments, labelling is a process of adding tags to data. Augmenting data with labels may make it more informative and more manageable. One use of labelling in object-oriented modeling may be management of labels, not as elements in a list or table, but as objects allowing a collection of tags to be used. As objects, OO-labels may be managed and organized through enforced set of grammar and semantic rules. One attribute of an OO-label may be a user facing text for sake of user experience (UX). In some embodiments, OO-labels may be used in a single ontology used for multiple customers, each with a ML-label for their business realizing a MUPL. OO-labels may encode meta-data about a dataset, control information, and governance information among other things.

In some embodiments, a library of classes may be formed, as indicated by block 508. The library of classes may include the classes shown in FIG. 7. Some of the classes of the library of classes may include various quality management systems, as indicated by block 510.

In some embodiments, validators may be CEREBRI public objects ensuring, integrity, governance, and quality objects used to ensure no data linkage or inconsistency of datasets, ML-labels, performance (OQM) and windows of processing. Validators may check database consistency applied to aspects of an OOM. A function of validators may be triggering retraining of part or complete pipelines based on quality or operational triggers.

In some embodiments, quality Management (QM) in an object-oriented modeling paradigm that may be implemented as a process that integrates raw data ingestion, manipulation, transformation, composition, and storage for building artificial intelligence models. In legacy designs, quality management may include (and in some cases may be limited to) Extract, Transform, and Load (ETL) phases of effort and to the reporting of model performance (e.g., recall, precision, Fl, etc.) from an end to end perspective as a quality.

Deposition of design process and operation of models, developed using OOM into objects, may facilitate efforts to cause quality to be embedded in objects. Quality may be attributes of objects. Modelor, bound modelors, and pipelines may be managed through multiple lifecycles rather than a single one. In some embodiments, Object-Oriented QM (OQM) may have six components:

a. Data quality monitoring (DQM): DQM measures, not necessarily exclusively (which is not to suggest that other lists are exclusive), new or missing data source (table) or data element, counts, mull count and unique counts, and datatype changes. DQM may be used to figure out which data sources are reliable.
 b. Model quality monitoring (MQM): MQM may measure, not necessarily exclusively (which is not to suggest that other lists are exclusive), model-based metrics, such as F1, precision, recall, etc., or data, and triggers retraining for drift.
 c. Score quality monitoring (SQM): SQM may perform model hypothesis tests, including Welch's t-test (e.g., parametric test for equal means) and the Mann-Whitney U-test (e.g., non-parametric test for equal distributions). SQM may also compute lift tables, a decile table based on the predicted probability of positive class membership, with the cumulative distribution function of positive cases added in. The gain chart is a plot of the cumulative distribution function of positive cases may be included as a function of quantile.

d. Label quality monitoring (LQM): Labels may be categorical and bound by semantic rules or ontologies. LQM may be used to understand which data sources are leverageable and impactful. LQM may be used for data debt management and enhancing compositions for performance.

e. Bias quality monitoring (BQM): Bias is a systematic distortion of the relationship between a variable, a data set, and results. Three types of bias may be distinguished: information bias, selection bias, and confounding, in some embodiments.

f. Private quality monitoring(PQM): Privacy may cover personally identifiable information and access of privileged information.

In some embodiments, a plurality of object-manipulation functions may be formed as indicated by block 512. Each of the object-manipulation objects may be configured to leverage a specific class.

In some embodiments, an object-orientated orchestration may be formed as indicated by block 514. An orchestration may be an organization of a collection of steps that perform a specific objective when executed by a computing system. Orchestrations may operate on objects to create new objects and thus may be recursive.

In some embodiments, the object-orientated orchestration may then be used to select a set of actions to achieve a given targeted action. To this end, some embodiments may receive a request from an entity or a subscriber as indicated by block 516. Some embodiments may then determine the set of actions to achieve (or increase the likelihood of achieving) the given targeted action, as indicated by block 518 in FIG. 16, while ensuring a certain level of accuracy using the quality management systems.

Figure 17:
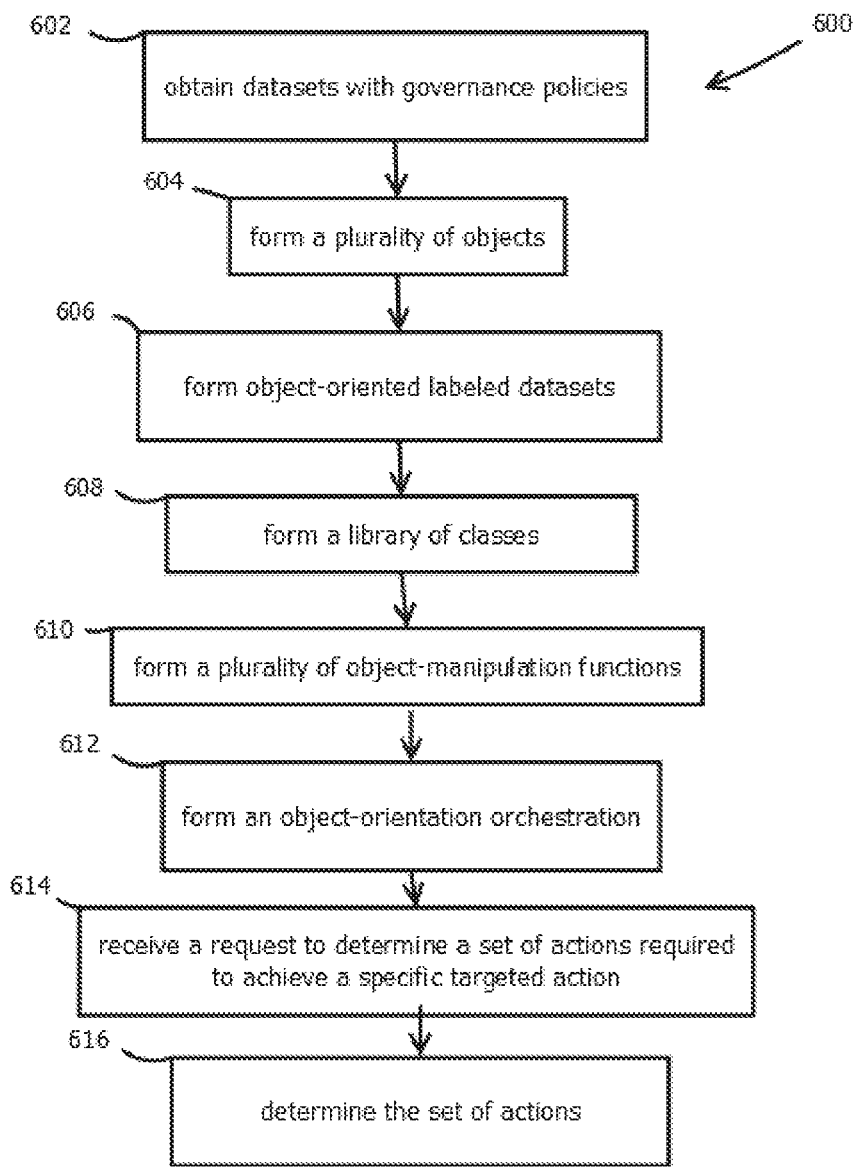
FIG. 17 is a flowchart showing an example of a process by which a targeted action is determined using an object-orientation orchestrator based on a set of governance attributes.

In some embodiments, the controller 10 may execute a process 600 shown in FIG. 17. In some embodiments, different subsets of this process 600 may be executed by the illustrated components of the controller 10, so those features are described herein concurrently. It should be emphasized, though, that embodiments of the process 600 are not limited to implementations with the architecture of FIG. 1, and that the architecture of FIG. 1 may execute processes different from that described with reference to FIG. 17, none of which is to suggest that any other description herein is limiting.

In some embodiments, the process 600 includes obtaining, as indicated by block 602, for a plurality of entities, datasets. The datasets may be events or attributes involving the entities. In some embodiments, at least a subset of the events are actions by the entities and some of these actions may be targeted actions. Some of the attributes are governance attributes, including the governance attributes 9003 shown in FIG. 9.

In some embodiments, governance in CEREBRI may be a set of structures, processes and policies by which pipeline development, deployment, and use function within an organization or set of organizations is directed, managed, and controlled to yield business value and to mitigate risk.

In some embodiments, a policy in CEREBRI may refer to set of rules, controls, and resolutions put in place to dictate model behavior individually as a whole. Policies are a way governance is encoded and managed in some embodiments. The policy items are referred to as policors and implemented as CEREBRI objects. As the number of rules increase, a policy-driven OOM may suffer from inconsistencies incurred by contradicting rules governing its behavior. In some embodiments, meta-policies (e.g., detection rules) may be used for the detection of conflicts. In some embodiments, policy relationships may be used. In some embodiments, attribute-based applicability spaces may be used.

In some embodiments, a plurality of objects may be formed, as indicated by block 604. A data domain may be used to transform datasets into objects. Objects may include events and attributes extracted from datasets.

In some embodiments, these datasets may be labeled with object-oriented tags, as indicated by block 606, used to classify entity logs. Then, a library of classes may be formed, as indicated by block 608. The library of classes may include the classes shown in FIG. 7. Also, a plurality of object-manipulation functions may be formed as indicated by block 610. Each of the object-manipulation objects may be configured to leverage a specific class.

In some embodiments, an object-orientated orchestration may be formed as indicated by block 612. An orchestration may be an organization of a collection of steps that perform a specific objective when executed by a computing system. Orchestrations may operate on objects to create new objects and thus may be recursive.

In some embodiments, the object-orientated orchestration may then be used to select a set of actions to achieve a given targeted action similar to the process shown in FIG. 2. To this end, some embodiments may receive a request from an entity or a subscriber as indicated by block 614. Some embodiments may then determine the set of actions to achieve (or increase the likelihood of achieving) the given targeted action, as indicated by block 616 in FIG. 17, for instance, with a potential targeted action 20 in FIG. 1.

The physical architecture may take a variety of forms, including as monolithic on-premises applications executing on a single host on a single computing device, distributed on-premise applications executing on multiple hosts on one or more local computing devices on a private network, distributed hybrid applications having on-premises components and other components provided in a software as a service (SaaS) architecture hosted in a remote data center with multi-tenancy accessed via the network, and distributed SaaS implementations in which various subsets or all of the functionality described herein is implemented on a collection of computing devices in one or more remote data centers serving multiple tenants, each accessing the hosted functionality under different tenant accounts. In some embodiments, the computing devices may take the form of the computing device described below with reference to FIG. 18.

Figure 18:
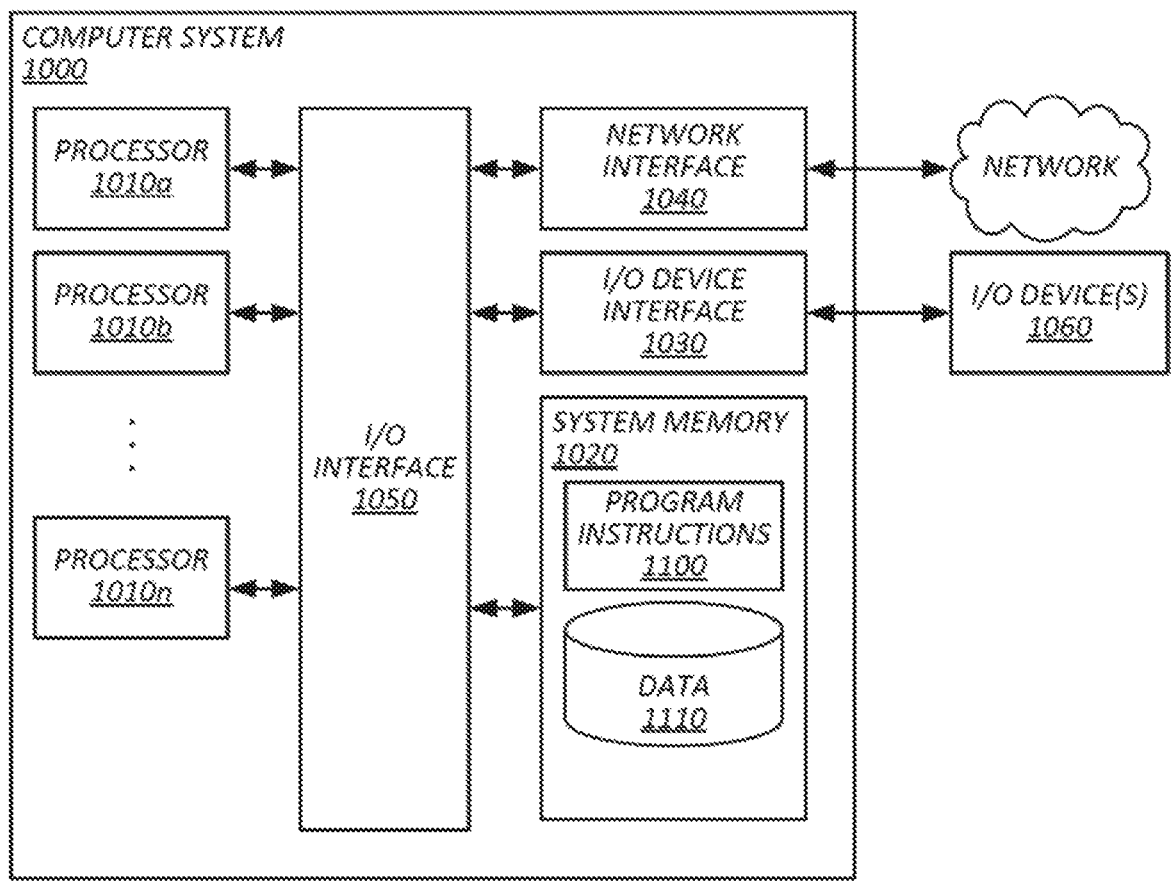
FIG. 18 shows an example of a computing device by which the above-described techniques may be implemented.

FIG. 18 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include a Graphic Processing Unit (GPU). A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory, elements of distributed systems, and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1A. A tangible, non-transitory, machine-readable medium storing instructions that when executed by one or more processors effectuate operations comprising: obtaining, with one or more processors, for a plurality of entities, datasets, wherein: the datasets comprise a plurality of entity logs; the entity logs comprise events involving the entities; at least some of the events are actions by the entities; at least some of the actions are targeted actions; the entity logs comprise or are otherwise associated with attributes of the entities; and the events are distinct from the attributes; orchestrating, with one or more processors, an object-orientated application or service by: forming a plurality of objects, wherein each object of the plurality of objects comprises a different set of attributes and events; forming object-oriented labeled datasets based on the event and the attributes of each of the datasets; forming a library or framework of classes with a plurality of object-orientation modelors; and forming a plurality of object-manipulation functions, each function being configured to leverage a respective class among the library or framework of classes; receiving, with one or more processors, a request to determine a set of actions to achieve, or increase likelihood of, a given targeted action; assigning, with one or more processors, the given targeted action to a first subset of classes from the library or framework of classes of the object-orientated application or service; and determining, with one or more processors, based on the assigning, the set of actions to achieve, or increase likelihood of, the given targeted action using a first subset of the plurality of object-manipulation functions leveraging the first subset of classes from the library or framework of classes of the object-orientated application or service.

2A. The medium of embodiment 1A, wherein the orchestrating further comprises: adding version numbers to the datasets; adding primary surrogate keys to the datasets and updating the version numbers; and encoding the datasets in dimensional star schema and updating the version numbers.

3A. The medium of any one of embodiments 1A-2A, wherein the orchestrating further comprises: forming a first training dataset from the datasets; training, with one or more processors, a first machine-learning model on the first training dataset by adjusting parameters of the first machine-learning model to optimize a first objective function that indicates an accuracy of the plurality of object-orientation modelors in generating the library or framework of classes; and storing, with one or more processors, the adjusted parameters of the trained first machine-learning model in memory.

4A. The medium of embodiment 3A, wherein training comprises training with gradient descent.

5A. The medium of any one of embodiments 1A-4A, wherein the orchestrating further comprises: forming a second training dataset from the datasets; training, with one or more processors, a second machine-learning model on the second training dataset by adjusting parameters of the second machine-learning model to optimize a second objective function that determines the first subset of the plurality of object-manipulation functions; and storing, with one or more processors, the adjusted parameters of the trained second machine-learning model in memory.

6A. The medium of any one of embodiments 1A-5A, wherein the plurality of entity logs comprise: consumers; communications to consumers by an enterprise; communications to an enterprise by consumers; purchases by consumers from an enterprise; non-purchase interactions by consumers with an enterprise; and a customer relationship management system of an enterprise.

7A. The medium of embodiment 6A, wherein: the enterprise is a credit card issuer and the given targeted action is predicting whether a consumer will default; the enterprise is a lender and the given targeted action is predicting whether a consumer will borrow; the enterprise is an insurance company and the given targeted action is predicting whether a consumer will file a claim; the enterprise is an insurance company and the given targeted action is predicting whether a consumer will sign-up for insurance; the enterprise is a vehicle seller and the given targeted action is predicting whether a consumer will purchase a vehicle; the enterprise is a seller of goods and the given targeted action is predicting whether a consumer will file a warranty claim, the enterprise is a wireless operator and the given targeted action is predicting whether a consumer upgrade their cellphone, or the enterprise is a bank and the given targeted action is predicting GDP variation.

8A. The medium of any one of embodiments 1A-7A, wherein the assignment of the given targeted action to a first subset of classes comprises: assigning the given targeted action to a first subset of the plurality of objects using a second subset of the plurality of object-manipulation functions; and determining the first subset of classes from the library or framework of classes of the object-orientated application or service that are related to the first subset of the plurality of objects.

9A. The medium of embodiment 8A, wherein second subset of the plurality of object-manipulation functions are configured to add new objects to the plurality of objects.

10A. The medium of embodiment 9A, wherein the new objects comprise attributes and events related to the given targeted action.

11A. The medium of any one of embodiments 1A-10A, wherein the datasets comprise: a data frame; a data stream; a column in a table; a row in a column; a cell in a table; structured data; and unstructured data.

12A. The medium of any one of embodiments 1A-11A, wherein the plurality of object-manipulation functions comprises: a sequence function used to change a collection of events into a time sequences for processing; a feature function used to gather features of a first object-orientation modelor and then use the features in a second object-orientation modelor; an economic function used to: gather economic objectives and economic constraints of an entity; and employ an allocation algorithm to maximize the objectives; and an ensembling function used to combine a first subset of the library or framework of classes.

13A. The medium of embodiment 12A, wherein the plurality of object-manipulation functions are arranged to perform in series.

14A. The medium of embodiment 12A, wherein the plurality of object-manipulation functions are arranged to change orders dynamically based on the given targeted action.

15A. The medium of any one of embodiments 1A-14A, wherein the plurality of object-orientation modelors comprises: a scaled propensity modelor used to calculate probability of a customer making an economic commitment; a timing modelor used to calibrate moments in time when a customer is likely to engage with the given targeted action; an affinity modelor used to capture ranked likes and dislikes of an entity's customers for a first subset of targeted actions; a best action modelor used to create a framework for concurrent Key Performance Index of the given targeted action at different points in a customer's journey; and a cluster modelor used to group an entity's customers based on the customers' behavior into a finite list.

16A. The medium of embodiment 15A, wherein the plurality of object-orientation modelors are arranged to perform in series or in parallel.

17A. The medium of embodiment 15A, wherein the plurality of object-orientation modelors are arranged to change orders dynamically based on the given targeted action.

18A. The medium of any one of embodiments 1A-17A, wherein: the given targeted action comprises a plurality of sub-targets; and at least some targets of the plurality of sub-targets are expected to happen at different times in future.

19A. The medium of any one of embodiments 1A-18A, wherein: the given targeted action comprises a plurality of sub-targets; and the plurality of object-orientation modelors comprises: a scaled propensity modelor used to calculate probability of a customer making an economic commitment; a timing modelor used to calibrate moments in time when a customer is likely to engage with each subset of the plurality of sub-targets; an affinity modelor used to capture ranked likes and dislikes of an entity's customers for a first subset of targeted actions; a best action modelor used to create a framework for concurrent Key Performance Index for each subset of the plurality of sub-targets at different points in a customer's journey; a cluster modelor used to group an entity's customers based on the customers' behavior into a finite list; and wherein: a first subset of the plurality of object-orientation modelors are used for a first subset of the plurality of sub-targets; a second subset of the plurality of object-orientation modelors are used for a second subset of the plurality of sub-targets; and wherein the order in which the first subset of the plurality of object-orientation modelors perform is different from the order in which the second subset of the plurality of object-orientation modelors perform.

20A. The medium of any one of embodiments 1A-10A, wherein the object-oriented labeled datasets formed according to an ontology of events.

21A. The medium of embodiment 20A, wherein the ontology of events comprises Concurrent Ontology Labelling Datastore (COLD) methodology.

22A. The medium of any one of embodiments 1A-21A, wherein the object-oriented labeled datasets formed according to a hierarchal taxonomy of events.

1B. A tangible, non-transitory, machine-readable medium storing instructions that when executed by one or more processors effectuate operations comprising: identifying, with one or more processors, feature processing transformations of one or more datasets; identifying, with one or more processors, pipelines of the transformations, the pipelines being pipelines in an object-oriented modeling application; forming, with one or more processors, a first plurality of classes using object-oriented modeling of the feature processing transformations of the one or more datasets, the first plurality of classes being classes of objects in the object-oriented modeling application; forming, with one or more processors, a second plurality of classes using object-oriented modeling of the pipelines, the second plurality of classes being classes of objects in the object-oriented modeling application; forming, with one or more processors, a third plurality of classes using object-oriented modeling of the one or more datasets, the third plurality of classes being classes of objects in the object-oriented modeling application; interrogating, with one or more processors, a class library containing the first plurality of classes to determine first class definition information; interrogating, with one or more processors, a class library containing the second plurality of classes to determine second class definition information; selecting, with one or more processors, a given dataset from the one or more datasets or other datasets; interrogating, with one or more processors, a class library containing the third plurality of classes to determine third class definition information; accessing, with one or more processors, the first, second, and third class definitions information to produce an interdependency graph of one or more data processing operator instances of a given pipeline among the pipelines of the transformations; generating, with one or more processors, an execution schedule of the given pipeline based on the interdependency graph; causing, with one or more processors, execution of the given pipeline according to the execution schedule; accessing the first definition information to process the given dataset; and storing a result of processing the given dataset in memory.

2B. The medium of embodiment 1B, wherein the operations further comprise: accessing attributes of the given dataset at each of a plurality of modelors of the given pipeline.

3B. The medium of any one of embodiments 1B-2B, wherein causing execution of the given pipeline according to the execution schedule comprises: executing the given pipeline on a distributed cluster computing framework.

4B. A tangible, non-transitory, machine-readable medium storing instructions that when executed by one or more processors effectuate operations comprising: writing, with one or more processors, a first plurality of classes using object-oriented modelling; writing, with one or more processors, a second plurality of classes using object-oriented modelling of modeling topics; scanning, with one or more processors, a class library containing the first plurality of classes to determine class definition information; scanning, with one or more processors, a class library containing the second plurality of classes to determine class definition information; receiving, with one or more processors, at an orchestrating system, from a subscribing modeling object a request for a subscription to a given modeling topic in a given modeling topic class among the second plurality of classes, the subscription request including a modeling topic filter to select the given modeling topic from a plurality of modeling topics described by the given modeling topic class; registering, with one or more processors, by the orchestrating system, a modeling topic accessor associated with the subscribing modeling object; registering, with one or more processors, by the orchestrating system, a modeling topic mutator associated with the subscribing modeling object; processing, with one or more processors, by the orchestrating system, through the modeling topic filter a modeling topic that is accessed through an accessor and is described by the modeling topic class, the modeling topic being received from a modeling publisher object; notifying, with one or more processors, by the orchestrating system, the subscribing object of the received modeling topic through a registered modeling topic listener, in response to determining that the received modeling topic matches the modeling topic filter; and mutating, with one or more processors, the received modeling topic at the subscriber modeling object in response to determining that the received modeling topic matches the modeling topic filter included in the request for a subscription.

5B. The medium of embodiment 4B, wherein mutating comprises: adding an attribute to an object, deleting an attribute of an object, updating an attribute of an object, reading an attribute an object, adding reference to another object as an attribute, using a setter, or using a getter.

6B. The medium of any one of embodiments 4B-5B, wherein mutating comprises: adding an attribute to an object, deleting an attribute of an object, updating an attribute of an object, reading an attribute an object, adding reference to another object as an attribute, using a setter, and using a getter.

7B. The medium of any one of embodiments 4B-6B, wherein: items captured in modeling topics include: consumers, communications to consumers by an enterprise, communications to an enterprise by consumers, events that include purchases by consumers from the enterprise, and events that include non-purchase interactions by consumers with the enterprise; and at least some items are obtained from entity logs that are obtained from a customer relationship management system of the enterprise.

8B. The medium of embodiment 7B, wherein: a result of the operations is used by a trained predictive machine learning model developed using an object-oriented modeling (OOM) framework.

9B. The medium of embodiment 8B, wherein: the enterprise is a credit card issuer and the trained predictive machine learning model developed using the OOM framework is configured to predict whether a consumer will default; the enterprise is a lender and the trained predictive machine learning model developed using the OOM framework is configured to predict whether a consumer will borrow; the enterprise is an insurance company and the trained predictive machine learning model developed using the OOM framework is configured to predict whether a consumer will file a claim; the enterprise is an insurance company and the trained predictive machine learning model developed using the OOM framework is configured to predict whether a consumer will sign-up for insurance; the enterprise is a vehicle seller and the trained predictive machine learning model developed using the OOM framework is configured to predict whether a consumer will purchase a vehicle; the enterprise is a seller of goods and the trained predictive machine learning model developed using the OOM framework is configured to predict whether a consumer will file a warranty claim, or the enterprise is a wireless operator and the trained predictive machine learning model developed using the OOM framework is configured to predict whether a consumer upgrade their cellphone, or the enterprise is bank and the trained predictive machine learning model developed using the OOM framework is configured to predict the change in GDP.

10B. A tangible, non-transitory, machine-readable medium storing instructions that when executed by one or more processors effectuate operations comprising: obtaining, with one or more processors, for a plurality of entities, datasets, wherein: the datasets comprise a plurality of entity logs; a first subset of the plurality of entity logs are events involving the entities; a first subset of the events are actions by the entities; at least some of the actions are targeted actions; a second subset of the plurality of entity logs are attributes related to the entities; and the events are distinct from the attributes; forming, with one or more processors, an object-orientated orchestration, the object-orientated orchestration comprising: forming a plurality of objects, wherein each object of the plurality of objects comprises a different set of attributes and events; forming object-oriented labeled datasets based on the event and the attributes of each of the datasets; forming a library of classes, generated by a plurality of object-orientation modelors; and forming a plurality of object-manipulation functions, each function configured to leverage a specific class; forming a first training dataset from the datasets; training, with one or more processors, a first machine-learning model on the first training dataset by adjusting parameters of the first machine-learning model to optimize a first objective function that indicates interdependency of the plurality of object-manipulation functions in leveraging a specific class; forming an interdependency graph using, at least in part, the first objective function; and storing, with one or more processors, the adjusted parameters of the trained first machine-learning model in memory; receiving a request to determine a set of actions required to achieve a specific targeted action; determining, with one or more processors, the set of actions required to achieve the specific targeted action using a compiler function, the compiler function comprising: assigning the specific targeted action to a first subset of the plurality of objects using a first subset of the plurality of object-manipulation functions, wherein: the first subset of the plurality of object-manipulation functions is formed using the interdependency graph; and determining a first subset of classes from the library of classes of the object-oriented orchestration that are related to the first subset of the plurality of objects; determining the set of actions required to achieve the specific targeted action using a second subset of the plurality of object-manipulation functions, wherein: the second subset of the plurality of object-manipulation functions is formed using the interdependency graph; and each object-manipulation function of the second subset of the plurality of object-manipulation functions is configured to leverage at least one class of the first subset of classes from the library of classes of the object-oriented orchestration.

11B. The medium of embodiment 10B, wherein the interdependency graph comprises: a plurality of execution schedules, wherein each execution schedule from the plurality of execution schedules comprises a subset of the object-manipulation functions.

12B. The medium of embodiment 11B, wherein each execution schedule from the plurality of execution schedules is configured to leverage at least one class from the library of classes.

13B. The medium of any one of embodiments 10B-12B, wherein the interdependency graph comprises: a plurality of execution triggers, wherein each execution trigger from the plurality of execution triggers comprises a subset of the object-manipulation functions.

14B. The medium of any one of embodiments 10B-13B, wherein the interdependency graph comprises: a plurality of execution schedules, wherein each execution schedule from the plurality of execution schedules comprises a subset of the object-manipulation functions, a plurality of execution triggers, wherein each execution trigger from the plurality of execution triggers comprises a subset of the object-manipulation functions, and an orchestrator assigning execution triggers or execution schedules within the interdependency graph.

15B. The medium of any one of embodiments 10B-14B, wherein the formation object-orientated orchestration further comprises: forming a second training dataset from the datasets; training, with one or more processors, a second machine-learning model on the second training dataset by adjusting parameters of the second machine-learning model to optimize a second objective function that determines the first subset of the plurality of object-manipulation functions; and storing, with one or more processors, the adjusted parameters of the trained second machine-learning model in memory.

16B. The medium of any one of embodiments 10B-15B, comprising indicating interdependency of the plurality of object-manipulation functions in leveraging a specific class with the first trained machine learning at least in part by: obtaining a given entity log of the given entity; determining a plurality of features from the given entity log, the plurality of features having fewer dimensions than the given entity log; and inputting the determined plurality of features into the first trained machine learning model to cause the model to output a value indicative of the interdependency of the plurality of object-manipulation functions in leveraging a specific class related to the given entity.

17B. The medium of any one of embodiments 10B-16B, wherein: the first machine learning model is based on a plurality of decision trees combined with an ensemble procedure; and the ensemble procedure is boosting, random forest or other form of bootstrap aggregation, or rotation forest; and at least some of the decision trees are trained with classification and regression tree by recursively splitting a feature space of inputs to the first machine learning model along different dimensions of the feature space at values of respective dimensions that locally optimize the respective split to minimize entropy of Gini impurity of targeted actions and non-targeted actions on each side of respective splits.

18B. The medium of any one of embodiments 10B-17B, comprising, before training, transforming each entity log into a collection of features to which the first machine learning model is capable of responding and training the model on features of the collection of features.

19B. The medium of embodiment 18, wherein at least some of the features are determined by the attributes, the attributes comprising: entity restrictions for at least some of the plurality of entities; entity business protocols for at least some of the plurality of entities; entity policies for at least some of the plurality of entities; entity authorized users for at least some of the plurality of entities; and entity security protocols for at least some of the plurality of entities.

20B. The medium of any one of embodiments 10B-19B, wherein training comprises means for training.

21B. The medium of any one of embodiments 10B-20B, wherein the plurality of entity logs comprise information about: consumers; communications to consumers by an enterprise; communications to an enterprise by consumers; purchases by consumers from an enterprise; non-purchase interactions by consumers with an enterprise; and a customer relationship management system of an enterprise.

22B. The medium of any one of embodiments 10B-21B, wherein: the enterprise is a credit card issuer and the specific targeted action is predicting whether a consumer will default; the enterprise is a lender and the specific targeted action is predicting whether a consumer will borrow; the enterprise is an insurance company and the specific targeted action is predicting whether a consumer will file a claim; the enterprise is an insurance company and the specific targeted action is predicting whether a consumer will sign-up for insurance; the enterprise is a vehicle seller and the specific targeted action is predicting whether a consumer will purchase a vehicle; the enterprise is a seller of goods and the specific targeted action is predicting whether a consumer will file a warranty claim, the enterprise is a wireless operator and the specific targeted action is predicting whether a consumer upgrade their cellphone, or the enterprise is a bank and the specific targeted action is predicting GDP variation.

23B. The medium of any one of embodiments 10B-22B, wherein the first trained model is configured to filter some of the entity logs, wherein the filtration comprise: a dependency level among the entity logs calculated by Bayesian Networks; a logistic regression calculated by Lasso and ElasticNet penalty functions; or a product moment correlation coefficient calculated by Pearson correlation.

24B. The medium of any one of embodiments 10B-23B, wherein the object-oriented labeled datasets formed according to an ontology of events.

25B. The medium of any one of embodiments 10B-24B, wherein the object-oriented labeled datasets formed according to a hierarchal taxonomy of events.

26B. The medium of any one of embodiments 10B-24B, the operations further comprising: steps for determining the set of actions required to achieve the specific targeted action.

27B. The medium of any one of embodiments 10B-26B, wherein the operations further comprise: formation of the interdependency graph using, at least in part, feature engineering modelors, the feature engineering modelors comprise: recency feature engineering modelors; frequency feature engineering modelors; lag feature engineering modelors; difference feature engineering modelors; and harmonic analysis feature engineering modelors; wherein the feature engineering modelors are a subset of plurality of object-orientation modelors.

28B. The medium of any one of embodiments 10B-27B, wherein the plurality of object-manipulation functions comprise: a feature engineering function used to gather features of a first object-orientation modelor and then use the features in a second object-orientation modelor, wherein the feature engineering function comprises: a recency feature engineering sub-routine; a frequency feature engineering sub-routine; a lag feature engineering sub-routine; a difference feature engineering sub-routine; and a harmonic analysis feature engineering sub-routine.

29B. The medium of any one of embodiments 10B-28B, wherein the plurality of object-orientation modelors comprise: a scaled propensity modelor used to calculate probability of a customer making an economic commitment; a timing modelor used to calibrate moments in time when a customer is likely to engage with the specific targeted action; an affinity modelor used to capture ranked likes and dislikes of an entity's customers for a first subset of targeted actions; a best action modelor used to create a framework for concurrent Key Performance Index of the specific targeted action at different points in a customer's journey; and a cluster modelor used to group an entity's customers based on the customers' behavior into a finite list.

30B. The medium of any one of embodiments 10B-29B, the operations further comprising forming an object-orientated orchestration by: adding version indicators to the datasets; adding primary surrogate keys to the datasets and updating the version indicators; and encoding the datasets in dimensional star schema and updating the version indicators.

31B. The medium of any one of embodiments 10B-30B, the operations further comprising forming an object-orientated orchestration by: adding version indicators to the modelors.

1C. A tangible, non-transitory, machine-readable medium storing instructions that when executed by one or more processors effectuate operations comprising: forming, with one or more processors, a first plurality of classes using object-oriented modelling of modelling objects, the modelling objects being used to implement a machine learning design based on optimization criteria using an object-oriented modeling (OOM) framework, the first plurality of classes being members of a first class library; forming, with one or more processors, a second plurality of classes using object-oriented modelling of an orchestration of the machine learning design, the second plurality of classes being members of a second class library; forming, with one or more processors, a third plurality of classes using object-oriented modelling of the optimization criteria, the optimization criteria being used to optimize an orchestration of the modelling objects, the third plurality of classes being members of a third class library; forming, with one or more processors, a fourth plurality of classes using object-oriented modelling of the optimization of the orchestration of the modelling objects, the fourth plurality of classes being members of a fourth class library; forming, with one or more processors, a fifth plurality using object-oriented modelling of an optimization value, the fifth plurality of classes being members of a fifth class library; accessing, with one or more processors, an optimization criterion object from the third class library; accessing, with one or more processors, the third class library to determine first class definition information, the first class definition information being class definition information of the optimization criterion object; accessing, with one or more processors, the first class library to determine second class definition information; accessing, with one or more processors, the fourth class to determine third class definition information; using, with one or more processors, at least some of the first, second, or third class definition information to form a sequence of object manipulation function to effectuate access by an orchestration system to methods and attributes of at least some of the first, second, third, fourth, or fifth plurality of classes to manipulate objects of the first plurality of classes; using, with one or more processors, at least some of the first, second, or third class definition information to effectuate access to the object manipulation functions by the orchestration system; processing, with one or more processors, orchestration of modelling, the orchestration including statements seeking access to one or more modelling object classes among the first plurality of classes within the first class library; processing, with one or more processors, an optimization method of orchestration, the optimization method including statements seeking access to one or more orchestration object classes among the second plurality of classes within the second class library; processing, with one or more processors, optimization criteria of the optimization method, the optimization criteria including statements seeking access to one or more orchestration object classes among the second plurality of classes within the second class library; and invoking, with one or more processors, previously formed object manipulation functions using at least some of the sought access to activate the object manipulation functions during implementation by the optimization system of the optimization method, thereby causing use of the optimization to access modelling object classes among the first plurality of classes.

2C. The medium of embodiment 1C, wherein the instructions are executed in the optimization system to execute optimization the orchestration of modelling objects for implementation of the machine learning design based on optimization criteria using an object-oriented modeling (OOM) framework.

3C. A tangible, non-transitory, machine-readable medium storing instructions that when executed by one or more processors in a computing system to effectuate operations to execute the processing of modeling methods organized in racks of a machine learning pipeline to facilitate optimization of performance using modelling methods for implementation of machine learning design in an object-oriented modeling (OOM) framework, the operations comprising: writing, with the computer system, a first plurality of classes of a first class library using object-oriented modelling of optimization methods; writing, with the computer system, a second plurality of classes of a second class library using object-oriented modelling of said modelling methods; writing, with the computer system, parameters and hyper-parameters of the modeling methods as attributes as the modeling methods; writing, with the computer system, a plurality of classes of a third class library using object-oriented modelling of the modelling racks; scanning, with the computer system, modelling racks classes among the third plurality of classes in the third class library to determine first class definition information; selecting, with the computer system, a collection of one or more racks among the racks of the machine learning pipeline; for each rack in the collection, with the computer system, selecting one or more modeling method objects; scanning, with the computer system, modelling method classes among the second plurality of classes in the second class library to determine second class definition information; assigning, with the computer system, one or more racks and locations within the one or more racks to corresponding selected modeling method objects; invoking, with the computer system, at least some of the second class definition information of modeling method classes and at least some of the first class definition information of the modeling racks to produce object manipulation functions that allow the computer system to access the methods and attributes of at least some of the modeling method objects, at least some of the manipulation functions being configured to effectuate writing locations within racks and attributes of racks; selecting, with the computer system, an optimization method among the optimization methods; and creating, with the computer system, an optimization object.

4C. The medium of embodiment 3C, the operations further comprising: invoking the class definition information of at least one modeling method class and at least some class definition information of at least one modeling rack and at least some class definition information of at least one optimization method to produce additional object manipulation functions that allow the computing system to access methods and attributes of a corresponding optimization object to manipulate the corresponding optimization object; and invoking the class definition of the least one optimization method to optimize the corresponding optimization object.

5C. The medium of any one of embodiments 3C-4C, wherein: the operations further comprise processing data construct objects based on entity logs; entities captured in the data construct objects comprise: consumers, communications to consumers by an enterprise, communications to an enterprise by consumers, and events that include purchases by consumers from the enterprise and non-purchase interactions by consumers with the enterprise; and the entity logs are obtained from a customer relationship management system of the enterprise.

6C. The medium of embodiment 5C, wherein: the enterprise is a credit card issuer and a trained predictive machine learning model developed using the object-oriented modeling (OOM) framework is configured to predict whether a consumer will default; the enterprise is a lender and the trained predictive machine learning model developed using the OOM framework is configured to predict whether a consumer will borrow; the enterprise is an insurance company and the trained predictive machine learning model developed using the OOM framework is configured to predict whether a consumer will file a claim; the enterprise is an insurance company and the trained predictive machine learning model developed using the OOM framework is configured to predict whether a consumer will sign-up for insurance; the enterprise is a vehicle seller and the trained predictive machine learning model developed using the OOM framework is configured to predict whether a consumer will purchase a vehicle; the enterprise is a seller of goods and the trained predictive machine learning model developed using the OOM framework is configured to predict whether a consumer will file a warranty claim; the enterprise is a wireless operator and the trained predictive machine learning model developed using the OOM framework is configured to predict whether a consumer upgrade their cellphone; or the enterprise is bank and the trained predictive machine learning model developed using the OOM framework is configured to predict the change in GDP.

7C. The medium of any one of embodiments 3C-6C, wherein: the operations further comprise processing data construct objects based on entity logs; entities captured in the data construct objects comprise: consumers, product information, service information, events that include purchases by consumers from the enterprise and non-purchase interactions by consumers with the enterprise, and events that include subscriptions by consumers from the enterprise and non-purchase interactions by consumers with the enterprise; and the entity logs are obtained from a customer relationship management system of the enterprise.

8C. A tangible, non-transitory, machine-readable medium storing instructions that when executed by one or more processors effectuate operations comprising: obtaining, with one or more processors, for a plurality of entities, datasets, wherein: the datasets comprise a plurality of entity logs; a first subset of the plurality of entity logs are events involving the entities; a first subset of the events are actions by the entities; at least some of the actions are targeted actions; a second subset of the plurality of entity logs are attributes related to the entities; and the events are distinct from the attributes; forming, with one or more processors, an object-orientated orchestration by: forming a plurality of objects, wherein each object of the plurality of objects comprises a different set of attributes and events; forming object-oriented labeled datasets based on the event and the attributes of each of the datasets; forming a library of classes, generated by a plurality of object-orientation modelors; and forming a plurality of object-manipulation functions, each function configured to leverage a specific class; receiving, with one or more processors, a request to determine a set of actions required to achieve a specific targeted action; and determining, with one or more processors, the set of actions required to achieve the specific targeted action using a compiler function, the compiler function comprising instructions to effectuate: assigning the specific targeted action to a first subset of the plurality of objects using a first subset of the plurality of object-manipulation functions; and determining a first subset of classes from the library of classes of the object-oriented orchestration that are related to the first subset of the plurality of objects; determining the set of actions required to achieve the specific targeted action using a second subset of the plurality of object-manipulation functions, wherein: each object-manipulation function of the second subset of the plurality of object-manipulation functions is configured to leverage at least one class of the first subset of classes from the library of classes of the object-oriented orchestration.

9C. The medium of embodiment 8C, wherein the compiler function further comprising instructions to effectuate: forming a first training dataset from the datasets; training a first machine-learning model on the first training dataset by adjusting parameters of the first machine-learning model to optimize a first objective function that indicates which object-manipulation functions from the plurality of object-manipulation functions should be included in the second subset of the plurality of object-manipulation functions; and storing the adjusted parameters of the trained first machine-learning model in memory.

10C. The medium of embodiment 9C, wherein: the first machine learning model comprises a Hidden Markov model.

11C. The medium of embodiment 9C, wherein: the first machine learning model comprises a long short-term memory model.

12C. The medium of embodiment 9C, wherein: the first machine learning model comprises a dynamic Bayesian network.

13C. The medium of embodiment 9C, wherein: the first machine learning model comprises a neural network classifier.

14C. The medium of embodiment 9C, wherein: the first machine learning model is part of a value function or an environment model of a reinforcement learning model.

15C. The medium of embodiment 9C, wherein training comprises steps for training.

16C. The medium of embodiment 9C, wherein the first dataset comprises: the first subset of the plurality of objects.

17C. The medium of embodiment 9C, comprising: inputting more than 1,000 entity logs corresponding to more than 1,000 entities input into the first trained machine learning model.

18C. The medium of any one of embodiments 8C-17C, wherein the compiler function further comprising instructions to effectuate: forming a first training dataset from the datasets; training a first machine-learning model on the first training dataset by adjusting parameters of the first machine-learning model to optimize a first objective function that indicates which object-manipulation functions from the plurality of object-manipulation functions should be included in the second subset of the plurality of object-manipulation functions; and storing the adjusted parameters of the trained first machine-learning modelling pipeline in memory.

19C. The medium of any one of embodiments 8C-18C, wherein the compiler function further comprising instructions to effectuate: forming a second training dataset from the datasets; training a second machine-learning model on the second training dataset by adjusting parameters of the second machine-learning model to optimize a second objective function that indicates the order of operation of each object-manipulation function in the second subset of the plurality of object-manipulation functions; and storing the adjusted parameters of the trained second machine-learning model in memory.

20C. The medium of any one of embodiments 8C-19C, wherein the plurality of entity logs comprise information about: consumers; communications to consumers by an enterprise; communications to an enterprise by consumers; purchases by consumers from an enterprise; non-purchase interactions by consumers with an enterprise; and a customer relationship management system of an enterprise.

21C. The medium of embodiment 20C, wherein: the enterprise is a credit card issuer and the specific targeted action is predicting whether a consumer will default; the enterprise is a lender and the specific targeted action is predicting whether a consumer will borrow; the enterprise is an insurance company and the specific targeted action is predicting whether a consumer will file a claim; the enterprise is an insurance company and the specific targeted action is predicting whether a consumer will sign-up for insurance; the enterprise is a vehicle seller and the specific targeted action is predicting whether a consumer will purchase a vehicle; the enterprise is a seller of goods and the specific targeted action is predicting whether a consumer will file a warranty claim, the enterprise is a wireless operator and the specific targeted action is predicting whether a consumer upgrade their cellphone, or the enterprise is a bank and the specific targeted action is predicting GDP variation.

22C. The medium of embodiment 20C, wherein the second subset of the plurality of object-manipulation functions further comprises: an economic optimization function with a plurality of function parameters, wherein the plurality of function parameters are adjusted based on business objectives of the enterprise.

23C. The medium of embodiment 22C, wherein the business objectives of the enterprise comprise: increase in revenue; increase in profit margin; or reduction in cost; wherein each of the business objectives has a set business constraints.

24C. The medium of embodiment 23C, wherein the at least some of the sets business constraints comprise: a plurality of specific age groups; a specific product or service; a window of time; and a plurality of geographical locations.

25C. The medium of embodiment 23C, wherein the at least some of the sets business constraints comprise: an amount of time to optimize operation; and an amount of hardware used to optimize operation.

26C. The medium of any one of embodiments 8C-25C, wherein: the specific targeted comprises a plurality of sub-targets; and the plurality of object-orientation modelors comprises: a scaled propensity modelor used to calculate probability of a customer making an economic commitment; a timing modelor used to calibrate moments in time when a customer is likely to engage with each subset of the plurality of sub-targets; an affinity modelor used to capture ranked likes and dislikes of an entity's customers for a first subset of targeted actions; a best action modelor used to create a framework for concurrent Key Performance Index for each subset of the plurality of sub-targets at different points in a customer's journey; a cluster modelor used to group an entity's customers based on the customers' behavior into a finite list; and wherein: a first subset of the plurality of object-orientation modelors are used for a first subset of the plurality of sub-targets; a second subset of the plurality of object-orientation modelors are used for a second subset of the plurality of sub-targets; and wherein the order in which the first subset of the plurality of object-orientation modelors perform is different from the order in which the second subset of the plurality of object-orientation modelors perform.

1D. A tangible, non-transitory, machine-readable medium storing instructions that when executed by one or more processors effectuate operations comprising: writing, with a computing system, a first plurality of classes using object-oriented modelling of modelling methods; writing, with the computing system, a second plurality of classes using object-oriented modelling of governance; scanning, with the computing system, a set of libraries collectively containing both modelling object classes among the first plurality of classes and governance classes among the second plurality of classes to determine class definition information; using, with the computing system, at least some of the class definition information to produce object manipulation functions, wherein the object manipulation functions allow a governance system to access methods and attributes of classes among first plurality of classes or the second plurality of classes to manipulate objects of at least some of the modelling object classes; and using at least some of the class definition information to effectuate access to the object manipulation functions.

2D. The medium of embodiment 1D, wherein: the operations execute quality management of modelling methods for implementation of machine learning design in an object-oriented modeling (OOM) framework.

3D. The medium of any one of embodiments 1D-2D, wherein: the modeled governance comprises a set of structures, processes, or policies by which pipeline development, deployment, or use functionality within an organization or set of organizations is directed, managed, or controlled.

4D. The medium of any one of embodiments 1D-3D, wherein: the modeled governance comprises a set of structures, processes, and policies by which pipeline development, deployment, and use functionality within an organization or set of organizations is directed, managed, and controlled.

5D. The medium of any one of embodiments 1D-4D, wherein: the modeled governance comprises a policy; and the policy comprises a set of rules, controls, or resolutions put in place to dictate model behavior.

6D. The medium of any one of embodiments 1D-5D, wherein: the modeled governance comprises a policy; and the policy comprises a set of rules, controls, or resolutions put in place to dictate model versioning.

7D. The medium of any one of embodiments 1D-6D, wherein: the modeled governance comprises a set of policors; and meta-policies having detection rules are used to detect conflicts among policors.

8D. A tangible, non-transitory, machine-readable medium storing instructions that when executed by one or more processors in a computing system effectuate operations to manage compliance governance using modelling methods in a pipeline for implementation of machine learning design in an object-oriented modeling (OOM) framework, the operations comprising: forming, with one or more processors, a first plurality of classes using object-oriented modelling of the modelling methods; forming, with one or more processors, a second plurality of classes using object-oriented modelling of governance compliance methods; scanning, with one or more processors, a class library containing modelling method classes to determine a first part of class definition information; scanning, with one or more processors, a class library containing governance compliance classes to determine a second part of class definition information; and using, with one or more processors, the first part of class definition information of the modeling method class and the second part of class definition information of the management method class to produce object manipulation functions that allow the computing system to access methods and attributes of a governance compliance object to manipulate a method class object.

9D. A tangible, non-transitory, machine-readable medium storing instructions that when executed by one or more processors in a computing system effectuate operations to measure quality of processing of data constructs in a pipeline using modelling methods for implementation of machine learning design in an object-oriented modeling (OOM) framework, the operations comprising: writing, with the computing system, a first plurality of classes using object-oriented modelling of the modelling methods; writing, with the computing system, a second plurality of classes using object-oriented modelling of quality measurement methods; scanning, with the computing system, a class library containing modelling method classes to determine a first part of class definition information; scanning, with the computing system, another class library containing quality management classes to determine a second part of class definition information; and invoking, with the computing system, the class definition information to produce object manipulation functions that allow the computing system to access methods and attributes of data classes to manipulate a modeling method class.

10D. The medium of embodiment 9D, wherein: the quality measurement methods comprise data quality monitoring (DQM), model quality monitoring (MQM), score quality monitoring (SQM), bias quality management (BQM), privacy quality management (PQM), or label quality monitoring (LQM).

11D. The medium of any one of embodiments 9D-10D, wherein: the operations comprise object manipulation by allowing reading of attributes, usage of a given modeling method, audit of usage of a given modeling object, reporting attempts to use the given modeling object, or verifying proper licensing.

12D. The medium of any one of embodiments 9D-11D, wherein: the operations comprise object manipulation by allowing reading of attributes, usage of a given modeling method, audit of usage of a given modeling object, reporting attempts to use the given modeling object, and verifying proper licensing; and the quality measurement methods comprise data quality monitoring (DQM), model quality monitoring (MQM), score quality monitoring (SQM), bias quality management (BQM), privacy quality management (PQM), and label quality monitoring (LQM).

13D. The medium any one of embodiments 9D-12D, wherein: the operations further comprise processing data construct objects based on entity logs; entities captured in the data construct objects comprise: consumers, communications to consumers by an enterprise, communications to an enterprise by consumers, and events that include purchases by consumers from the enterprise and non-purchase interactions by consumers with the enterprise; and the entity logs are obtained from a customer relationship management system of the enterprise.

14D. The medium any one of embodiments 9D-13D, wherein: the enterprise is a credit card issuer and a trained predictive machine learning model developed using the object-oriented modeling (OOM) framework is configured to predict whether a consumer will default; the enterprise is a lender and the trained predictive machine learning model developed using the OOM framework is configured to predict whether a consumer will borrow; the enterprise is an insurance company and the trained predictive machine learning model developed using the OOM framework is configured to predict whether a consumer will file a claim; the enterprise is an insurance company and the trained predictive machine learning model developed using the OOM framework is configured to predict whether a consumer will sign-up for insurance; the enterprise is a vehicle seller and the trained predictive machine learning model developed using the OOM framework is configured to predict whether a consumer will purchase a vehicle; the enterprise is a seller of goods and the trained predictive machine learning model developed using the OOM framework is configured to predict whether a consumer will file a warranty claim; the enterprise is a wireless operator and the trained predictive machine learning model developed using the OOM framework is configured to predict whether a consumer upgrade their cellphone; or the enterprise is bank and the trained predictive machine learning model developed using the OOM framework is configured to predict the change in GDP.

15D. A tangible, non-transitory, machine-readable medium storing instructions that when executed by one or more processors effectuate operations comprising: obtaining, with one or more processors, for a plurality of entities, datasets, wherein: the datasets comprise a plurality of entity logs; a first subset of the plurality of entity logs are events involving the entities; a first subset of the events are actions by the entities; at least some of the actions are targeted actions; a second subset of the plurality of entity logs are attributes related to the entities; a first subset of the attributes are governance attributes; and the events are distinct from the attributes; forming, with one or more processors, an object-orientated orchestration, the object-orientated orchestration comprising: forming a plurality of objects, wherein each object of the plurality of objects comprises a different set of attributes and events; forming object-oriented labeled datasets based on the event and the attributes of each of the datasets; forming a library of classes, generated by a plurality of object-orientation modelors; and forming a plurality of object-manipulation functions, each function configured to leverage a specific class; receiving a request to determine a set of actions required to achieve a specific targeted action; assigning the specific targeted action to a first subset of classes from the library of classes of the object-oriented orchestration; and determining, with one or more processors, the set of actions required to achieve the specific targeted action using a first subset of the plurality of object-manipulation functions related to the first subset of classes from the library of classes of the object-oriented orchestration.

16D. The medium of embodiment 15D, wherein the governance attributes comprises: entity restrictions for at least some of the plurality of entities; entity business protocols for at least some of the plurality of entities; entity policies for at least some of the plurality of entities; entity authorized users for at least some of the plurality of entities; and entity security protocols for at least some of the plurality of entities.

17D. The medium of any one of embodiments 15D-16D, wherein: a first subset of the plurality of object-orientation modelors are governance modelors; the governance modelors are configured to form governance classes; and a second subset of the plurality of object-manipulation functions are governance functions, wherein: the governance functions are configured to leverage at least one of the governance classes.

18D. The medium of embodiment 17D, wherein: a first subset of the governance modelors are ontology governance modelors; and a second subset of the governance modelors are taxonomy governance modelors.

19D. The medium of embodiment 17D, wherein the formation object-orientated orchestration further comprises: forming a first training dataset from the datasets; training, with one or more processors, a first machine-learning model on the first training dataset by adjusting parameters of the first machine-learning model to optimize a first objective function that indicates an accuracy of the governance functions in complying with the governance attributes; and storing, with one or more processors, the adjusted parameters of the trained first machine-learning model in memory.

20D. The medium of any one of embodiments 15D-19D, wherein: the governance attributes comprise a plurality of access levels for entity users of at least some of the plurality of entities; and the specific targeted action comprises a plurality of sub-targets, wherein: each of the plurality of sub-targets is assigned with a subset of the plurality of access levels.

21D. The medium of any one of embodiments 15D-20D, wherein the plurality of object-manipulation functions comprise: a sequence function used to change a collection of events into a time sequences for processing; a feature function used to gather features of a first object-orientation modelor and then use the features in a second object-orientation modelor; an economic function used to: gather economic objectives and economic constraints of an entity; and employ an allocation algorithm to maximize the objectives; and an ensembling function used to combine a first subset of the library of classes.

22D. The medium of embodiment 21D, wherein the plurality of object-manipulation functions are arranged to change orders dynamically based on the specific targeted action.

23D. The medium of any one of embodiments 15D-22D, wherein the plurality of object-orientation modelors comprise: ingestion modelors used to control schema drift of the datasets and add version numbers to the datasets; landing modelors used to clean error records in the datasets and update the version numbers of the datasets; curation modelors used to normalize the datasets, by adding primary surrogate keys, and update the version numbers of the datasets; dimensional modelors used to encode the datasets in dimensional star schema and update the version numbers of the datasets; and feature and label modelors used to: change the datasets from dimensional star schema to denormalized flat table; adjust granularity of the datasets; and update the version numbers of the datasets.

24D. The medium of any one of embodiments 15D-23D, wherein the datasets comprise: training datasets, used to fit parameters of the object-orientation modelors; validation datasets, used to tune the parameters of the object-orientation modelors; quality assurance datasets, used to test accuracy of the object-orientation modelors; association datasets, used to relate datasets to each other; and targeted action datasets, used to determine the set of actions required to achieve the specific targeted action.

25D. The medium of any one of embodiments 15D-24D, wherein: each action from the set of actions is assigned with a score, the score indicating impact level of the action in achieving the specific targeted action.

26D. The medium of any one of embodiments 15D-25D, wherein the formation object-orientated orchestration further comprises: forming a first training dataset from the datasets; training a first machine-learning model on the first training dataset by adjusting parameters of the first machine-learning model to optimize a first objective function that indicates an accuracy of the plurality of object-orientation modelors in complying with the governance attributes; and storing the adjusted parameters of the trained first machine-learning model in memory.

1E. A tangible, non-transitory, machine-readable medium storing instructions that when executed by one or more processors in a computing system effectuate operations to execute quality management of modelling methods for implementation of a machine learning design in an object-oriented modeling (OOM) framework, the operations comprising: writing, with the computing system, modelling-object classes using object-oriented modelling of the modelling methods, the modelling-object classes being members of a set of class libraries; writing, with the computing system, quality-management classes using object-oriented modelling of quality management, the quality-management classes being members of the set of class libraries; scanning, with the computing system, modelling-object classes in the set of class libraries to determine modelling-object class definition information; scanning, with the computing system, quality-management classes in the set of class libraries to determine quality-management class definition information; using, with the computing system, the modelling-object class definition information and the quality-management class definition information to produce object manipulation functions that allow a quality management system to access methods and attributes of modelling-object classes to manipulate objects of the modelling-object classes; and using, with the computing system, the modelling-object class definition information and the quality-management class definition information to produce access to the object manipulation functions.

2E. The medium of embodiment 1E, wherein: executing quality management comprises executing a process that integrates raw data ingestion, manipulation, transformation, composition, and storage for building artificial intelligence models.

3E. The medium of any one of embodiments 1E-2E, wherein: the modeled quality management comprises management of extract, transform, and load (ETL) phases of a machine learning model designed in the OOM framework.

4E. The medium of any one of embodiments 1E-3E, wherein: the modeled quality management comprises reporting of model performance of a machine learning model designed in the OOM framework.

5E. The medium of embodiment 4E, wherein: model performance is measured by recall, precision, or F1 score.

6E. The medium of any one of embodiments 1E-5E, wherein: the modeled quality management comprises data quality monitoring (DQM).

7E. The medium of embodiment 6E, wherein: DQM comprises monitoring data sources to detect a new or missing table or data element, data element counts, data element null count and unique counts, or datatype changes.

8E. The medium of any one of embodiments 1E-7E, wherein: the modeled quality management comprises model quality monitoring (MQM) of a machine learning model designed in the OOM framework.

9E. The medium of embodiment 8E, wherein: MQM comprises measuring a model-based metric and causing model retraining responsive to detecting more than a threshold amount of drift in the model-based metric.

10E. The medium of any one of embodiments 1E-9E, wherein: the modeled quality management comprises score quality monitoring (SQM) of a machine learning model designed in the OOM framework.

11E. The medium of embodiment 10E, wherein: SQM comprises performing a model hypothesis test.

12E. The medium of embodiment 10E, wherein: SQM comprises computing a lift table or a decile table.

13E. The medium of any one of embodiments 1E-12E, wherein: the modeled quality management comprises label quality monitoring (LQM) of a machine learning model designed in the OOM framework.

14E. The medium of embodiment 13E, wherein: LQM comprises determining which data sources among a plurality of data sources are more leverageable or impactful on model performance than other data sources among the plurality of data sources.

15E. The medium of any one of embodiments 1E-14E, wherein: the modeled quality management comprises bias quality monitoring (BQM) of a machine learning model designed in the OOM framework.

16E. The medium of embodiment 15E, wherein BQM comprises detecting information bias, selection bias, or confounding by the machine learning model designed in the OOM framework.

17E. The medium of any one of embodiments 1E-16E, wherein: the modeled quality management comprises privacy quality monitoring (PQM) of a machine learning model designed in the OOM framework.

18E. The medium of any one of embodiments 1E-17E, wherein: the modeled quality management comprises data quality monitoring (DQM) of a machine learning model designed in the object-oriented modeling (OOM) framework; DQM comprises monitoring data sources to detect a new or missing table or data element, data element counts, data element null count and unique counts, and datatype changes; the modeled quality management comprises model quality monitoring (MQM) of the machine learning model designed in the object-oriented modeling (OOM) framework; MQM comprises measuring a model-based metric and causing model retraining responsive to detecting more than a threshold amount of drift in the model-based metric; the model-based metric is indicative of an F1 score, accuracy, precision, mean error, media error, distance measure, or recall; the modeled quality management comprises score quality monitoring (SQM) of the machine learning model designed in the object-oriented modeling (OOM) framework; SQM comprises performing a model hypothesis test and computing a lift table and a decile table based on predicted probability of positive class membership, based on a cumulative distribution function of positive cases; the model hypothesis test comprises a Welch's t-test, Kolmogorov-Smirnov test, or a Mann-Whitney U-test; the modeled quality management comprises label quality monitoring (LQM) of the machine learning model designed in the object-oriented modeling (OOM) framework; LQM comprises determining which data sources among a plurality of data sources are more leverageable or impactful on model performance than other data sources among the plurality of data sources; the modeled quality management comprises bias quality monitoring (BQM) of the machine learning model designed in the object-oriented modeling (OOM) framework; BQM comprises detecting information bias, selection bias, and confounding by the machine learning model designed in the object-oriented modeling (OOM) framework; the modeled quality management comprises privacy quality monitoring (PQM) of the machine learning model designed in the OOM framework.

19E. The medium of any one of embodiments 1E-18E, wherein: the modeled quality management comprises a process to determine data source reliability.

20E. The medium of any one of embodiments 1E-19E, wherein: an attribute of a quality-management object in one of the quality-management classes comprise means for characterizing quality with the attribute of the quality-management object.

21E. A tangible, non-transitory, machine-readable medium storing instructions that when executed by one or more processors in a computing system effectuate operations to measure the quality of processing of data constructs in a pipeline using modelling methods for implementation of machine learning design in an object-oriented modeling (OOM) framework, the operations comprising: forming, with one or more processors, a first plurality of classes using object-oriented modelling of modelling methods; forming, with one or more processors, a second plurality of classes using object-oriented modelling of quality measurement methods; accessing, with one or more processors, a class library containing at least some of the first plurality of classes to determine first class definition information of a modeling method class among the first plurality of classes; accessing, with one or more processors, the class library or another class library containing at least some of the second plurality of classes to determine second class definition information of a quality measurement class among the second plurality of classes; and using, with one or more processors, the first and the second class definition information to produce object manipulation functions that allow a computing system to access methods and attributes of data construct classes to manipulate data construct objects.

22E. The medium of embodiment 21E, the operations further comprising: accessing the first and the second class definition information to produce object manipulation functions that allow the computing system to access methods and attributes of data construct classes to manipulate data constructs; and accessing second class definition information and third class definition information of the data construct classes to produce object manipulation functions that allow the computing system to access methods and attributes of data construct classes to manipulate said data constructs.

23E. A tangible, non-transitory, machine-readable medium storing instructions that when executed by one or more processors in a computing system effectuate operations to measure the quality of processing of data constructs in a pipeline using modelling methods for implementation of machine learning design in an object-oriented modeling (OOM) framework, the operations comprising: writing, with the computing system, a first plurality of classes using object-oriented modelling of modelling methods; writing, with the computing system, a second plurality of classes using object-oriented modelling of quality measurement methods; scanning, with the computing system, a class library set containing a modelling method class among the first plurality of classes to determine first class definition information; scanning, with the computing system, a class library set containing a quality management class among the second plurality of classes to determine second class definition information; and invoking, with the computing system, the first class definition information of the quality management class and the second class definition information of the modeling method class to produce object manipulation functions that allow the computing system to access the methods and attributes of data classes to manipulate the modeling method class.

24E. The medium of embodiment 23E, wherein the object manipulation functions comprise operations of: adding an attribute to an object, deleting an attribute of an object, updating an attribute to an object, reading an attribute of an object, adding a reference to an object as an attribute, changing an order of attributes, using a setter, or using a getter.

25E. The medium of embodiment 23E, wherein the object manipulation functions comprise operations of: formatting an attribute, aggregating an attribute, calculating an attribute, semantically altering attributes, aggregating an attribute, contracting attribute, or expanding an attribute.

26E. The medium of embodiment 23E, wherein the object manipulation functions comprise operations of: adding an attribute to an object, deleting an attribute of an object, updating an attribute to an object, reading an attribute of an object, adding a reference to an object as an attribute, changing an order of attributes, using a setter, using a getter; formatting an attribute, aggregating an attribute, calculating an attribute, semantically altering attributes, aggregating an attribute, contracting attribute, and expanding an attribute.

27E. The medium of embodiment 23E, wherein object manipulation is conditional.

28E. The medium of embodiment 23E, wherein the quality measurement methods comprise: data quality, model quality, score quality, bias quality, and label quality.

29E. The medium of embodiment 23E, wherein: entities captured in data construct objects processed by the computing system include consumers; communications to consumers by an enterprise; communications to an enterprise by consumers; the events include purchases by consumers from the enterprise; the events include non-purchase interactions by consumers with the enterprise; and the entity logs are obtained from a customer relationship management system of the enterprise.

30E. The medium of embodiment 23E, wherein: the enterprise is a credit card issuer and a trained predictive machine learning models developed using the object-oriented modeling (OOM) framework is configured to predict whether a consumer will default; the enterprise is a lender and the trained predictive machine learning model developed using the OOM framework is configured to predict whether a consumer will borrow; the enterprise is an insurance company and the trained predictive machine learning model developed using the OOM framework is configured to predict whether a consumer will file a claim; the enterprise is an insurance company and the trained predictive machine learning model developed using the OOM framework is configured to predict whether a consumer will sign-up for insurance; the enterprise is a vehicle seller and the trained predictive machine learning model developed using the OOM framework is configured to predict whether a consumer will purchase a vehicle; the enterprise is a seller of goods and the trained predictive machine learning model developed using the OOM framework is configured to predict whether a consumer will file a warranty claim, or the enterprise is a wireless operator and the trained predictive machine learning model developed using the OOM framework is configured to predict whether a consumer upgrade their cellphone, or the enterprise is bank and the trained predictive machine learning model developed using the OOM framework is configured to predict the change in GDP.

1F. A method, comprising: the operations of any one of embodiments 1A-30E.

2F. A system, comprising: the media of any one of embodiments 1A-30 coupled to one or more processors configured to execute the instructions stored on the media.

What is claimed is:

1. A tangible, non-transitory, machine-readable medium storing instructions that when executed by one or more processors perform operations comprising:
   obtaining, with one or more processors, for a plurality of entities, datasets, wherein:
      the datasets comprise a plurality of entity logs;
      a first subset of the plurality of entity logs are events involving the entities;
      a first subset of the events are actions by the entities;
      at least some of the actions are targeted actions;
      a second subset of the plurality of entity logs are attributes related to the entities; and
      the events are distinct from the attributes;
   forming, with one or more processors, an object-orientated orchestration by:
      forming a plurality of objects, wherein each object of the plurality of objects comprises a different set of attributes and events;
      forming object-oriented labeled datasets based on the events and the attributes of each of the datasets;
      forming a library of classes, generated by a plurality of object-orientation modelors; and
      forming a plurality of object-manipulation functions, each function leveraging a specific class;
   receiving, with one or more processors, a request to determine a set of actions required to achieve a specific targeted action; and
   determining, with one or more processors, the set of actions required to achieve the specific targeted action using a compiler function, the compiler function comprising instructions to perform operations comprising:
      assigning the specific targeted action to a first subset of the plurality of objects using a first subset of the plurality of object-manipulation functions; and
      determining a first subset of classes from the library of classes of the object-oriented orchestration that are related to the first subset of the plurality of objects;
      determining the set of actions required to achieve the specific targeted action using a second subset of the plurality of object-manipulation functions, wherein:
         each object-manipulation function of the second subset of the plurality of object-manipulation functions leveraging at least one class of the first subset of classes from the library of classes of the object-oriented orchestration.

2. The medium of claim 1, wherein the compiler function further comprising instructions to effectuate perform operations comprising:
   forming a first training dataset from the datasets;
   training a first machine-learning model on the first training dataset by adjusting parameters of the first machine-learning model to optimize a first objective function that indicates which object-manipulation functions from the plurality of object-manipulation functions should be included in the second subset of the plurality of object-manipulation functions; and
   storing the adjusted parameters of the trained first machine-learning model in memory.

3. The medium of claim 2, wherein:
the first machine learning model comprises a Hidden Markov model.

4. The medium of claim 2, wherein:
the first machine learning model comprises a long short-term memory model.

5. The medium of claim 2, wherein:
the first machine learning model comprises a dynamic Bayesian network.

6. The medium of claim 2, wherein:
the first machine learning model comprises a neural network classifier.

7. The medium of claim 2, wherein:
the first machine learning model is part of a value function or an environment model of a reinforcement learning model.

8. The medium of claim 2, wherein training comprises steps for training.

9. The medium of claim 2, wherein the first dataset comprises:
the first subset of the plurality of objects.

10. The medium of claim 2, comprising:
inputting more than 1,000 entity logs corresponding to more than 1,000 entities input into the trained first machine learning model.

11. The medium of claim 2, wherein the compiler function further comprises instructions to perform operations comprising:
forming a first validation dataset from the datasets;
operating the trained first machine-learning model on the first validation dataset;
based on a determination that the trained first machine-learning model operates below a threshold on the first validation dataset, triggering retraining of the first machine-learning model.

12. The medium of claim 1, wherein the compiler function further comprising instructions to perform operations comprising:
forming a first training dataset from the datasets;
training a first machine-learning modelling pipeline on the first training dataset by adjusting parameters of the first machine-learning modelling pipeline to optimize a first objective function that indicates which object-manipulation functions from the plurality of object-manipulation functions should be included in the second subset of the plurality of object-manipulation functions; and
storing the adjusted parameters of the trained first machine-learning modelling pipeline in memory.

13. The medium of claim 1, wherein the compiler function further comprising instructions to perform operations comprising:
forming a second training dataset from the datasets;
training a second machine-learning model on the second training dataset by adjusting parameters of the second machine-learning model to optimize a second objective function that indicates an order of operation of each object-manipulation function in the second subset of the plurality of object-manipulation functions; and
storing the adjusted parameters of the trained second machine-learning model in memory.

14. The medium of claim 1, wherein the plurality of entity logs comprise information about:
consumers;
communications to consumers by an enterprise;
communications to an enterprise by consumers;
purchases by consumers from an enterprise;
non-purchase interactions by consumers with an enterprise; and
a customer relationship management system of an enterprise.

15. The medium of claim 14, wherein:
the enterprise is a credit card issuer and the specific targeted action is predicting whether a consumer will default;
the enterprise is a lender and the specific targeted action is predicting whether a consumer will borrow;
the enterprise is an insurance company and the specific targeted action is predicting whether a consumer will file a claim;
the enterprise is an insurance company and the specific targeted action is predicting whether a consumer will sign-up for insurance;
the enterprise is a vehicle seller and the specific targeted action is predicting whether a consumer will purchase a vehicle;
the enterprise is a seller of goods and the specific targeted action is predicting whether a consumer will file a warranty claim,
the enterprise is a wireless operator and the specific targeted action is predicting whether a consumer upgrade their cellphone, or
the enterprise is a bank and the specific targeted action is predicting gross domestic product (GDP) variation.

16. The medium of claim 14, wherein the second subset of the plurality of object-manipulation functions further comprises:
an economic optimization function with a plurality of function parameters, wherein the plurality of function parameters are adjusted based on business objectives of the enterprise.

17. The medium of claim 16, wherein the business objectives of the enterprise comprise:
increase in revenue;
increase in profit margin; or
reduction in cost;
wherein each of the business objectives has a set of business constraints.

18. The medium of claim 17, wherein the at least some of the sets of business constraints comprise:
a plurality of specific age groups;
a specific product or service;
a window of time; and
a plurality of geographical locations.

19. The medium of claim 17, wherein the at least some of the sets of business constraints comprise:
an amount of time to optimize operation; and
an amount of hardware used to optimize operation.

20. The medium of claim 1, wherein:
the specific targeted comprises a plurality of sub-targets; and
the plurality of object-orientation modelors comprises:
a scaled propensity modelor used to calculate probability of a customer making an economic commitment;
a timing modelor used to calibrate moments in time when a customer is likely to engage with each subset of the plurality of sub-targets;
an affinity modelor used to capture ranked likes and dislikes of an entity's customers for a first subset of targeted actions;
an action modelor used to create a framework for concurrent Key Performance Index for each subset of the plurality of sub-targets at different points in a customer's journey;
a cluster modelor used to group an entity's customers based on the customers' behavior into a finite list; and
wherein:
a first subset of the plurality of object-orientation modelors are used for a first subset of the plurality of sub-targets;
a second subset of the plurality of object-orientation modelors are used for a second subset of the plurality of sub-targets; and
wherein an order in which the first subset of the plurality of object-orientation modelors perform is different from an order in which the second subset of the plurality of object-orientation modelors perform.

21. The medium of claim 1, the operations further comprising:
steps for determining the set of actions required to achieve the specific targeted action.

22. The medium of claim 1, wherein the plurality of entity logs comprise information about:
consumers, communications to consumers by an enterprise,
communications to an enterprise by consumers, and
events that include purchases by consumers from the enterprise and non-purchase interactions by consumers with the enterprise; and
wherein the entity logs are obtained from a customer relationship management system of the enterprise.

23. The medium of claim 1, wherein the plurality of entity logs comprise information about:
consumers;
product information;
service information;
events that include purchases by consumers from an enterprise and non-purchase interactions by consumers with the enterprise, and
events that include subscriptions by consumers from the enterprise and non-purchase interactions by consumers with the enterprise; and
wherein the entity logs are obtained from a customer relationship management system of the enterprise.

24. The medium of claim 1, wherein instructions to determine the set of actions required to achieve the specific targeted action comprise instructions to execute optimization of an orchestration of modelling objects for implementation of a machine learning design based on optimization criteria using an object-oriented modeling (OOM) framework.

25. The medium of claim 1, further comprising:
obtaining, with one or more processors, for a plurality of entities, additional datasets;
updating, with one or more processors, the object-orientated orchestration by:
    forming a plurality of additional objects, wherein each object of the plurality of objects comprises a different set of attributes and events of the additional datasets; and
    forming object-oriented labeled datasets based on the event and the attributes of each of the additional datasets;
receiving, with one or more processors, a request to determine a set of actions required to achieve a specific targeted action; and
determining, with one or more processors, the set of actions required to achieve the specific targeted action using a compiler function, the compiler function comprising instructions to perform operations comprising:
    assigning the specific targeted action to a first subset of the plurality of additional objects using a first subset of the plurality of object-manipulation functions; and
    determining a first subset of classes from the library of classes of the object-oriented orchestration that are related to the first subset of the plurality of additional objects;
    determining the set of actions required to achieve the specific targeted action using a second subset of the plurality of object-manipulation functions, wherein:
        each object-manipulation function of the second subset of the plurality of object-manipulation functions leveraging at least one class of the first subset of classes from the library of classes of the object-oriented orchestration.

26. A method comprising:
obtaining, with one or more processors, for a plurality of entities, datasets, wherein:
    the datasets comprise a plurality of entity logs;
    a first subset of the plurality of entity logs are events involving the entities;
    a first subset of the events are actions by the entities;
    at least some of the actions are targeted actions;
    a second subset of the plurality of entity logs are attributes related to the entities; and
    the events are distinct from the attributes;
forming, with one or more processors, an object-orientated orchestration by:
    forming a plurality of objects, wherein each object of the plurality of objects comprises a different set of attributes and events;
    forming object-oriented labeled datasets based on the event and the attributes of each of the datasets;
    forming a library of classes, generated by a plurality of object-orientation modelors; and
    forming a plurality of object-manipulation functions, each function leveraging a specific class;
receiving, with one or more processors, a request to determine a set of actions required to achieve a specific targeted action; and
determining, with one or more processors, the set of actions required to achieve the specific targeted action using a compiler function, the compiler function comprising instructions to perform operations
    assigning the specific targeted action to a first subset of the plurality of objects using a first subset of the plurality of object-manipulation functions; and
    determining a first subset of classes from the library of classes of the object-oriented orchestration that are related to the first subset of the plurality of objects;
    determining the set of actions required to achieve the specific targeted action using a second subset of the plurality of object-manipulation functions, wherein:
        each object-manipulation function of the second subset of the plurality of object-manipulation functions leveraging at least one class of the first subset of classes from the library of classes of the object-oriented orchestration.

* * * * *